(12) United States Patent
Homma et al.

(10) Patent No.: US 8,376,091 B2
(45) Date of Patent: Feb. 19, 2013

(54) FLOATING-DISK TYPE BRAKE SYSTEM

(75) Inventors: Akira Homma, Tokamachi (JP); Masao Kobayashi, Tokamachi (JP)

(73) Assignee: Homma Science Corporation, Tokamachi-Shi (JP)

( * ) Notice: Subject to any disclaimer, the term of this patent is extended or adjusted under 35 U.S.C. 154(b) by 0 days.

(21) Appl. No.: 13/448,762

(22) Filed: Apr. 17, 2012

(65) Prior Publication Data

US 2012/0199424 A1 Aug. 9, 2012

Related U.S. Application Data

(63) Continuation of application No. 12/064,880, filed as application No. PCT/JP2006/316883 on Aug. 28, 2006, now Pat. No. 8,181,750.

(30) Foreign Application Priority Data

Sep. 2, 2005 (JP) ................... 2005-255209
Feb. 22, 2006 (JP) ................... 2006-045550
May 23, 2006 (JP) ................... 2006-143272

(51) Int. Cl.
*F16D 55/36* (2006.01)
*B60T 1/06* (2006.01)

(52) U.S. Cl. .............. 188/71.5; 188/18 A; 188/72.3; 188/152; 188/264 E; 188/313; 192/18 A; 192/18 B; 192/18 R; 192/48.6; 475/144; 475/159

(58) Field of Classification Search ............ 188/71.5, 188/72.1, 313, 18 A, 71.6, 72.4, 264 E, 218 XL, 188/72.5, 170; 192/53.1, 48.6, 18 R, 18 A, 192/18 B, 48.4; 475/326

See application file for complete search history.

(56) References Cited

U.S. PATENT DOCUMENTS

| 1,961,326 | A | * | 6/1934 | Barnes | 192/48.6 |
|---|---|---|---|---|---|
| 2,953,040 | A | * | 9/1960 | Christenson et al. | 475/159 |
| 4,037,694 | A | * | 7/1977 | Keese | 192/221.1 |
| 4,391,354 | A | * | 7/1983 | Bucksch | 188/71.5 |

FOREIGN PATENT DOCUMENTS

| JP | 03-123153 U | 12/1991 |
|---|---|---|
| JP | 07-042757 A1 | 2/1995 |
| JP | 07-052664 A1 | 2/1995 |
| JP | 2003-222166 A1 | 8/2003 |
| JP | 2003-222167 A1 | 8/2003 |

* cited by examiner

*Primary Examiner* — Robert A Siconolfi
*Assistant Examiner* — San Aung
(74) *Attorney, Agent, or Firm* — Burr & Brown

(57) ABSTRACT

A floating-disk type brake system that includes floating disk assemblies placed respectively in spaces between a rotating member, such as a wheel of a transportation machine or a rotating shaft of a machine tool, and a stationary member to reduce differences in the rotating speed of adjacent sliding surfaces of the floating disk assemblies in frictional sliding engagement. The floating-disk type brake system includes a first floating disk assembly and a first disk assembly that are arranged between the ring gear and the planet carrier of a planetary gear built in a transmission or the like, and the first floating disk assembly and the first disk assembly are pressed together into frictional engagement to brake a rotating shaft.

1 Claim, 32 Drawing Sheets

FLOATING-DISK TYPE BRAKE SYSTEM

CROSS REFERENCE TO RELATED APPLICATIONS

This application is a continuation of U.S. application Ser. No. 12/064,880, filed Apr. 4, 2008, which was the National Stage of International Application No. PCT/JP2006/316883, filed Aug. 28, 2006, and claims the benefit under 35 USC §119(a)-(d) from Japanese Patent Application Nos. 2005-255209 filed Sep. 2, 2005, 2006-045550 filed Feb. 22, 2006, and 2006-143272 filed May 23, 2006, the entireties of which are incorporated herein by reference.

FIELD OF THE INVENTION

The present invention relates to a floating-disk type brake system for braking a rotating shaft of transportation vehicles and machine tools. More specifically, the present invention relates to a technique capable of widening the field of application of a brake system by incorporating a planetary gear into the brake system, of limiting increase in the number of parts and modification of existing machines to the least extent necessary, and of smoothly braking rotating wheels and rotating shafts while generating a small quantity of heat.

BACKGROUND OF THE INVENTION

The inventors of the present invention previously developed a brake system for braking a rotating shaft of transportation vehicles including automobiles and railroad cars, and machine tools, and filed a patent application for the grant of patent for the brake system (Patent Documents 1 and 2).

The construction of this prior brake system will be briefly described with reference to FIG. 34. A first rotating member 2 is mounted on a shaft 1 so as to be axially slidable and to be rotatable together with the shaft 1. A first gear 3 is fixedly mounted on the shaft 1 for rotation together with the shaft 1. A second gear 6 is supported for rotation by a support shaft 5 on a support arm 4, and is engaged with the first gear 3. A third gear 7 is supported on the support shaft 5 for rotation together with the second gear 6 and is engaged with a fourth gear 8 supported on the shaft 1 for rotation relative to the shaft 1. A second rotating member 9 is combined with the fourth gear 8 for free rotation together with the fourth gear 8 on the shaft 1. The revolving speed N1 of the first rotating member 2 is equal to that of the shaft 1. The rotating speed N2 of the second rotating member 9 is different from the revolving speed N1 of the first rotating member 2 because of the step-up or step-down ratio of the gear train of the first gear 3, the second gear 6, the third gear 7 and the fourth gear 8.

When the first rotating member 2 is axially pushed toward the second rotating member 9, as indicated by the arrows P in FIG. 34, to bring a frictional surface 2a of the rotating member 2 into frictional contact with a frictional surface 9a of the second rotating member 9, a frictional force acts between the rotating members 2 and 9. This frictional force slows the rotation of the first gear 3 and the second gear 6. When the first gear 3 and the second gear 6 are locked together, the second gear 6 tends to revolve about the axis of the shaft 1. Since the second gear 6 is supported by the support shaft 5 on the fixed support arm 4, the second gear 6 is unable to revolve about the axis of the shaft 1. Consequently, the shaft 1 is braked to a stop. In this brake system previously applied for patent, the support arm is, namely, a stationary member, and the support shaft 5 brakes the rotating shaft 1. The magnitude of the braking force is controlled by regulating the frictional force acting between the first rotating member 2 and the second rotating member 9.

For example, the second rotating member 9 can be rotated at 1100 rpm when the first rotating member 2 rotates at 1000 rpm by properly adjusting the step-up or step-down ratio of a gear train including the first gear 3, the second gear 6, the third gear 7 and the fourth gear 8. When a braking force is applied to the first rotating member 2 rotating at 1000 rpm by the stationary support arm 4 or the support shaft 5, the rotating speed difference of 1000 rpm needs to be reduced to zero. When a frictional force acts between the first rotating member 2 rotating at 1000 rpm and the second rotating member 9 rotating at 1100 rpm, only a rotating speed difference of 100 rpm needs to be reduced to zero. Therefore, an impulsive force resulting from braking by the frictional force, and a quantity of heat generated in the latter from rotating speed absorption is far lower than those in the former. The brake system previously applied for patent not only can moderate impulsive force generated during braking, but also can suppress frictional heat generation.

Patent Document 1: JP 2003-222167 A
Patent Document 2: JP 2003-222166 A

SUMMARY OF THE INVENTION

Problem to be Solved by the Invention

The brake system previously applied for patent needs the first gear 3, the second gear 6, the third gear 7, the fourth gear 8, and the stationary members, namely, the support arm 4 and the support shaft 5 to brake the rotating shaft 1. Therefore, existing transportation machines and existing machine tools unavoidably need considerable modification and additional parts when the brake system previously applied for patent is intended to be incorporated to those existing machines and machine tools.

Accordingly, it is an object of the present invention to provide a brake system developed by incorporating improvements into the brake system previously applied for patent, capable of being incorporated into existing transportation machines and machine tools, suppressing additional parts and modification to the least extent, simple, small and lightweight in construction, capable of being manufactured at a low cost, and having an excellent ability.

Means for Solving the Problem

An object of the present invention is a floating-disk type brake system (100, 200, 300, 500 or 600) for braking a rotating shaft (23), disposed coaxially with a planetary gear (30), including: a fixing means (20) for fixing some of a sun gear (31), a set of planet pinions (34) and a ring gear (35) included in the planetary gear (30) so as to be unable to turn; a rotation transfer means (32) for connecting either of the unfixed two not fixed by the fixing means (20) of the sun gear (31), the set of planet pinions (34), and the ring gear (35) with the rotating shaft (23) so as to be driven by the rotating shaft (23); a driven means (35a) capable of rotating together with the other of the unfixed two not fixed by the fixing means (20) of the sun gear (31), the set of planet pinion (34) and the ring gear (35); a first floating disk assembly (50) disposed coaxially with the rotating shaft (23) so as to be axially movable and to be turnable on the rotating shaft (23); a first disk assembly (60) supported coaxially with the rotating shaft (23) so as to be axially movable and to turn together with either of the rotation transfer means (32) and the driven means (35a); and a pushing means (70) supported on the fixing means (20), and capable of axially pushing both the first disk assembly (60) and the first floating disk assembly (50) toward the fixing means (20), the rotation transfer means (32) or the driven means (35*a*) to bring the first disk assembly (60) and the first floating disk assembly (50) into frictional contact with each other.

In the floating-disk type brake system set forth in the present invention, when the fixing means (20) fixes, for example, the sun gear (31) among the sun gear (31), the planet pinions (34) and the ring gear (35) included in the planetary gear (30), the other two elements (34 and 35) of the planetary gear (30) turn relative to each other and, consequently, the rotation transfer means (32) and the driven means (35*a*) turn relative to each other.

When the rotation transfer means (32) and the driven means (35*a*) are frictionally engaged by the first floating disk assembly (50) and the first disk assembly (60) to retrain the rotation transfer means (32) and the driven means (35*a*) from relative rotation, the rotation transfer means (32) and the driven means (35*a*) are restrained from turning relative to the fixing means (20). Thus, the rotating shaft (23) can be braked through the rotation transfer means (32). To put it differently, the two elements capable of turning relative to each other of the planetary gear, namely, the rotation transfer means and the driven means of the planetary gear, and the first floating disk assembly (50) and the first disk assembly (60) of the brake system set forth in the present invention correspond to the first turning member 2 and the second turning member 9 of the previously proposed brake system shown in FIG. 34; and the fixing means (20) corresponds to the support arm 4 and the support shaft 5.

The brake system for braking the rotating shaft (23) can be formed by adding the first floating disk assembly (50), the first disk assembly (60) and the pushing means (70) to an existing planetary gear included in the power transmission system of transportation machines and machine tools.

When the stationary part, namely, the fixing means (20) exerts a braking force on the rotating shaft (23), the part turning at a high relative speed is braked. Consequently, a high impulsive force and a large quantity of heat are generated by braking. Heat thus generated causes coefficient of friction to vary and it is difficult to keep braking force constant.

The brake system set forth in the present invention brakes the rotating shaft (23) by braking one of the two elements turning at a low relative speed of the planetary gear (30) by the other of the two elements. Therefore, the impulsive force and the quantity of heat generated by braking can be reduced.

Consequently, it is possible to achieve not only avoiding brake fade due to heat generated by braking and using a constant braking force for a long time, but also stabilizing braking force by suppressing the variation of coefficient of friction.

The abrasion of the first floating disk assembly (50) and the first disk assembly (60) can be limited to the least extent, and hence the first floating disk assembly (50) and the first disk assembly (60) have a long service life.

According to the present invention, the floating-disk type brake system further includes second disks (75 and 76) supported coaxially with the rotating shaft (23) by the pushing means (70) so as to be axially movable; wherein the pushing means (70) axially pushes the first floating disk assembly (50), the first disk assembly (60) and the second disks (75 and 76) together to bring those elements into close contact with each other for frictional engagement.

The floating-disk type brake system (100, 200, 300, 500 or 600) set forth in the present invention brings either of the rotation transfer means (32) and the driven means (35*a*) into frictional engagement with the fixing means (20) by the second disks (75 and 76). Therefore, the rotation of the rotation transfer means (32) and the driven means (35*a*) relative to the fixing means (20) can be effectively retarded and hence the rotating shaft (23) can be effectively braked.

According to the present invention, the floating-disk type brake system further includes a second floating disk assembly (80) disposed coaxially with the rotating shaft (23) between the set of the second disks (75 and 76), and the first disk assembly (60) so as to be axially movable and to be turnable on the rotating shaft (23) to the floating-disk type brake system; wherein the pushing means (70) axially pushes the second disks (75 and 76), the second floating disk assembly (80), the first disk assembly (60) and the first floating disk assembly (50) together to bring those elements into close contact with each other for frictional engagement.

The brake system (300) set forth in another embodiment of the present invention is provided with the second floating disk assembly (80) disposed between the first disk assembly (60) and the set of the second disks (75 and 76).

The second floating disk assembly (80) can freely turn between the first disk assembly (60) and the set of the second disks (75 and 76), i.e., between either of the rotation transfer means (32) and the driven means (35*a*), for example, the driven means (35*a*), and the fixing means (20). Therefore, even if either of the rotation transfer means and the driven means, for example, the driven means (35*a*), and the fixing means (20) rotate relative to each other at a high rotating speed, the difference between the respective rotating speeds of the driven means (35*a*) and the fixing means (20) can be smoothly reduced to zero.

The second floating disk assembly (80) places friction surfaces between the first disk assembly (60) and the set of the second disks (75 and 76). Therefore, frictional force acting between either of the rotation transfer means and the driven means, for example, the driven means (35*a*), and the fixing means (20) increases, the rotation of the rotation transfer means (32) and the driven means (35*a*) relative to the fixing means (20) can be retarded, and hence the rotating shaft (23) can be still more effectively braked.

According to the present invention, the floating-disk type brake system further includes a third disk assembly (90) disposed between the first floating disk assembly (50) or the second floating disk assembly (80), and the fixing means (20) coaxially with the shaft (23) so as to be axially movable and to be turnable together with either of the rotation transfer means (32) and the driven means (35*a*), for example, the driven means (35*a*); wherein the pushing means (70) axially pushes the set of second disks (75 and 76), the third disk (90), the second floating disk assembly (80), the first disk assembly (60) and the first floating disk assembly (50) together to bring those elements into close contact with each other for frictional engagement.

The brake system (500) set forth in another embodiment of the present invention is additionally provided with a third disk (90) that turns together with either of the rotation transfer means (32) and the driven means (35*a*).

Since frictional surfaces are thus formed additionally between the first floating disk assembly (50) or the second floating disk assembly (80), and the fixing means (20), frictional force acting between, for example, the rotation transfer means (32) and the fixing means (20) increases. Consequently, the rotation of the rotation transfer means (32) and the driven means (35*a*) relative to the fixing means is retarded and the rotating shaft (23) can be still more effectively braked.

According to the present invention, the first floating disk assembly (5) of the floating-disk type brake system includes a plurality of annular members (51, 52, 53 and 54) axially arranged so as to be slidable relative to each other.

In the brake system (100, 200, 300, 400, 500 or 600) of the present invention, the rotating speed difference between the respective rotating speeds of the adjacent ones of the plurality of superposed disks forming the floating disk assembly (50) is small.

Therefore, the first floating disk assembly (50) can smoothly reduce the large rotating speed difference to zero even if the rotating speed difference between the rotation transfer means (320 and the driven means (35*a*) is large.

Since many frictional surfaces are interposed additionally between one of the rotation transfer means (32), the driven means (35*a*) and the fixing means (20), and the first disk assembly (60), frictional forces acting among the rotation transfer means (32), the driven means (35*a*) and the fixing means (20) increases and hence the rotating shaft (23) can be still more effectively braked.

An object of the present invention is a floating-disk type brake system using a plurality of annular members (81, 82, 83, 84 and 85) axially arranged so as to be slidable relative to each other as the second floating disk assembly (80) of the floating-disk type brake system.

In the brake system (300, 500 or 600) set forth above, the plurality of annular members (81, 82, 83, 84 and 85) serving as the second floating disk assembly (80) are arranged coaxially with the rotating shaft (23) so as to be slidable relative to each other between the first disk assembly (60) and the set of the second disks (75 and 76). Those axially arranged disks can rotate such that the rotating speed difference between the respective rotating speeds of the adjacent ones thereof is small.

Therefore, the second floating disk assembly (80) can smoothly reduce the large rotating speed difference to zero even if the rotating speed difference between either of the rotation transfer means and the driven means, for example, the driven means (35*a*), and the fixing means (20) is large.

Since many frictional surfaces are interposed additionally between the first disk assembly (60) and the set of the second disks (75 and 76), frictional forces acting among the rotation transfer means (32), the driven means (35*a*) and the fixing means (20) increases and hence the rotating shaft (23) can be still more effectively braked.

According to the present invention, one (51) of the plurality of annular members (51, 52, 53 and 54), and one (81) of the plurality of annular members (81, 82, 83 and 84) of the floating-disk type brake system have cylindrical parts (51*a* and 81*a*) coaxial with the rotating shaft (23), respectively, and the other annular members (52, 53 and 54, and 82, 83 and 84) are put on the cylindrical parts (51*a* and 81*a*), respectively, so as to be slidable.

The cylindrical parts can be rotatably supported by bearings (55 and 85), respectively, on the rotating shaft (23), the rotation transfer means (32), the driven means (35*a*) or the fixing means (20).

In the floating-disk type brake system (100, 200, 300, 500 or 600) set forth above, the plurality of disks forming the first floating disk assembly (50) and the second floating disk assembly (80) can be surely rotatably supported by simple mechanism.

According to the present invention, the sun gear (31) of the planetary gear (30) of the floating-disk type brake system is fixed to the fixing means (20), the planet pinions (34) are driven for rotation by the rotating shaft (23) to increase the output rotating speed of the ring gear (35) and to deliver rotational driving force through the ring gear (35).

The brake system (100) set forth in the first embodiment of the present invention is used, for example, in combination with a speed-increasing planetary gear, such as an overdrive gear included in an automotive transmission.

The brake system of the present invention can be built in an existing overdrive gear. Thus the brake system of the present invention can be incorporated into an automotive transmission without considerably modifying the automotive transmission at a low cost.

According to the present invention, the floating-disk type brake system further includes an output shaft (24) through which the rotational driving force is delivered, and a coupling mode selecting means (40) capable of selectively setting a direct-drive mode where the rotating shaft (23) and the output shaft (24) are coupled or an overdrive mode where the ring gear (35) is coupled with the output shaft (24).

In the brake system (100) set forth above, the direct-drive mode where the rotating shaft (23) and the output shaft (24) are directly coupled or the overdrive mode where the ring gear (35) is coupled with the output shaft (24) can be selectively set. Therefore, the brake system can be incorporated as an overdrive gear into an automotive transmission.

The rotating shaft (23) can be surely braked in either of the direct-couple mode and the overdrive mode.

According to the present invention, the output shaft (24) of the floating-disk type brake system is connected through a propeller shaft (104) and a final reduction gear unit (105) included in an automobile to the right and the left drive wheel (106L and 106R) of the automobile.

The brake system (100) set forth above can simultaneously brake the right drive wheel (106R) and the left drive wheel (106L) through the propeller shaft (104) and the final reduction gear unit (105) of the automobile by braking the rotating shaft (23). Therefore, the right and the left drive wheel do not need to be individually provided with brake mechanisms.

The reduction ratio of the final reduction gear unit (105) in the range of about 1:3 to about 1:10, high braking force can be applied to the right and the left drive wheel even if a low braking force is applied to the rotating shaft.

Since the braking force can be equally distributed to the right and the left drive wheel through the differential gear included in the final reduction gear unit, pulling does not occur when the automobile is braked and the running stability of the automobile can be improved.

According to the present invention, the planetary gear (30) of the floating-disk type brake system is a reduction gear mechanism for reducing the output speed of an in-wheel motor disposed inside a driving wheel of an electric motor.

Generally, an in-wheel motor (11) disposed inside the drive wheel of the electric motor is built by combining an electric motor, and a planetary gear mechanism (12) serving as a speed-reducing mechanism. The in-wheel motor, in itself, has no function to brake the rotating drive wheel (15). Therefore, the in-wheel motor needs to be combined with a generally used disk brake or drum brake (13).

When the brake system (400) of another embodiment of the present invention is incorporated into the planetary gear (30) of the in-wheel motor, the in-wheel motor (11) can brake the drive wheel (15). Consequently, the disk brake or the drum brake (13) can be omitted.

Thus, a weight corresponding to the weight of the disk brake or the drum brake can be reduced. The weight reduction of the in-wheel motor can effectively solve problems in the in-wheel motor resulting from increase in unsprung weight.

According to the present invention, the first disk assembly (60) of the floating-disk type brake system is supported for rotation together with either of the rotation transfer means

(32) and the driven means (35a) whose difference in rotating speed from the fixing means (20) is greater than that of the other.

When the ring gear (35) of the planetary gear (30) is fixed, and the planet carrier (32), namely, the rotation transfer means (32), are driven for revolution to drive the sun gear (31) for rotation, the rotating speed of the sun gear (31) is far higher than that of the rotating shaft (23). Consequently, the planetary gear (30) serves as a speed-increasing gear mechanism.

Similarly, when the sun gear (31) of the planetary gear (30) is fixed, and the planet carrier (32) is driven for rotation by the rotating shaft (23) to drive the ring gear (35) for rotation, the rotating speed of the ring gear (35) is higher than that of the drive rotating shaft (23). Consequently, the planetary gear (30) serves as a speed-increasing gear mechanism.

Thus, the difference between the respective rotating speeds of the driven means and the fixing means is far greater than that between the rotating shaft (23) and the fixing means, namely, between the rotation transfer means and the fixing means.

In this state, the difference in rotating speed between the first disk assembly (60) supported for rotation together with the driven means, and the second disks (75 and 76) supported by the fixing means is considerably large. Therefore, the driven means is decelerated sharply when those disks are brought into contact. Thus, the rotating shaft (23) can be braked sensitively.

Accordingly, the floating-disk type brake system (200 or 240) of this construction is suitable for application to uses requiring a braking operation of a sensitive braking mode, such as sports vehicles.

According to the present invention, the first disk assembly (60) of the floating-disk type brake system is supported so as to rotate together with either of the rotation transfer means (32) and the driven means (35a) whose difference in rotating speed from the fixing means (20) is smaller than that of the other.

When the ring gear (35) of the planetary gear (30) is fixed, and the sun gear (31) is rotated by the rotating shaft (23) to rotate the plane carrier (32), the rotating speed of the planet carrier (32) is far lower than that of the rotating shaft (23). Consequently, the planetary gear (30) serves as a speed-reducing mechanism.

Similarly, when the sun gear (31) of the planetary gear (30) is fixed, and the ring gear (35) is driven for rotation by the rotating shaft (23) to rotate the planet carrier (32), the rotating speed of the planet carrier (32) is far lower than that of the rotating shaft (23). Consequently, the planetary gear (30) serves as a speed-reducing mechanism.

Thus, the difference in rotating speed between the planet carrier (32), namely, the driven means, and the fixing means is far smaller than that between the rotating shaft (23), namely, the rotation transfer means, and the fixing means.

In this state, the difference in rotating speed between the first disk assembly (60) supported for rotation together with the driven means, and the second disks (75 and 76) supported on the fixing mans is considerably small. Therefore, the driven means is decelerated gradually when those disks are brought into contact. Thus, the rotating shaft (23) can be braked moderately.

Accordingly, the floating-disk type brake system (250) of this construction is suitable for application to uses requiring a braking operation of a smooth braking mode, such as railroad cars.

According to the present invention, the floating-disk type brake system further includes a clutch (601) interposed between the rotating shaft (23) and the rotation transfer means (32) to connect the rotating shaft (23) and the rotation transfer means (32) to transmit rotational driving force from the rotating shaft (23) to the rotation transfer means (32) or to disconnect the rotating shaft (23) and the rotation transfer means (32) not to transmit rotational driving force from the rotating shaft (23) to the rotation transfer means (32); and a clutch control means for controlling the clutch (601). The clutch control means engages the clutch (601) to connect the rotating shaft (23) and the rotation transfer means (32) upon the reception of a signal requesting braking the rotating shaft (23).

In the floating-disk type brake system (600) set forth above, the clutch (601) remains disengaged and the rotating shaft (23) and the rotation transfer means (32) are disconnected until the operator of the vehicle generates a braking signal by stepping on the brake pedal.

When the rotating shaft (23) is thus disconnected from the planetary gear (30), the planetary gear (30) acts as a rotational inertial mass and does not impede changes in the rotating speed of the rotating shaft (23), and friction loss dissipated in the planetary gear (30) is not loaded on the shaft.

When the operator of the vehicle generates a braking signal requesting braking the rotating shaft (23) by stepping on the brake pedal, the clutch (601) is engaged to connect the rotating shaft (23) and the planetary gear (30). Therefore, when the brake pedal is depressed to operate the pushing means (70), the floating-disk type brake system executes its intrinsic braking operation.

According to the present invention, the floating-disk type brake system further includes a disk pressing means (602) for axially pressing the disks together so as to keep the disks in contact with each other.

In the floating-disk type brake system (600) set forth above, the disk pressing means (602) keeps the first and the second disk in contact with each other, and keeps the first and the second floating disk assembly in contact with each other. Therefore a braking action becomes effective upon the operation of the pushing means (70).

Since the rotating shaft (23) can be disconnected from the planetary gear (30) by using the clutch (601), it is possible to prevent, with reliability, a low frictional force generated between the disks by pressure applied by the disk pushing means from acting as a braking force on the rotating shaft (23).

A floating-disk type brake system of another embodiment includes: a rotating shaft (702) rotatably supported on a fixed member (701); a first rotating member (703) capable of rotating together with the rotating shaft (702); a fixed member (704) coaxial with the rotating shaft (702), movable along the axis of the rotating shaft (702), supported and restrained from rotation by the stationary member (701); second and third rotating members (705 and 706) coaxial with and rotatable relative to the rotating shaft (702), axially movable along the axis of the rotating shaft (702), and interposed between the first rotating member (703) and the fixed member (704); first to third floating disk assemblies (720, 721 and 722) interposed between the adjacent ones of the first to the third rotating members (703, 705 and 706) and the fixed member (704), respectively; a rotation transmitting mechanism (710) supported on the fixed member (704) and capable of transmitting the rotation of the rotating shaft (702) to the second and the third rotating members (705 and 706) such that the second and the third rotating member (705 and 706) rotate respectively at rotating speeds different from the rotating speed of the first rotating member (703); and a pushing means (730) supported on the fixed member (701) and capable of axially pushing at least either of the first rotating member (703) and the fixed member (704) to press together the second and the third rotating member (705 and 706) and the first to the third floating disk assembly (720, 721 and 722) between the first rotating member (703) and the fixed member (704).

In the floating-disk type brake system set forth above, the first to the third rotating member (703, 705 and 706) can be rotated relative to the fixed member (704) by the agency of the rotation transmitting mechanism (710).

The second and the third rotating member (705 and 706), and the first to the third floating disk assembly (720, 721 and 722) can be pressed together between the first rating member (703) and the fixe member (704) by making the pushing means (730) work. The rotating members and the floating disk assemblies are thus brought into frictional engagement to brake the shaft (702). In this state, the fixed member (704) that does not rotate and the third rotating member (706) holding the third floating disk assembly (722) are frictionally engaged. Therefore, the braking mode of a braking operation for braking the shaft (702) can be varied by varying the rotation of the third rotating member (706) relative to the fixed member (704).

More concretely, the rotating speed of the third rotating member (706) drops sharply when the third rotating member (706) rotating at a high rotating speed relative to the fixed member (704) is brought into frictional engagement with the fixed member (704). Consequently, the shaft (702) is braked in a sensitive braking mode.

The rotating speed of the third rotating member (706) drops gradually when the third rotating member (706) rotating at a low rotating speed relative to the fixed member (704) is brought into frictional engagement with the fixed member (704). Consequently, the shaft (702) is braked in a moderate braking mode.

According to the present invention, the rotation transmitting mechanism (710) of the floating-disk type brake system is designed such that the rotating speed of the second rotating member (705) is higher than that of the first rotating member (703), and the rotating speed of the third rotating member (706) is higher than that of the second rotating member (705).

In the floating-disk type brake system set forth in the present invention, the third rotating member (706) can be rotated at a high rotating speed relative to the fixed member (704), and the difference in rotating speed between the first rotating member (703) and the third rotating member (706) can be smoothly reduced to zero through the rotation of the second rotating member (705), and the first and the second floating disk assembly (720 and 721) relative to each other.

Thus, it is possible to achieve not only stabilizing braking force by suppressing the variation of coefficient of friction, but also avoiding brake fade due to heat generated by braking, using a constant braking force for a long time, and extending the service life of the first to the third rotating member and the first and second floating disk assembly.

According to the present invention, the rotation transmitting mechanism (710) of the floating-disk type brake system is designed such that the rotating speed of the second rotating member (705) is lower than that of the first rotating member (703), and the rotating speed of the third rotating member (706) is lower than that of the second rotating member (705).

In the floating-disk type brake system set forth in the present invention, the third rotating member (706) can be rotated at a low rotating speed relative to the fixed member (704), and the difference in rotating speed between the first rotating member (703) and the third rotating member (706) can be smoothly reduced to zero through the rotation of the second rotating member (705), and the first and the second floating disk assembly (720 and 721) relative to each other.

Thus, it is possible to achieve not only stabilizing braking force by suppressing the variation of coefficient of friction, but also reducing the possibility of occurrence of brake fade due to heat generated by braking, using a constant braking force for a long time, and extending the service life of the first to the third rotating member and the first and the second floating disk assembly.

According to the present invention, each of the first to the third floating disk assembly of the floating-disk type brake system includes a plurality of disks arranged coaxially in the axial direction so as to be slidable relative to each other.

In the floating-disk type brake system (700 or 750) set above, each of the first to the third floating disk assembly includes a plurality of annular members capable of sliding relative to each other.

Thus, even a large difference in rotating speed between the adjacent rotating members or between the rotating member and the fixed member can be smoothly reduced to zero.

Since a plurality of sliding frictional surfaces are interposed between the adjacent rotating members or between the rotating member and the fixed member, the shaft (702) can be still more effectively braked.

According to the present invention, the floating-disk type brake system further includes a sliding friction control means for controlling the magnitude of sliding friction between the adjacent ones of the plurality of annular members so that the adjacent ones of the annular members rotate at different rotating speeds, respectively.

In the brake system set forth in the present invention, the first rotating member (32) and the second rotating member (60) are brought into frictional engagement to brake the rotating shaft (23) by reducing the rotation of the first rotating member (32) and the second rotating member (60) relative to each other. The brake system is characterized by the plurality of annular members that bring the first and the second rotating member into frictional engagement.

The plurality of annular members (51, 52, 53 and 54) are provided with sliding friction control means for controlling the magnitude of sliding friction so that the adjacent ones of the annular members rotate at different rotating speeds, respectively.

For example, suppose that the first rotating member (32) and the second rotating member (60) rotate at 1000 rpm and 1100 rpm, respectively, and the four annular members (51, 52, 53 and 54) are interposed between the first rotating member (32) and the second rotating member (60). Then, the rotation of the four annular members (51, 52, 53 and 54) can be controlled such that the first annular member contiguous with the first rotating member (32) rotates at 1020 rpm, the second annular member rotates at 1040 rpm, the third annular rotates at 1060 rpm, and the fourth annular member contiguous with the second rotating member (60) rotates at 1080 rpm.

For example, it is possible to prevent the fixed combination of the first to the third annular member, the rotation of the fixedly combined first to the third annular member together with the first rotating member at 1000 rpm, and the rotation of the fourth annular member together with the second rotating member at 1100 rpm.

Thus, the large difference in rotating speed between the first rotating member (32) and the second rotating member (60) can be smoothly reduced to zero by the agency of the plurality of annular members.

Since the difference in rotating speed between the adjacent annular members is small, heat generation by sliding friction and abrasion of those annular members can be suppressed to the least extent.

Moreover, since the plurality of annular members can be interposed between the first rotating member (32) and the second rotating member (60), a high frictional force is available for frictionally connecting the first and the second rotating member.

According to the present invention, the sliding friction control means of the floating-disk type brake system is making the adjacent ones of the plurality of annular members (51, 52, 53 and 54) of metals respectively having different hardnesses, respectively.

In the brake system set forth in the present invention, the metals respectively forming the adjacent ones of the annular members have different hardnesses, respectively. Therefore, modes of adaptation of the annular members when the annular members are axially compressed are different, and hence the adjacent ones of the annular members are not fixedly combined and are prevented from rotation at the same rotating speed. Thus the plurality of annular members (51, 52, 53 and 54) interposed, for example, between the rotation transfer means (32) and the first disk assembly (60) can be made to rotate at different rotating speeds, respectively.

The difference in hardness between the metals of the adjacent annular members is in the range of HRC 2 to HRC 10, preferably, in the range of HRC 5 to HRC 7.

According to the present invention, the annular members respectively having comparatively high hardnesses and those respectively having comparatively low hardnesses among the plurality of annular members (51, 52, 53 and 54) of the brake system are arranged alternately.

In the brake system set forth in the present invention, the annular members respectively having comparatively high hardnesses and those respectively having comparatively low hardnesses are arranged alternately. Therefore, it is possible to prevent the fixed combination of the adjacent ones of the plurality of annular members (51, 52, 53 and 54) and the rotation of the adjacent annular members at the same rotating speed when the plurality of annular members (51, 52, 53 and 54) are interposed, for example, between the rotation transfer means (32) and the first disk assembly (60).

According to the present invention, the plurality of annular members (51, 52, 53 and 54) of the brake system are arranged in a direction in which the axis of the rotating shaft (23) extends in increasing order of hardness.

In the brake system set forth in the present invention, the plurality of annular members (51, 52, 53 and 54) are arranged in increasing order of hardness. Therefore, the plurality of annular members (51, 52, 53 and 54) can be made to rotate such that the respective rotating speeds of the plurality of annular members (51, 52, 53 and 54) change gradually from the side of the rotation transfer means (32) toward the first disk assembly (60).

According to the present invention, the sliding friction control means of the brake system is forming the adjacent ones of the plurality of annular members (51, 52, 53 and 54) in different diametrical dimensions, respectively.

In the brake system set forth in the present invention, the adjacent ones of the annular members have different outside or inside diameters, respectively, and hence respective outer or inner peripheral parts of the annular members are elastically deformed differently when the annular members are compressed with respect to the direction in which the axis of the rotating shaft (23) extends. Therefore, it is possible to prevent the fixed combination of the adjacent annular members, and the rotation of the adjacent annular members at the same rotating speed. Thus, the plurality of annular members interposed, for example, between the rotation transfer means (32) and the first disk assembly (60) can be made to rotate at different rotating speeds, respectively.

According to the present invention, the disks respectively having big diametrical dimension and those respectively having small diametrical dimensions among the plurality of annular members (51, 52, 53 and 54) of the brake system are arranged alternately.

In the brake system set forth in the present invention, the annular members having a big diametrical dimension and those having a small diametrical dimension are arranged alternately. Therefore, it is possible to prevent the fixed combination of the adjacent ones of the plurality of annular members (51, 52, 53 and 54) and the rotation of the adjacent annular members at the same rotating speed when the plurality of annular members (51, 52, 53 and 54) are interposed, for example, between the rotation transfer means (32) and the first disk assembly (60).

According to the present invention, the plurality of annular members (51, 52, 53 and 54) of the brake system are arranged in increasing order of diametrical dimension in a direction in which the axis of the rotating shaft (23) extends.

In the brake system set forth in the present invention, the annular members are arranged in increasing order of diametrical dimension. Therefore, the plurality of annular members can be made to rotate such that the respective rotating speeds of the plurality of annular members change gradually from the side of the rotation transfer means (32) toward the first disk assembly (60).

According to the present invention, the sliding friction control means of the brake system is forming the adjacent ones of the plurality of annular members (51, 52, 53 and 54) in different axial dimensions, respectively.

In the brake system set forth in the present invention, the adjacent ones of the annular members have different axial dimensions, respectively, and the annular members are elastically deformed by different magnitudes of deformation, respectively, when the annular members are compressed in the direction of the axis of the rotating shaft (23). Therefore, it is possible to prevent the fixed combination of the adjacent ones of the plurality of annular members and the rotation of the annular members at the same rotating speed, and the plurality of annular members (51, 52, 53 and 54) interposed, for example, between the rotation transfer means (32) and the first disk assembly (60) rotate at different rotating speeds, respectively.

According to the present invention, the annular members respectively having comparatively big axial dimensions and those respectively having comparatively small axial dimensions among the plurality of annular members (51, 52, 53 and 54) of the brake system are arranged alternately.

In the brake system set forth in the present invention, the annular members respectively having comparatively big axial dimensions and those respectively having comparatively small axial dimensions are arranged alternately. Therefore, it is possible to prevent the fixed combination of the adjacent ones of the plurality of annular members and the rotation of the adjacent ones of the annular members at the same rotating speed.

According to the present invention, the plurality of annular members (51, 52, 53 and 54) of the brake system are arranged in increasing order of axial dimension in the direction in which the axis of the rotating shaft (23) extends.

In the brake system set forth in the present invention, the annular members are arranged in increasing order of axial dimension. Therefore, the rotating speeds of the plurality of annular members (51, 52, 53 and 54) can be determined so as to change sequentially from the side of the rotation transfer means (32) toward the first disk assembly (60).

According to the present invention, the sliding friction control means of the brake system is forming recesses respectively having different areas in the frictional sliding surfaces of the adjacent ones of the plurality of annular members (51, 52, 53 and 54), respectively.

In the brake system set forth in the present invention, the recesses formed in the adjacent ones of the annular members have different areas, respectively. Therefore, the annular members are elastically deformed by different magnitudes of deformation when the annular members are compressed in the direction of axis of the rotating shaft (23) and, consequently, the fixed combination of the annular members and the rotation of the annular members in a unit can be prevented. For example, the annular members interposed between the rotation transfer means (32) and the first disk assembly (60) can rotate at different rotating speed, respectively.

According to the present invention, the annular members respectively provided with large recesses and those respectively provided with small recesses of the brake system are arranged alternately.

In the brake system set forth in the present invention, the annular members having frictional sliding surfaces provided with the large recesses and those having the frictional sliding surfaces provided with the small recesses are arranged alternately. Therefore, the fixed combination of the annular members and the rotation of the annular members in a unit can be prevented in a state where the plurality of annular members (51, 52, 53 and 54) are interposed, for example, between the rotation transfer means (32) and the first disk assembly (60).

According to the present invention, the plurality of annular members (51, 52, 53 and 54) of the brake system are arranged axially in increasing order of area of the recess.

In the brake system set forth in the present invention, the annular members are arranged in increasing order of the area of the recess formed in the frictional sliding surface. Therefore, the respective rotating speeds of the plurality of annular members (51, 52, 53 and 54) can be determined, for example, such that the rotating speeds of the annular members nearer to the rotation transfer means (32) are lower than those of the annular members nearer to the first disk assembly (60).

An object of the present invention is a brake system (800 or 850), for braking a wheel (14 or 852) of a transportation vehicle, including: a brake disk (806, 853 or 854) combined with the wheel for rotation together with the wheel; a pressing means (812 or 863) for pressing brake pads (813 and 814, or 864 and 865) against the brake disk; and floating disk assemblies (820 or 870) disposed coaxially with the brake disk between the brake disk and one of the brake pad and between the brake disk and the other brake pad, respectively, so as to be rotatable relative to the brake disk.

The brake system (800 or 850) set forth above is built by combining the floating disk assemblies with a disk brake for braking the wheel of an automobile, a railroad car or an airplane.

The brake disk of a generally known disk brake combined with a wheel of an automobile rotates at about 2000 rpm when the automobile travels at a running speed of 200 km/h. Therefore, the difference in rotating speed between the brake disk and the brake pad is 2000 rpm when the brake pad is brought into contact with the brake disk to brake the wheel.

In the brake system of the present invention, when the brake disk is rotating at 2000 rpm, the floating disk assembly interposed between the brake pad and the brake disk can be made to rotate at a rotating speed lower than 2000 rpm. For example, the floating disk assembly can be rotated such that the difference in rotating speed between the brake pad and the floating disk assembly is 1000 rpm and the difference in rotating speed between the brake disk and the floating disk assembly is 1000 rpm.

The quantity of heat generated in the brake pad varies in proportional to the square of the running speed of the vehicle; that is, the quantity of heat varies in proportion to the square of the rotating speed of the brake disk relative to the brake pad. Therefore, the quantity of heat generated in the brake pad can be reduced to a quarter of the quantity of heat generated when the rotating speed of the brake disk relative to the brake pad is reduced by half.

Such a reduction of the quantity of heat not only prevents fading, but also reduces the abrasion of the brake pad.

In a generally known disk brake, only the brake pad and the brake disk have frictional sliding surfaces.

On the other hand, the brake system set forth in the present invention, the brake pad, the floating disk assembly and the brake disk have frictional sliding surfaces, respectively.

Therefore, when the respective pressing means, namely, the respective hydraulically operated pistons or calipers, of the generally known disk brake and the brake system set forth in the present invention exerts a fixed pressure to the brake pads, respectively, the braking force of the brake system is twice as high as that of the generally known disk brake.

In other words, if a fixed braking force is necessary, the pressing force applied to the brake pad by the pressing means can be reduced.

Consequently, the quantity of heat generated in the brake pad can be still more reduced and the abrasion of the brake pad can be still more reduced.

The floating disk assembly included in the brake system set forth in the present invention may be the same as that included in the brake system set forth in the present invention.

A floating disk assembly of the present invention is still more effective.

According to the present invention, each of the floating disk assemblies (820 or 870) of the brake system includes at least one annular member (822, 823, 872 or 873) having opposite side surfaces, one of the opposite side surfaces facing the brake pad (813, 814, 864 or 865) of the annular member is a frictional sliding surface, and the other side surface thereof is provided with a friction member (822a, 823a, 872a or 873a) and capable of being brought into frictional engagement with a matching member.

In the brake system including the floating disk assembly set forth in the present invention, the friction member, namely, a brake lining, is interposed between the brake disk and the annular member.

Therefore, the respective rotating speeds of the annular members relative to the brake disk can be controlled by forming the friction members of the brake pad and the annular members by frictional materials having different frictional properties, respectively.

According to the present invention, the annular members (822, 823, 872 and 873) of the disk brake are arranged coaxially with the brake disk, and the friction members of the annular members nearer to the brake pad (813, 814, 864 or 865) have higher frictional properties, and those of the annular members nearer to the brake disk (806, 853 or 854) have lower frictional properties.

In the brake system set forth in the present invention, the brake disk rotates at the highest rotating speed, and the respective rotating speeds of the plurality of annular members decrease gradually toward the brake pad.

Thus, the rotation of the annular member in frictional sliding contact with the brake pad relative to the brake disk can be greatly reduced. Therefore, the quantity of heat generated in the brake disk can be reduced, and the abrasion of the brake pad can be still more reduced.

According to the present invention, the respective frictional properties of the annular members (822 and 872) in frictional sliding engagement with the brake pads (813 and 814, or 864 and 865) of the brake system are lower than that of a frictional material forming the brake pads (813 and 814, or 864 and 865).

In the brake system set forth in the present invention, the plurality of annular members interposed between the brake disk and one of the brake pads and between the brake disk and the other brake pad, respectively, can be surely rotated relative to each other by the brake pad.

According to the present invention, the brake disk (806, 853 or 854) of the floating-disk type brake system is provided with support member (821 or 871) of a self-lubricating material, and the annular members (822 and 823, or 872 and 873) are slidably put on the support means, respectively.

In the brake system the present invention, friction between the brake disk usually made of cast iron, and the inner circumferential surface of the floating disk assemblies can be reduced, and the floating disk assemblies can be smoothly rotated relative to the brake disk.

According to the present invention, the brake floating-disk type brake system further includes pressing means (826 or 874) for pressing the inner peripheral parts of the floating disk assemblies toward the brake disk.

In the brake system set forth in the present invention, the position of the floating disk assemblies (820 or 870) relative to the axis of rotation of the brake disk can be stabilized.

Thus, the floating disk assemblies (820 or 870) can be held perpendicularly to the axis of rotation and thereby brake judder that occurs when the floating disk assemblies (820 or 870) is inclined to the axis of rotation can be surely prevented.

Effect of the Invention

As apparent from the foregoing description, the brake system of the present invention can be constructed by using an existing planetary gear included in the power transmission system of a transportation machine or a machine tool as it stands, and adding the first and the second disk, and the pressing means to the planetary gear.

Since the brake system of the present invention can be built, suppressing increase of the number of parts and modification of the existing machine to the least extent, the brake system of the present invention has a wide field of application.

The brake system of the present invention brakes the rotating shaft through the frictional engagement of the two rotating elements rotating at a low relative rotating speed of the planetary gear.

Therefore, the magnitude of braking shocks and the quantity of heat generated by braking are smaller than those that may be generated when braking is achieved through the frictional engagement of the rotating shaft and a stationary member disposed near the rotating shaft.

It is possible not only to provide stable braking force by suppressing the variation of coefficient of friction due to generated heat, but also to prevent fading due to generated heat and to provide a constant braking force for a long time. Consequently, it is possible to suppress the abrasion of the first and the second disk to the least extent and to extend the life of the first and the second disk. Thus, the brake system of the present invention is excellent in braking performance.

DETAILED DESCRIPTION OF THE INVENTION

Figure 1:
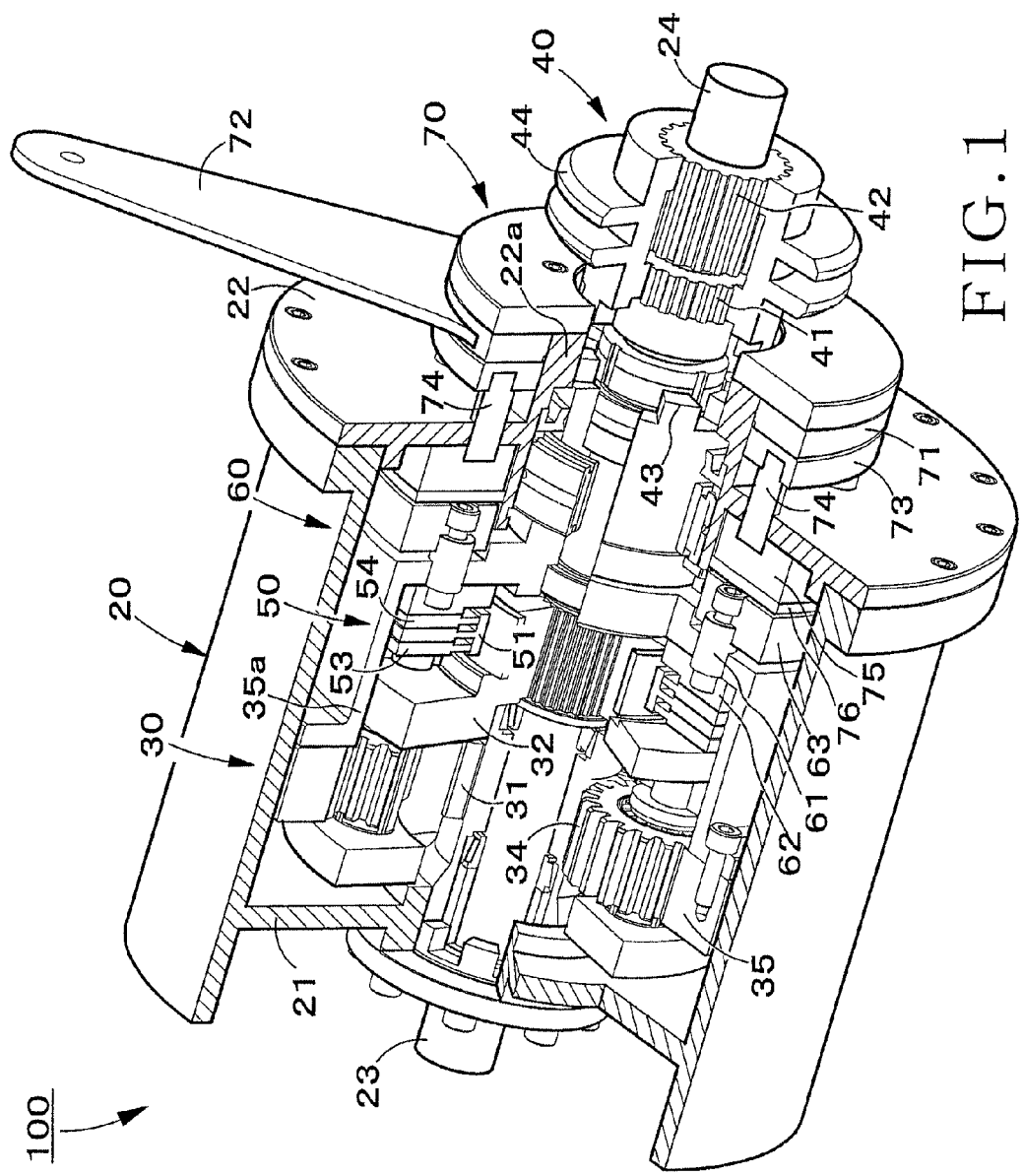
FIG. 1 is a partially cutaway perspective view of an overdrive gear including a brake system in a first embodiment according to the present invention.

Brake systems in preferred embodiments according to the present invention will be described with reference to FIGS. 1 to 32.

In the following description the same parts are designated by the same reference characters and the duplicate description thereof will be omitted, and directions parallel to a direction in which the axis of a rotating shaft 23 extends will be called axial directions.

First Embodiment

A floating-disk type brake system in a first embodiment according to the present invention will be described with reference to FIGS. 1 to 6.

A floating-disk type brake system 100 in the first embodiment shown in FIG. 1 forms an overdrive gear built in an automotive transmission. The floating-disk type brake system 100 includes a planetary gear 30 contained in a casing 20, a coupling mode selecting device 40 for changing driving force, a first floating disk assembly 50, a first disk assembly 60, and a pushing device 70. The first floating disk assembly 50 and the first disk assembly 60 bring the planet carrier and a ring gear included in the planetary gear 30 into frictional engagement. The pushing device 70 pushes the first floating disk assembly 50 and the first disk assembly 60 toward the planet carrier for frictional sliding engagement.

The planetary gear 30 has a sun gear 31 fixedly held on the bottom wall 21 of the casing (fixing means) 20 having the shape of a bottomed cylinder, a planet carrier (rotation transfer means) 32 connected to the input shaft (rotating shaft) 23, planet pinions 34 rotatably supported on the planet carrier 32 by support shafts 33, respectively, and a ring gear 35. The input shaft 23 rotates the planet carrier 32, and rotational driving force if an increased rotating speed is provided on the connecting part (driven means) 35a of the ring gear 35.

The connecting part 35a is continuous with the ring gear 35 and has a cylindrical part 35b. The cylindrical part 35b of the connecting part 35a is rotatably supported on the input shaft 23 by a bearing 36.

Figure 3:
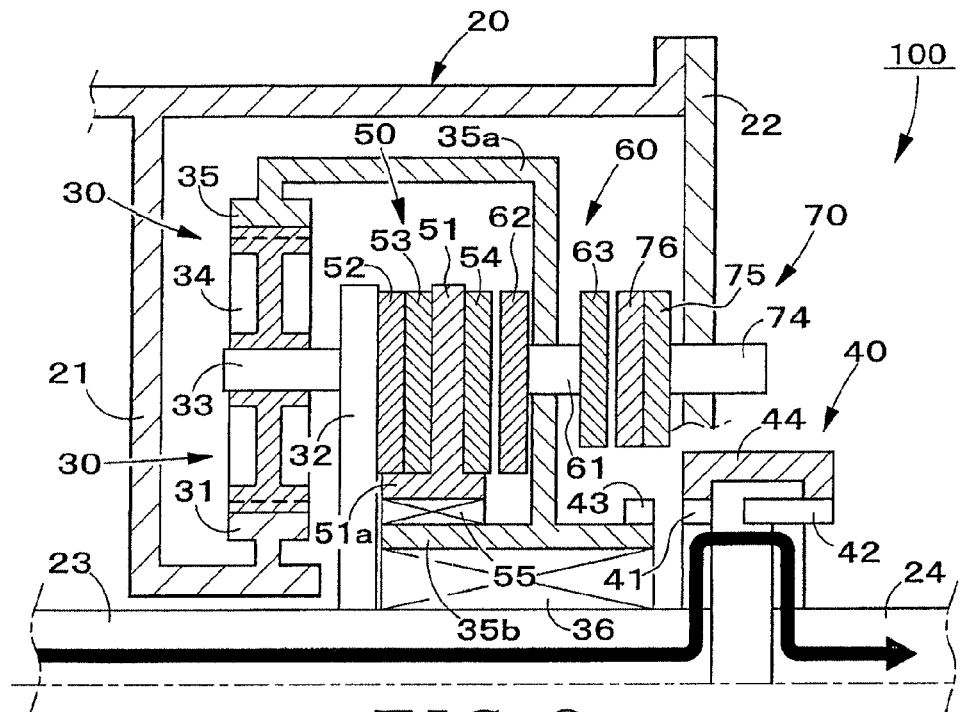
FIG. 3 is a typical sectional view of the brake system shown in FIG. 1.

Referring to FIG. 3, the coupling mode selecting device 40 includes teeth 41 formed on a rear end part of the input shaft 23, axially long teeth 42 formed on a front end part of the output shaft 24, teeth 43 formed on a rear end part of the connecting part 35a of the ring gear 35, a sleeve 44 capable of axially sliding on the teeth 41, 42 and 43, and a shifter, not shown, for axially reciprocating the sleeve 44.

Figure 5:
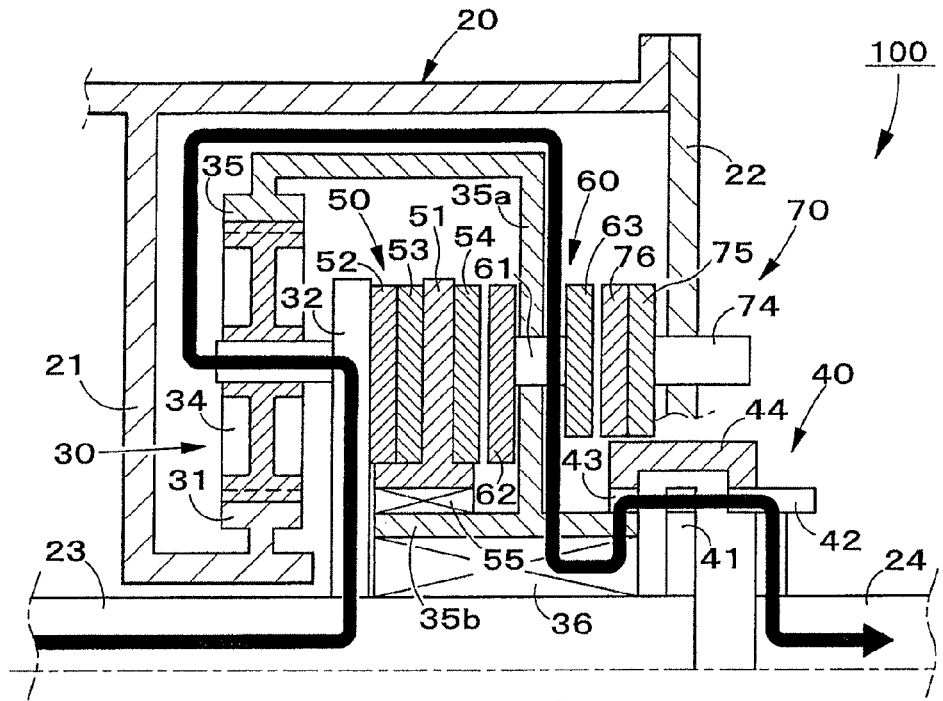
FIG. 5 is a typical sectional view of the brake system shown in FIG. 1.

The input shaft 23 and the output shaft 24 are directly coupled when the sleeve 44 extends on both the teeth 41 of the input shaft 23 and the teeth 42 of the output shaft 24 as shown in FIG. 3. Then, the output rotating speed of the planetary gear 30 is increased, and the rotational driving force applied to the input shaft 23 is transmitted directly to the output shaft 24. The output rotating speed of the planetary gear 30 is increased, and the output rotational driving force of the planetary gear 30 is transmitted to the output shaft 24 when the sleeve 44 is on the teeth 43 of the ring gear 35 and the teeth 42 of the output shaft 24 as shown in FIG. 5.

The first floating disk assembly 50 is formed by axially arranging four annular members 51, 52, 53 and 54 of substantially the same dimensions respectively having the shapes of disks as shown in FIG. 3. The annular member 51 has a cylindrical boss 51a coaxial with the input shaft 23. The annular member 51 is rotatably supported on the cylindrical boss 35b of the ring gear 35 by a bearing 55.

The other annular members 52, 53 and 54 are rotatably supported on the cylindrical boss 51a.

In FIG. 1, the annular member 52 is omitted for the sake of convenience.

The disk-like annular members 51, 52, 53 and 54 are made of a carbon steel or a Ni—Cr—Mo alloy steel, and have slightly different HRC hardnesses, respectively.

The hardnesses of the annular members 51 and 52 are in the range of HRC 56 to 59. The hardnesses of the annular members 53 and 54 are in the range of HRC 52 to 55. The annular members 51 and 52 having the higher hardnesses and the annular members 53 and 54 having the lower hardnesses are arranged axially alternately.

As shown in FIG. 3, the first disk assembly 60 includes a plurality of support shafts 61, an annular member 62 having the shape of a disk, and an annular member 63 having the shape of a thick disk. The plurality of support shafts 61 are extended through the connecting part 35a of the ring gear 35, are supported axially slidably on the connecting part 35a, and are arranged on a circle at equal angular intervals. The disk-like annular member 62 is adjacent to and coaxial with the first floating disk assembly 50, and is attached to the inner ends of the support shafts 61. The disk-like annular member 63 is coaxial with the input shaft 23 and is attached to the outer ends of the support shafts 61.

The disk-like annular members 61 and 62 are made, similarly to the first floating disk assembly 50, of a carbon steel or a Ni—Cr—Mo alloy steel and have hardnesses in the range of HRC 56 to 59, respectively.

The annular member 54 having a high hardness and the annular member 62 having a low hardness are disposed axially opposite to each other.

As shown in FIG. 1, the pushing device 70 is mounted on an end cover 22 covering the open end of the cylindrical casing 20. The pushing device 70 includes a first cam plate 71, namely, a plate-shaped annular member, a lever 72, a second cam plate 73. The first cam plate 71 and the second cam plate 73 are rotatably supported coaxial with the input shaft 23 on a cylindrical boss 22a continuous with the end cover 22. The lever 72 is connected to the outer circumference of the first cam plate 71 so as to extend outward in a radial direction.

The second cam plate 73 is shifted toward the end cover 22 when the lever 72 is turned by hand or by an electrical servo-mechanism. Consequently, a plurality of push rods 74 extending from the side surface of the second cam plate 73 through the end cover 22 advance into the casing 20.

Then, an annular member 75 having the shape of a thick disk and attached to the inner ends of the push rods 74 coaxially with the input shaft 23 is shifted toward the first disk assembly 60, and an annular member 76 having the shape of a thick disk and attached to the inner side surface of the annular member 75 is brought into sliding contact with the annular member 76 of the first disk assembly 60.

In the following description, the combination of the annular members 75 and 76 will be referred to as "second disk assembly".

The annular member 76 is made, similarly to the first floating disk assembly 50, of a carbon steel or a Ni—Cr—Mo alloy steel and has a hardness in the range of HRC 52 to 55.

The annular member 63 having a higher hardness and the annular member 76 having a lower hardness are disposed axially opposite to each other.

The operation of the brake system (overdrive gear) 100 in the first embodiment will be described with reference to FIGS. 2 to 6.

Figure 2:
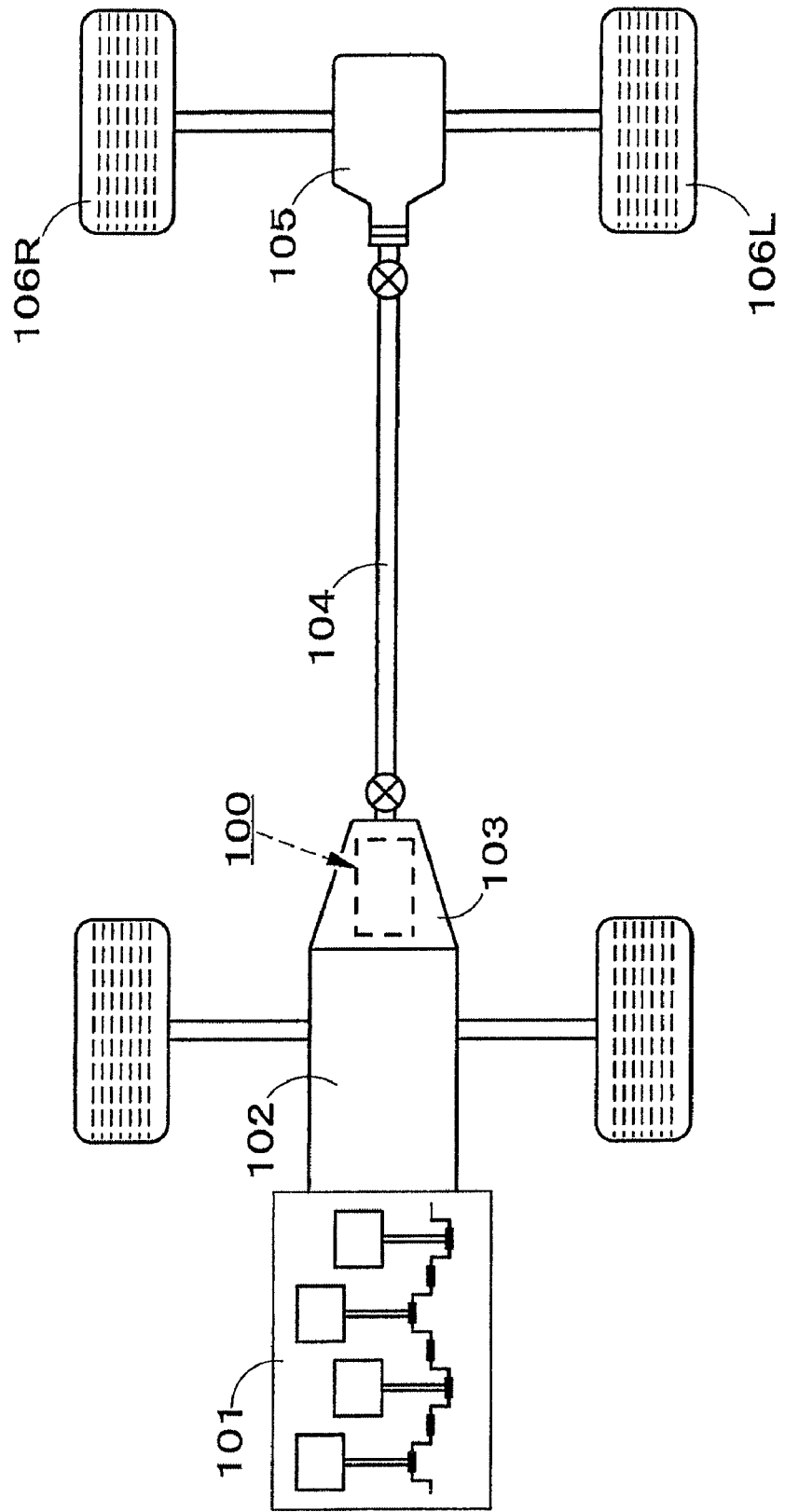
FIG. 2 is a typical view of a power transmission system of an automobile including the overdrive gear shown in FIG. 1.

Referring to FIG. 2, a transmission 102 changes the input rotating speed. The transmission 102 carries the output driving force of an engine 101 mounted on a vehicle to the brake system (overdrive gear) 100 in the first embodiment installed in a transfer case 103. The driving force is transmitted through the brake system (overdrive gear) 100 to a propeller shaft 104.

A final reduction gear unit 105 reduces the output rotating speed and transmits the rotational driving force to the propeller shaft 104. The rotational driving force is distributed to a right driving wheel 106R and a left driving wheel 106L by a differential gear mechanism, not shown, included in the final reduction gear unit 105.

When the sleeve 44 of the coupling mode selecting device 40 is on both the teeth 41 of the input shaft 23 and the teeth 42 of the output shaft 24 as shown in FIG. 3, the rotational driving force carried by the transmission 102 is transmitted from the input shaft 23 through the output shaft 24 directly to the propeller shaft 104 (direct drive mode).

When the sleeve 44 of the coupling mode selecting device 40 is on both the teeth 43 of the ring gear 35 and the teeth 42 of the output shaft 24 as shown in FIG. 5, the planetary gear 30 raises the output rotating speed and transmits the output rotational driving force of the transmission 102 to the output shaft 24 (overdrive mode).

While the accelerator pedal of the vehicle is not operated and the vehicle is coasting by inertia, the driving wheels 106R and 106L rotationally drives the output shaft 24 through the final reduction gear unit 105 and the propeller shaft 104.

Figure 4:
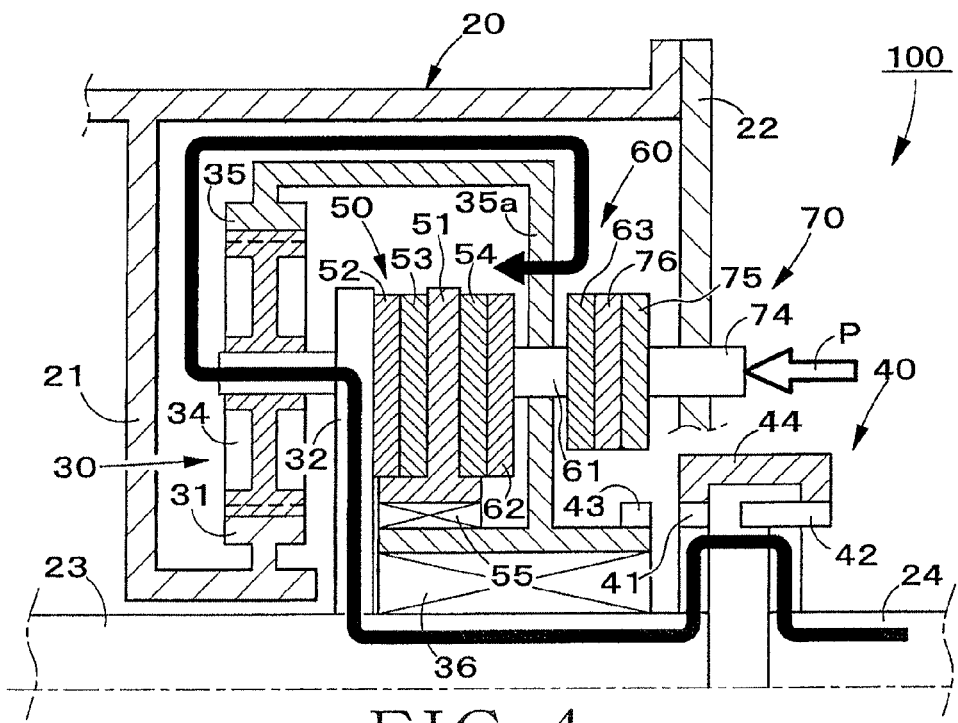
FIG. 4 is a typical sectional view of assistance in explaining the operation of the brake system shown in FIG. 1.

The input shaft 23 drives the planet carrier 32 for rotation when the input shaft 23 and the output shaft 24 are directly coupled by the coupling mode selecting device 40 as shown in FIG. 4. Then, the planet carrier 32, and the connecting part 35*a* of the ring gear 35 rotate relative to each other and, at the same time, the end cover 22 of the casing 20, and the connecting part 35*a* of the ring gear 35 rotate relative to each other.

Figure 6:
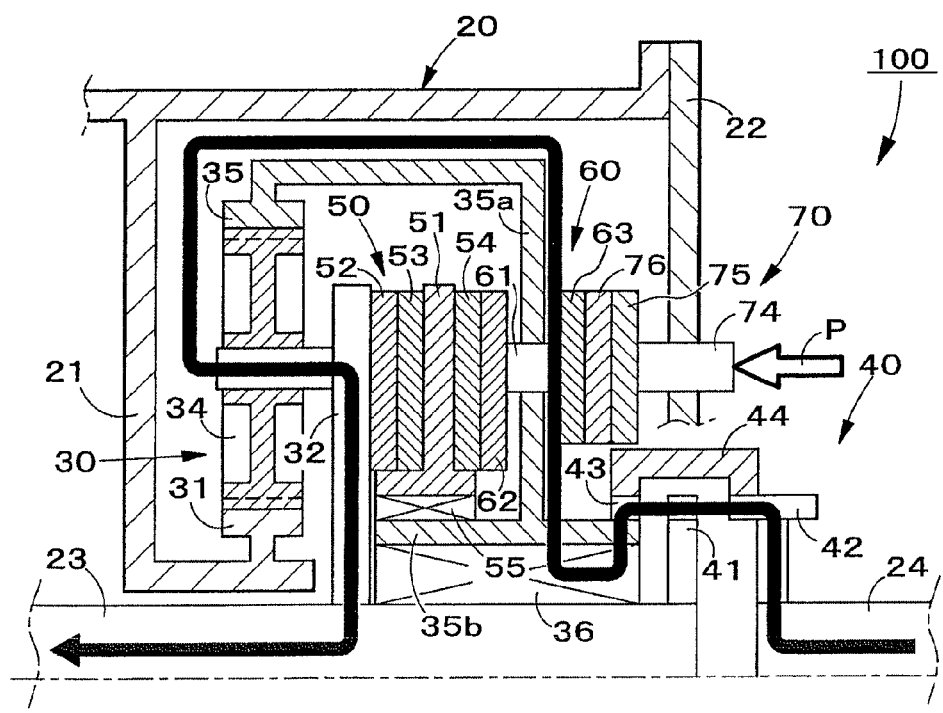
FIG. 6 is a typical sectional view of assistance in explaining the operation of the brake system shown in FIG. 1.

The output shaft 24 drives the ring gear 35 for rotation when the connecting part 35*a* of the ring gear 35, and the output shaft 24 are connected by the coupling mode selecting device 40 as shown in FIG. 6. Consequently, the connecting part 35*a* of the ring gear 35, and the planet carrier 32 rotate relative to each other and, at the same time, the end cover 22 of the casing 20, and the connecting part 35*a* of the ring gear 35 rotate relative to each other.

When the lever 72 of the pushing device 70 is turned to advance the push rods 74 into the casing 20 in this state, the second annular members 75 and 76 press the first disk assembly 60 and the first floating disk assembly 50 toward the planet carrier 32.

Consequently, the first disk assembly 60 rotating together with the connecting part 35*a* of the ring gear 35, the first floating disk assembly 50, and the planet carrier 32 are brought into frictional sliding engagement. Then, the connecting part 35*a* of the ring gear 35 and the planet carrier 32 are brought into frictional engagement and the rotation of the ring gear 35 and the planet carrier 32 relative to each other is suppressed.

At the same time, the first disk assembly 60 rotating together with the connecting part 35*a* of the ring gear 35, and the stationary second disks 75 and 76 supported on the end cover 22 of the casing 20 are brought into frictional sliding engagement. Consequently, the connecting part 35*a* of the ring gear 35, and the casing 20 are frictionally engaged, and the rotation of the sun gear 31 attached to the casing 20, and the ring gear 35 relative to each other is suppressed.

Thus, the rotation of the sun gear 31, the planet carrier 32 and the ring gear 35 relative to each other is retarded. Therefore, the input shaft 23 connected to the planet carrier 32, and the connecting part 35*a* of the ring gear 35 are unable to rotate relative to the casing 20, and the input shaft 23 and the ring gear 35 are braked.

Consequently, the right driving wheel 106R and the left driving wheel 106L are braked through the input shaft 23 or the output shaft 24 connected to the connecting part 35*a* of the ring gear 35, the propeller shaft 104, and the final reduction gear unit 105.

The floating-disk type brake system 100 in the first embodiment is capable of functioning as a direct-drive gear or an overdrive gear when the right driving wheel 106R and the left driving wheel 106L are driven by the output rotational driving force of the engine 101.

While the vehicle is coasting, the lever 72 of the pushing device 70 is operated to make the brake system 100 function as a braking mechanism for braking the driving wheels 106R and 106L.

The driving wheels 106R and 106L are connected to the output shaft 24 through the final reduction gear unit 105.

Therefore, the braking force generated by the brake system 100 is multiplied by the reduction ratio of the final reduction gear unit 105 in the range of 1:3 to 1:10, and the driving wheels 106R and 106L are braked by the high multiplied braking force.

The braking force generated by the brake system 100 is distributed equally to the driving wheels 106R and 106L by the differential gear mechanism built in the final reduction gear unit 105.

Since the driving wheels 106R and 106L can be baked by the single brake system 100, brake systems individually incorporated into the driving wheels 106R and 106L can be omitted.

The brake system 100 in the first embodiment utilizes the overdrive planetary gear 30 originally built in the transfer case 103 of an FR vehicle (front-engine rear-wheel drive vehicle). Therefore, the brake system 100 needs a very small number of additional parts.

Since the parts including the first floating disk assembly 50 are disposed in a vacant space available in the transfer case 103, the modification of the FR vehicle can be limited to the least extent.

In a direct-drive mode where the input shaft 23 is rotationally driven by the driving wheels 106R and 106L, the difference in rotating speed between the planet carrier 32, and the connecting part 35a of the ring gear 35 increases.

Since the first floating disk assembly 50 includes the axially arranged plurality of annular members 51, 52, 53 and 54, and the annular members 51, 52, 53 and 54, and the annular member 62 having high hardnesses and low hardnesses are arranged axially alternately.

Therefore, when the annular members 51, 52, 53 and 54, and the annular member 62 are pushed toward the planet carrier 32 and are axially compressed by the pushing device 70, the adjacent ones of those annular members differ from each other in adaptability. Therefore, the adjacent ones of those annular members will not be fixedly combined, will not rotate at the same rotating speed, and will rotate at different rotating speeds, respectively.

Thus, the first floating disk assembly 50 and the first disk assembly 60 can reduce the large difference in rotating speed between the planetary carrier 32, and the connecting part 35a of the ring gear 35 smoothly to zero.

Since the quantity of heat generated by friction between the annular members is small, the quantity of heat generated by both the first floating disk assembly 50 and the first disk assembly 60 is small.

Moreover, since many frictional sliding surfaces are added to the space between the connecting part 35a of the ring gear 35, and the planet carrier 32, friction force for bringing the connecting part 35a of the ring gear 35, and the planet carrier 32 into frictional engagement can be increased.

The adjacent ones of the annular members 51, 52, 53 and 54 of the first embodiment have slightly different hardnesses, respectively to prevent the fixed combination of the annular members 51, 52, 53 and 54 and to make the annular members 51, 52, 53 and 54 rotate at different rotating speeds, respectively.

The plurality of annular members may be arranged in increasing or decreasing order of hardness.

Means for achieving such an object of the present invention is not only forming the plurality of annular members of materials having different hardnesses, respectively.

The annular members 51, 52, 53 and 54 may be formed in different outside diameters and the annular members having big diameters and those having small diameters may be alternately arranged to achieve the object.

When the annular members 51, 52, 53, 54 and 62 are slidably supported by their outer circumferences, the annular members 51, 52, 53, 54 and 62 are formed in different inside diameters, respectively, and the annular members having big inside diameters among the annular members 51, 52, 53, 54 and 62, and those having small diameters are arranged alternately.

The annular members 51, 52, 53, 54 and 62 may be arranged in increasing or decreasing order of outside diameter.

In such a case, the outer or the inner peripheral parts of the annular members 51, 52, 53, 54 and 62 are elastically deformed by different magnitudes, respectively, when the annular members 51, 52, 53, 54 and 62 are pushed toward the planet carrier 32 and axially compressed by the pushing device 70. Therefore, the adjacent ones of the annular members 51, 52, 53, 54 and 62 will not be fixedly combined and will rotate at different rotating speeds, respectively.

The annular members 51, 52, 53, 54 and 62 may be formed in different axial dimensions, namely, thicknesses, respectively, and the annular members having big thicknesses among the annular members 51, 52, 53, 54 and 62, and those having small thicknesses may be alternately arrange to achieve the object of the present invention.

The annular members 51, 52, 53, 54 and 62 may be arranged in increasing or decreasing order of axial dimension.

In such a case, the annular members 51, 52, 53, 54 and 62 are elastically deformed by different magnitudes, respectively, when the annular members 51, 52, 53, 54 and 62 are pushed toward the planet carrier 32 and axially compressed by the pushing device 70. Therefore, the adjacent ones of the annular members 51, 52, 53, 54 and 62 will not be fixedly combined and will rotate at different rotating speeds, respectively.

The annular members 51, 52, 53, 54 and 62 may be provided in their frictional sliding surfaces with recesses, and the annular members provided with the recesses of large areas and those provided with the recesses of small areas may be disposed adjacently to achieve the object of the present invention.

The recesses formed in the frictional sliding surfaces of the annular members 51, 52, 53, 54 and 62 are such as circular dimples formed in the circumference of a golf ball. However, the recesses are not limited to circular ones, and may be elliptic ones, oval ones, rectangular ones or long grooves.

The areas of the recesses are measured areas of the recesses formed on the frictional sliding surfaces of the annular members.

Parts of the annular members 51, 52, 53, 54 and 62 surrounding the recesses of the annular members 51, 52, 53, 54 and 62 are elastically deformed by different magnitudes, respectively, when the annular members 51, 52, 53, 54 and 62 are pushed toward the planet carrier 31 and axially compressed by the pushing device 70. Therefore, the adjacent ones of the annular members 51, 52, 53, 54 and 62 will not be fixedly combined and will rotate at different rotating speeds, respectively.

The annular members 51, 52, 53, 54 and 62 may be axially arranged in increasing or decreasing order of overall area of recesses.

Second Embodiment

Figure 7:
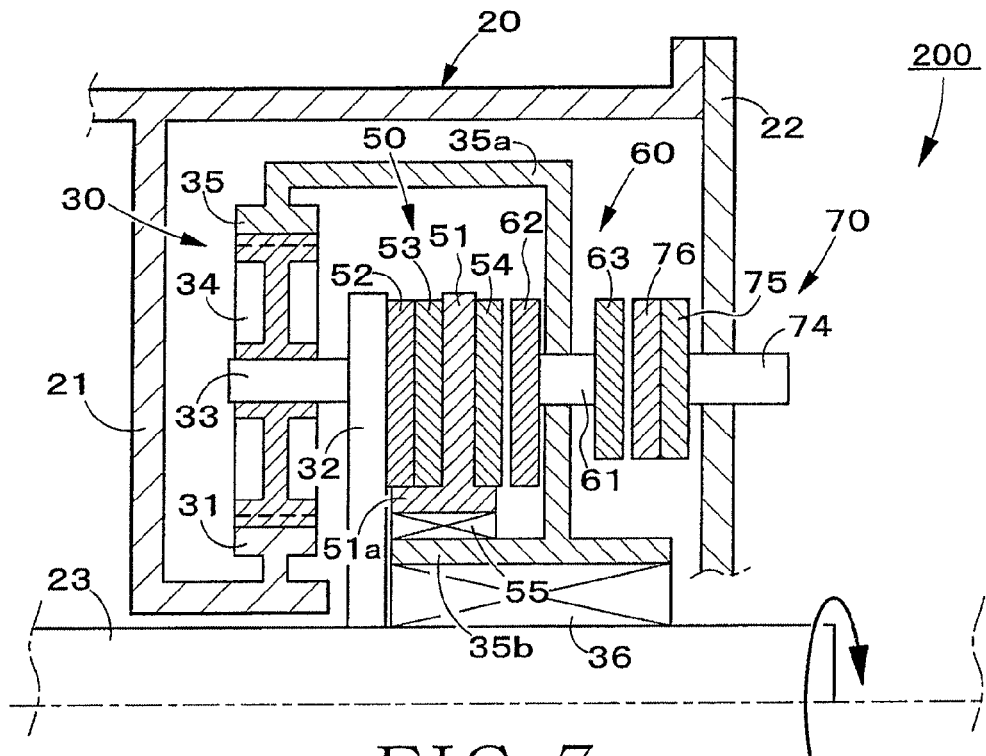
FIG. 7 is a typical sectional view of a brake system in a second embodiment according to the present invention.
Figure 8:
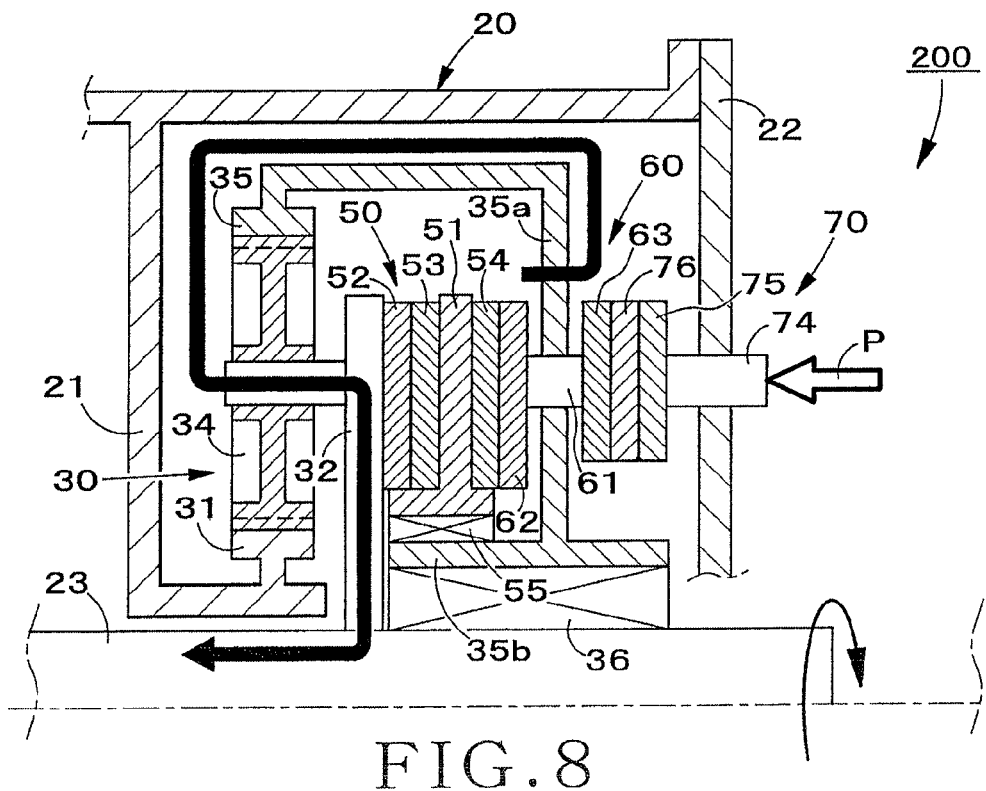
FIG. 8 is a typical sectional view of assistance in explaining the operation of the brake system in the second embodiment.

A floating-disk type brake system 200 in a second embodiment according to the present invention will be described with reference to FIGS. 7 and 8.

The floating-disk type brake system 100 in the first embodiment is placed in a power transmission train between the engine 101 and the driving wheels 106R and 106L.

The floating-disk type brake system 200 in the second embodiment is combined with a rotating shaft 23 to brake the rotating shaft 23.

It is desired to brake a rotating shaft included in a machine tool or a test machine or to apply a desired braking torque to the rotating shaft.

The floating-disk type brake system 200 in the second embodiment is identical in construction with the floating-disk type brake system 100 in the first embodiment, except that the former is not provided with the coupling mode selecting device 40. The rotating shaft can be braked or a desired braking torque can be applied to the rotating shaft 23 by operating a pushing device 70 included in the floating-disk type brake system 200.

A first floating disk assembly 50 is formed by axially arranging four annular members 51, 52, 53 and 54. The difference in rotating speed between the adjacent ones of the annular members 51, 52, 53 and 54 is small, and the adjacent ones of the annular members 51, 52, 53 and 54 slide relative to each other. Therefore, a comparatively small quantity of heat is generated in the first floating disk assembly 50.

Since the annular members 51, 52, 53 and 54 are lubricated by oil for lubricating a planetary gear 30, the annular members 51, 52, 53 and 54 will not be overheated even if the annular members 51, 52, 53 and 54 are operated continuously for a long time.

Since many frictional sliding surfaces are formed between the connecting part 35a of a ring gear 35, and a planet carrier 32, the floating-disk type brake system 200 having simple, small construction can apply a high braking force to the rotating shaft 23.

Moreover, a desired braking torque can be accurately applied to the rotating shaft 23 through the fine adjustment of force exerted by a pushing device 70 on the annular members 51, 52, 53 and 54, and an annular member 62 to push the annular members 51, 52, 53, 54 and 62 in the axial direction.

The floating-disk type brake system 200 in the second embodiment is suitable for use as a brake system for braking the rotating axis of a machine tool which is frequently rotated and frequently braked, as a brake system for a test machine that is required to reduce a high torque continuously to zero, such as a torque testing machine for testing a high-power engine for an F1 racing car, and a brake system to be incorporated into a running motor for the Sinkansen.

First Modification

A floating-disk type brake system 210 in a first modification of the floating-disk type brake system 200 in the second embodiment will be described with reference to FIG. 9.

In the planetary gear 30 of the floating-disk type brake system 200 in the second embodiment, the sun gear 31 is restrained from rotation, the planet carrier (rotation transfer means) 32 is connected to the rotating shaft 23 so as to rotate together with the rotating shaft 23, and the plurality of planet pinions 34 supported by the support shafts 33 on the planet carrier 32 are rotated to raise the output rotating speed. Consequently, the connecting part (driven means) 35a of the ring gear 35 rotates at a raised rotating speed.

The first disk assembly 60 is supported on the connecting part 35a of the ring gear 35. Therefore, the first disk assembly 60 rotates at a rotating speed higher than that of the rotating shaft 23.

The rotating speed of the first disk assembly 60 drops comparatively sharply when the first disk assembly 60 and the second annular members 75 and 76 are brought into frictional engagement by operating the pushing device 70. Thus, the brake system 200 exhibits a sensitive braking property for braking the rotating shaft 23.

A planetary gear 30A included in the floating-disk type brake system 210 in the first modification includes a sun gear 31 restrained from rotation, a ring gear 35 having a connecting part 35c connected to a rotating shaft 23 to drive the ring gear 35 for rotation by the rotating shaft 23, and a planet carrier 32 having a cylindrical boss (driven part) 32a rotatably supported on the rotating shaft 23 by a bearing 37.

The first disk assembly 60 is supported on the connecting part 35a of the ring gear 35 to rotate the first disk assembly 60 at a rotating speed equal to that of the rotating shaft 23.

The difference in rotating speed between the first disk assembly 60, and the second disks 75 and 76 of the floating-disk type brake system 210 in the first modification is smaller than that in the floating-disk type brake system 200 in the second embodiment.

Therefore, when the first disk assembly, and the second disks 75 and 76 are brought into frictional engagement by operating the pushing device 70, the rotating speed of the first disk assembly 60 of the floating-disk type brake system 210 decreases more gradually than that of the first disk assembly 60 of the floating-disk type brake system 200 in the second embodiment. Thus, the floating-disk type brake system 210 exhibits a moderate braking property for braking the rotating shaft 23.

Second Modification

A planetary gear 30B included in a floating-disk type brake system 220 in a second modification of the floating-disk type brake system 200 includes support shafts 33 supporting plane pinions 34 and restrained from revolution around the rotating shaft 23, a ring gear 35 having 35 having a connecting part 35c connected to the rotating shaft 23 so that the rotating shaft 23 drives the ring gear 35 for rotation, a sun gear 31 having a cylindrical boss (driven means) 31a rotatably supported on the rotating shaft 23 by a bearing 38.

A first disk assembly 60 is supported n a connecting part 35a of the ring gear 35. Thus, the first disk assembly 60 rotates at a rotating speed equal to that of the rotating shaft 23.

Therefore, when the first disk assembly 60, and the second disks 75 and 76 are brought into frictional engagement by operating the pushing device 70, the rotating speed of the first disk assembly 60 of the floating-disk type brake system 220 decreases in the same mode as that of the first disk assembly 60 of the floating-disk type brake system 210 in the second modification. Thus, the floating-disk type brake system 220 exhibits a moderate braking property for braking the rotating shaft 23.

Third Modification

Figure 11:
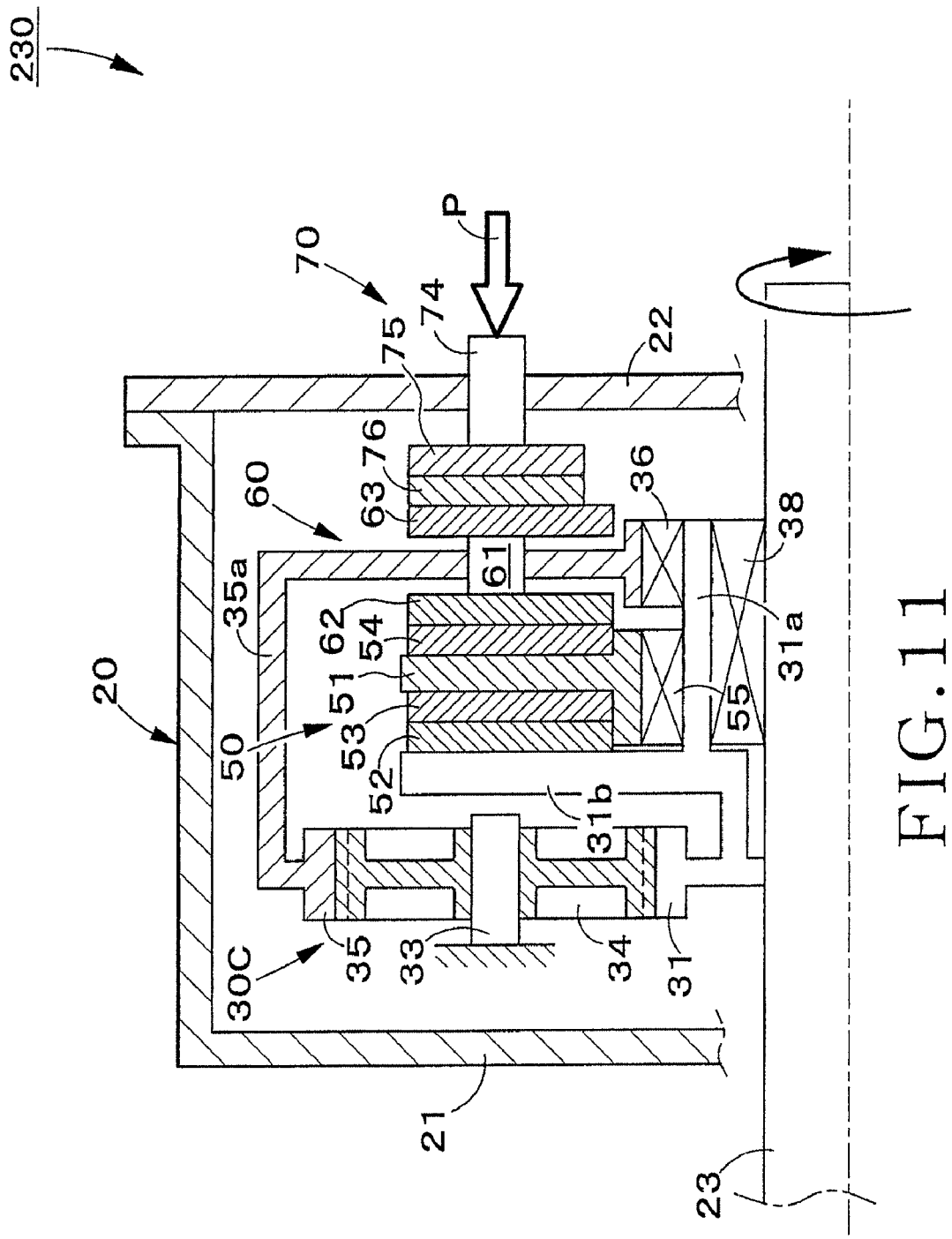
FIG. 11 is a typical sectional view of a brake system in a third modification of the brake system in the second embodiment.

A planetary gear 30C included in a floating-disk type brake system 230 in a third modification of the floating-disk type brake system 200 in the second embodiment includes support shafts 33 supporting planet pinions 34 and restrained from revolution around the rotating shaft 23, a sun gear 31 having a boss 31a and connected to the rotating shaft 23 so as to be rotated by the rotating shaft 23, and a ring gear 35 having a connecting part (driven means) 35a rotatably supported on the boss 31a of the sun gear 31, as shown in FIG. 11.

A first disk assembly 60 is supported on the connecting part 35a of the ring gear 35. Thus, the first disk assembly rotates at a low rotating speed in a rotating direction opposite the rotating direction of the rotating shaft 23.

When the first disk assembly 60, and the disks 75 and 76 are brought into frictional engagement by operating a pushing device 70, the rotating speed of the first disk assembly 60 decreases more gradually that those of the first disk assemblies 60 of the floating-disk type brake system 210 in the first modification and the floating-disk type brake system 220 in the second modification. Thus, the floating-disk type brake system 230 exhibits a still more moderate braking property for braking the rotating shaft 23.

Fourth Modification

Figure 12:
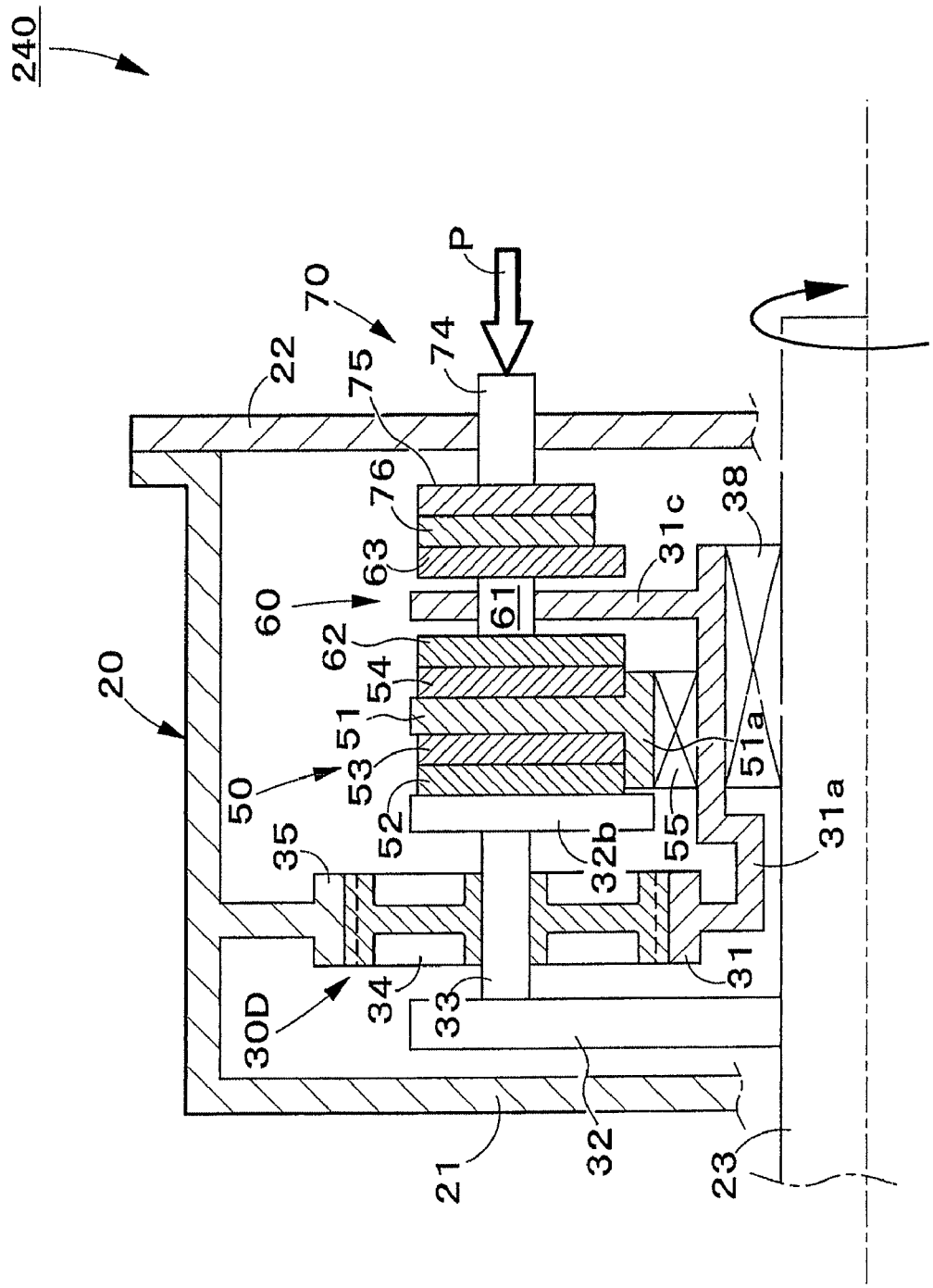
FIG. 12 is a typical sectional view of a brake system in a fourth modification of the brake system in the second embodiment.

A planetary gear 30D included in a floating-disk type brake system 240 in a fourth modification of the floating-disk type brake system 200 includes a ring gear 35 restrained from rotation, a planet carrier (rotation transfer means) 32 connected to the rotating shaft 23 so as to rotate together with the shaft 23, planet pinions 34 rotatably supported by support shafts 33 on the planet carrier 32, and a sun gear 31 having a connecting part (driven means) 31a. The planet pinions 34 are driven for rotation to raise the output rotating speed of the connecting part 31a of the sun gear 31, as shown in FIG. 12.

A first disk assembly 60 is supported on the connecting part 31a of the sun gear 31. Thus, the first disk assembly 60 rotates at a rotating speed considerably higher than that of the rotating shaft 23.

When the first disk assembly, and the disks 75 and 76 are brought into frictional engagement by operating a pushing device 70, the rotating speed of the first disk assembly 60 drops more sharply than that of the first disk assembly 60 of the floating-disk type brake system 200 in the second embodiment. Thus, the floating-disk type brake system 240 exhibits a still more sensitive braking property for braking the rotating shaft 23.

Fifth Modification

Figure 13:
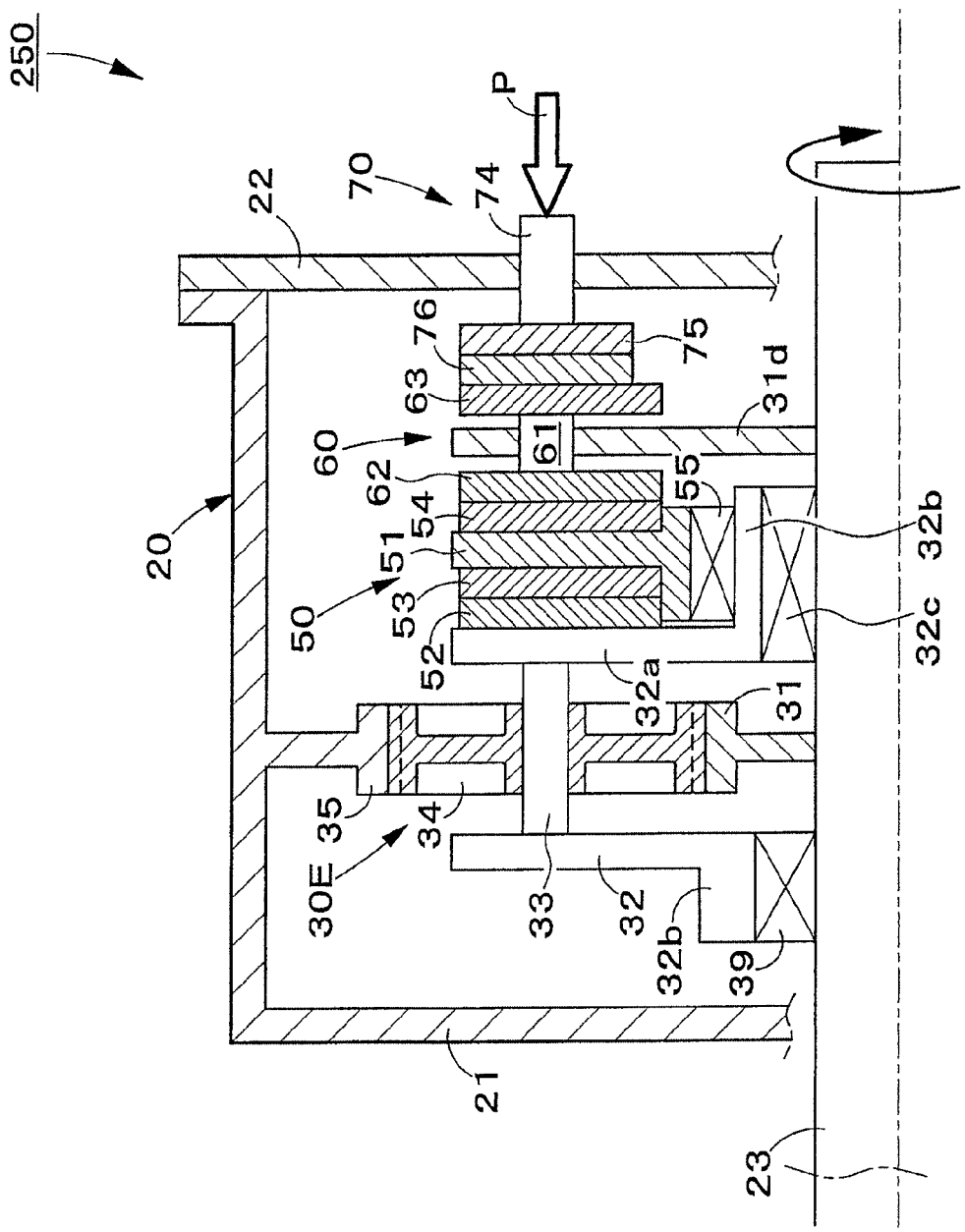
FIG. 13 is a typical sectional view of a brake system in a fifth modification of the brake system in the second embodiment.

A planetary gear 30E included in a floating-disk type brake system 250 in a fifth modification of the floating-disk type brake system 200 in the second embodiment includes a ring gear 35 restrained from rotation, a sun gear 31 having a connecting part 31a connected to the rotating shaft 23 so as to be rotated by the rotating shaft 23, a plane carrier (driven means) 32 rotatably supported on the rotating shaft 23 by a bearing 39, as shown in FIG. 13.

A first disk assembly 60 is supported on a second connecting part 31d connected to the rotating shaft 23 so that the first disk assembly 60 rotates at a rotating speed equal to that of the rotating shaft 23.

When the first disk assembly, and the second disks 75 and 76 are brought into frictional engagement by operating a pushing device 70, the rotating speed of the first disk assembly 60 of the floating-disk type brake system 250 decreases in the same mode as those of the first disk assemblies 60 of the floating-disk type brake system 210 in the second modification and the floating-disk type brake system 220 in the second modification. Thus the floating-disk type brake system 250 exhibits a moderate braking property for braking the rotating shaft 23.

Third Embodiment

A floating-disk type brake system 300 in a third embodiment according to the present invention will be described with reference to FIG. 14.

The floating-disk type brake system 300 in the third embodiment includes, in addition to components identical with those of the floating-disk type brake system 200 in the second embodiment, a second floating disk assembly 80 interposed between the first disk assembly 60, and the second disks 75 and 76.

The second floating disk assembly 80 is the same in construction as the first floating-disk assembly 50. The second floating disk assembly 80 includes axially arranged four disk-shaped annular members 81, 82, 83 and 84 respectively having substantially the same dimensions. The annular member 81 has a cylindrical boss 81a rotatably supported on the boss 35b of the ring gear 35 by a bearing 85.

The other annular members 82, 83 and 84 are rotatably supported on the cylindrical boss 81a.

Metals forming the annular members 81, 82, 83 and 84 and the respective hardnesses of the metals are the same as those of the first floating disk assembly 50.

When lever 72 of the pushing device 70 is operated to advance the push rods 74 into the casing 20, the second disks 75 and 76 press the second floating disk assembly 80, the first disk assembly 60 and the first floating disk assembly 50 against a planet carrier 32 included in a planetary gear 30.

Consequently, sliding friction is generated in the first disk assembly 60 rotating together with the boss 35a of the ring gear 35, and the first floating disk assembly 50, and between the first floating disk assembly 50 and the planet carrier 32. Thus, the connecting part 35a of the ring gear 35, and the planet carrier 32 are frictionally engaged. Consequently, the difference in rotating speed between the ring gear 35 and the planet carrier 32 is reduced.

In the meantime, sliding friction is generated in the first disk assembly 60 rotating together with the connecting part 35a of the ring gear 35, the second floating disk assembly 80, and the second disks 75 and 76 held on and restrained from rotation by the end cover 22 of the casing 20. Therefore, the connecting part 35a of the ring gear 35, and the casing 20 are frictionally engaged, and the ring gear 35 rotating relative to the ring gear 35 is braked.

Thus, difference in rotating speed among the sun gear 31, the planet carrier 32, and the ring gear 35 are reduced. Consequently, the rotating shaft 23 connected to the planet carrier 32 is braked and restrained from rotation relative to the casing 20.

Meanwhile, the plurality of axially arranged disk-shaped annular members 81, 82, 83 and 84 of the second floating disk assembly 80 rotate at low rotating speeds, respectively, relative to each other. Therefore, a small quantity of heat is generated in the second floating disk assembly 80.

Since the annular members 81, 82, 83 and 84 are lubricated by oil for lubricating the planetary gear 30, the annular members 81, 82, 83 and 84 will not be overheated even if the annular members 81, 82, 83 and 84 are operated continuously for a long time.

Moreover, since many frictional sliding surfaces are formed in the space between the first disk assembly 60, and the second disks 75 and 76, a high braking torque can be applied to the rotating shaft 23.

Floating-disk type brake systems in modifications of the floating-disk type brake system 300 will be described with reference to FIGS. 15 to 19.

First Modification

Figure 15:
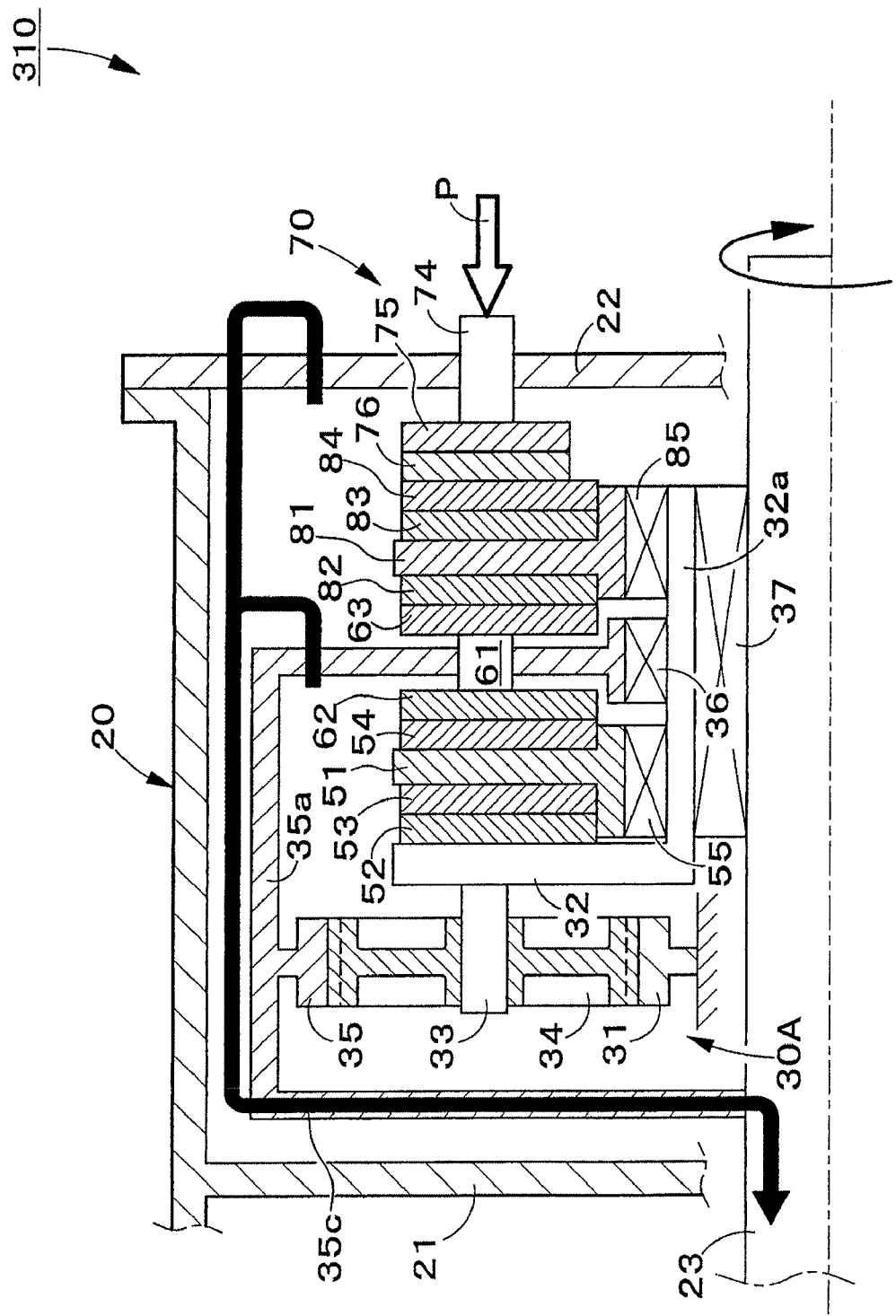
FIG. 15 is a typical sectional view of a brake system in a first modification of the brake system in the third embodiment.

Referring to FIG. 15, a floating-disk type brake system 310 in a first modification of the floating-disk type brake system 300 differs from the floating-disk type brake system 300 in the third embodiment in that the ring gear 35 is connected to the rotating shaft 23 so as to rotate together with the rotating shaft 23, and the planet carrier 32 is rotatable relative to the rotating shaft 23.

A second connecting part (connecting means) 35c formed integrally with the ring gear 35 is connected to the rotating shaft 23, and the ring gear 35 rotates together with the rotating shaft 23.

A cylindrical boss 32a is formed integrally with the planet carrier 32 and coaxially with the rotating shaft 23. The cylindrical boss 32a is rotatably supported on the rotating shaft 23 by a bearing 37.

The connecting part 35a of the ring gear 35, the first floating disk assembly 50, and the second floating disk assembly 80 are supported on the cylindrical boss 32a of the planet carrier 32 by bearings 36, 55 and 85, respectively.

The floating-disk type brake system 310, similarly to the floating-disk type brake system 300, can brake the rotating shaft 23 by operating the lever 72 of the pushing device 70 to press the second disks 75 and 76, the second floating disk assembly 80, the first floating disk assembly 60 and the first floating disk assembly 50 against the planet carrier 32 so that those elements are in frictional sliding engagement with each other.

Second Modification

Figure 16:
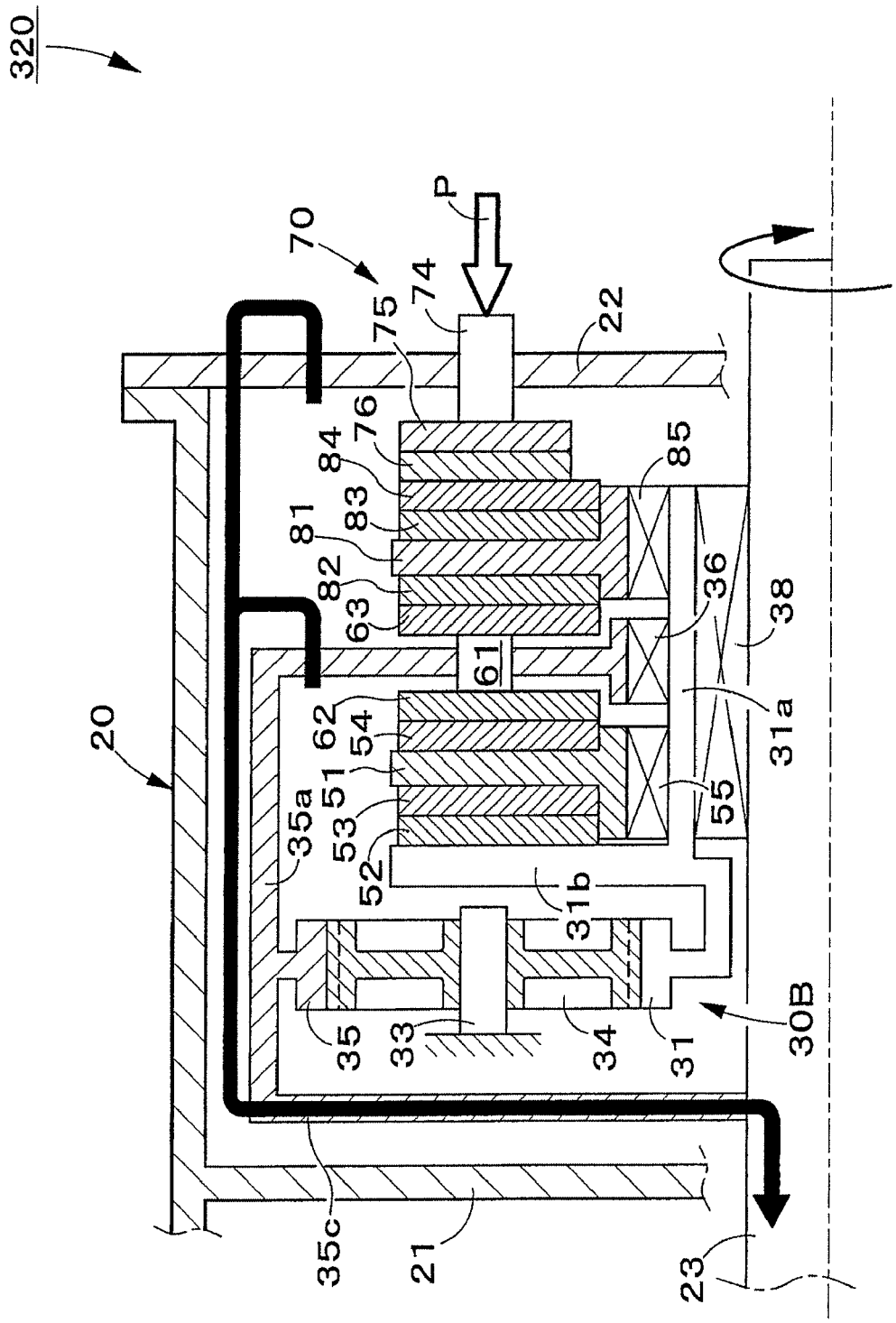
FIG. 16 is a typical sectional view of a brake system in a second modification of the brake system in the third embodiment.

Referring to FIG. 16, a floating-disk type brake system 320 in a second modification of the floating-disk type brake system 300 differs from the floating-disk type brake system 310 in the first modification in that the support shafts 33 supporting the planet pinions 34 are fixed to the casing 20, and the sun gear 31 is rotatable relative to the rotating shaft 23.

A cylindrical boss 31a formed integrally with the sun gear 31 and coaxial with the rotating shaft 23 is supported on the rotating shaft 23 by a bearing 38.

A disk-line wall 31b having a shape identical with the planet carrier 32 of the brake system 310 in the first modification is formed integrally with the sun gear 1.

The connecting part 35a of the ring gear 32, the first floating disk assembly 50, and the second floating disk assembly 80 are rotatably supported on the cylindrical boss 31a of the sun gear by bearings 36, 55 and 85, respectively.

The floating-disk type brake system 320, similarly to the floating-disk type brake system 300, can brake the rotating shaft 23 by operating the lever 72 of the pushing device 70 to press the second disks 75 and 76, the second floating disk assembly 80, the first floating disk assembly 60 and the first floating disk assembly 50 against the disk-like wall 31b of the sun gear 31 so that those elements are in sliding engagement with each other.

Third Modification

Figure 17:
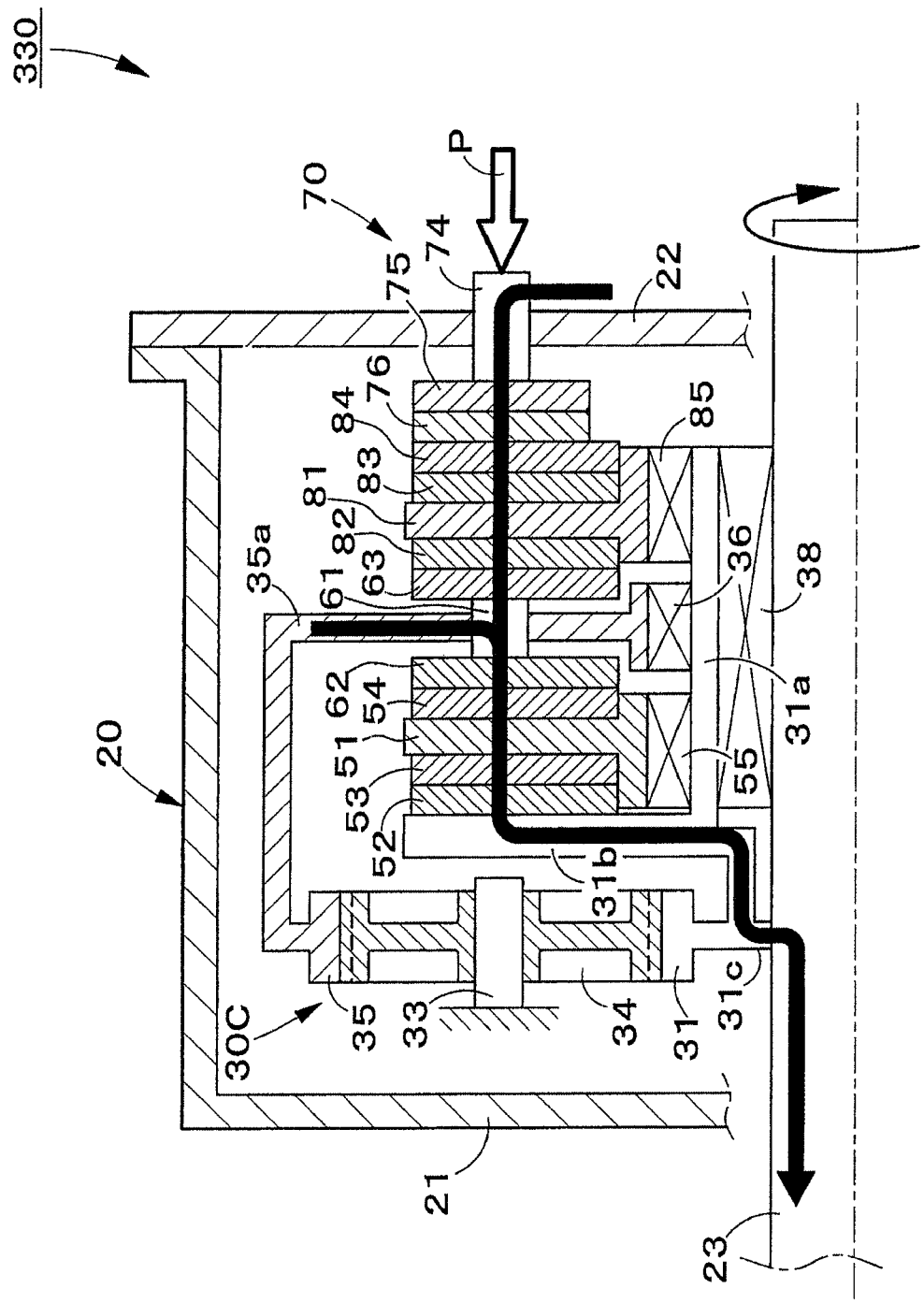
FIG. 17 is a typical sectional view of a brake system in a third modification of the brake system in the third embodiment.

Referring to FIG. 17, a floating-disk type brake system 330 in a third modification of the floating-disk type brake system 300 differs from the floating-disk type brake system 320 in the second modification in that the sun gear 31 is connected to the rotating shaft 23 so as to rotate together with the rotating shaft 23, and the ring gear 35 does not have any part corresponding to the connecting part 35c and is connected to the rotating shaft 23.

The sun gear 31 has a connecting part (connecting means) 31c connected to the rotating shaft 23. The sun gear 31 rotates together with the rotating shaft 23.

The brake system 330, similarly to the brake system 300 in the third embodiment, can brake the rotating shaft 23 by operating the lever 72 of the pushing device 70 to press the second disks 75 and 76, the second floating disk assembly 80, the first disk assembly 60, and the first floating disk assembly 50 against the disk-like wall 31b formed integrally with the sun gear 31 so that those elements are in sliding engagement with each other.

Fourth Modification

Figure 9:
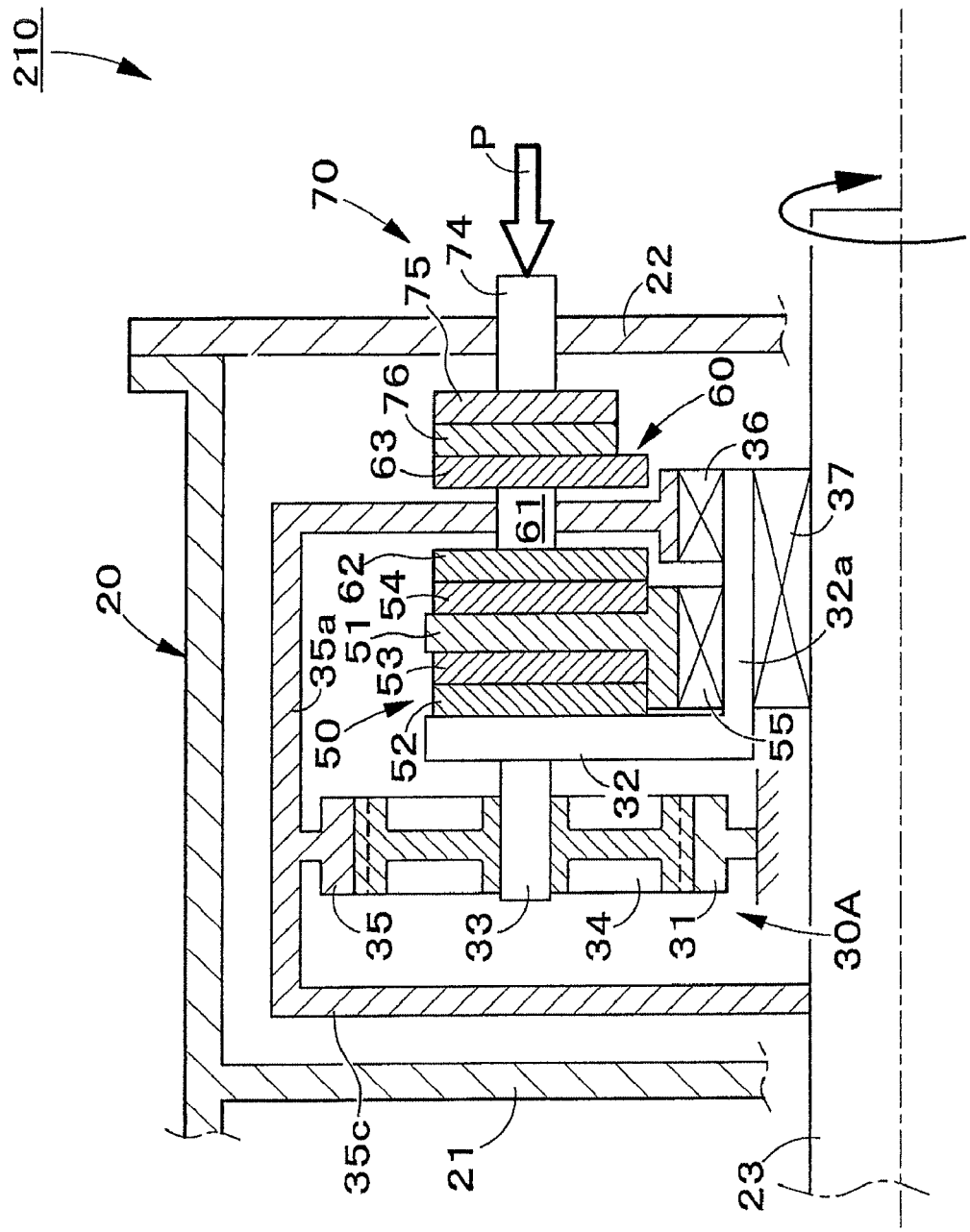
FIG. 9 is a typical sectional view of a brake system in a first modification of the brake system in the second embodiment.
Figure 10:
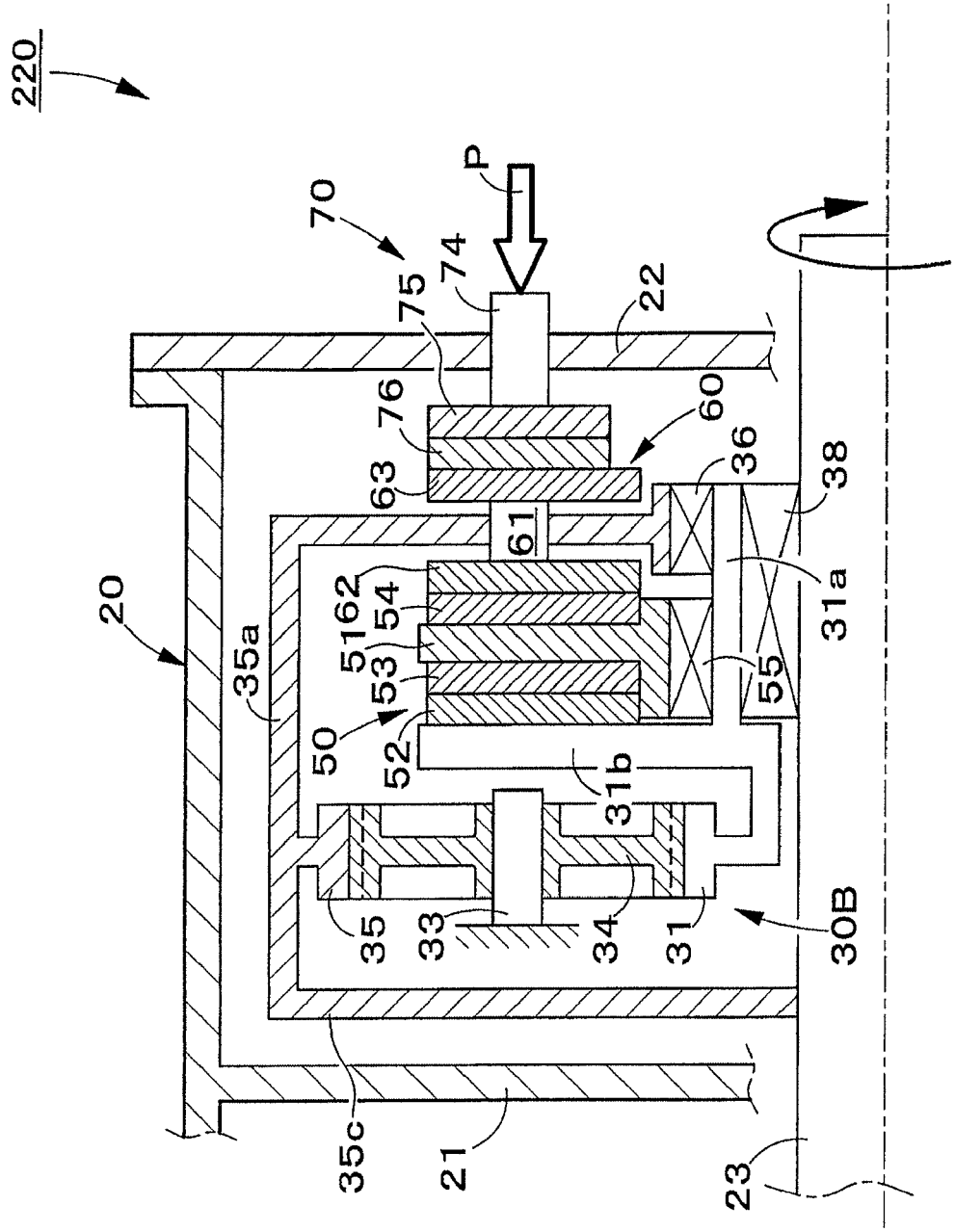
FIG. 10 is a typical sectional view of a brake system in a second modification of the brake system in the second embodiment.
Figure 18:
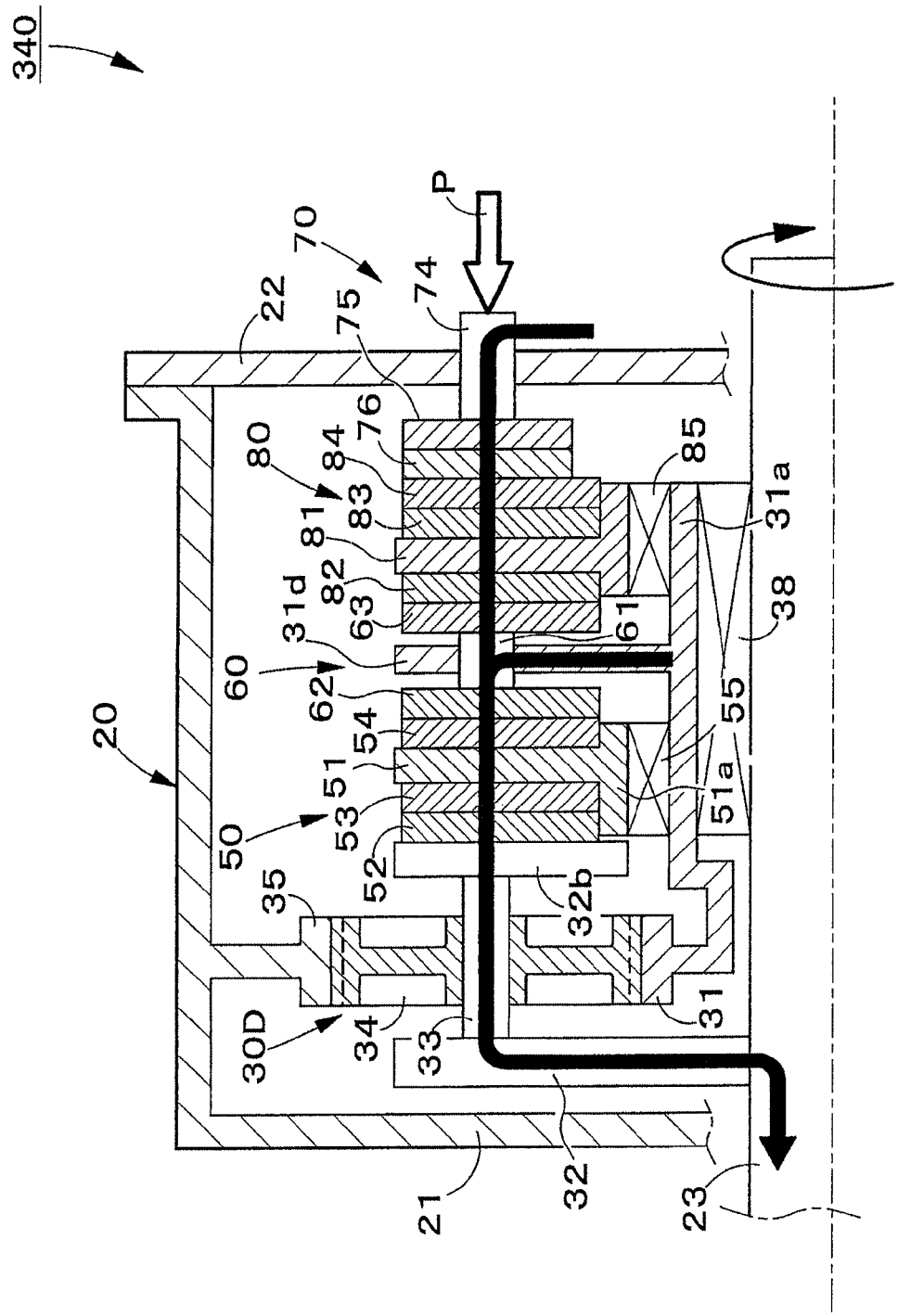
FIG. 18 is a typical sectional view of a brake system in a fourth modification of the brake system in the third embodiment.

Referring to FIG. 18, a floating-disk type brake system 340 in a fourth modification of the floating-disk type brake system 300 in the third embodiment shown in FIG. 9 differs from the floating-disk type brake system 300 in that the ring gear 35 is fixed to the casing 20, and the sun gear 31 is rotatably relative to the rotating shaft 23.

A cylindrical boss 31a formed integrally with the sun gear 31 and coaxial with the rotating shaft 23 is rotatably supported on the rotating shaft 23 by a bearing 38.

The support shafts 33 supporting the planet pinions 34 are attached to an annular wall 32a disposed coaxially with and adjacently to the first disk assembly 60.

A connecting part 35d formed integrally with the ring gear 35 is connected to the casing 20.

The brake system 340, similarly to the brake system 300 in the third embodiment, can brake the rotating shaft 23 by operating the lever 72 of the pushing device 70 to press the second disks 75 and 76, the second floating disk assembly 80, the first disk assembly 60, and the first floating disk assembly 50 against the annular wall 32a attached to the support shafts 33 supporting the planet pinions 34 in sliding engagement with each other so that those elements are in frictional sliding engagement with each other.

Fifth Modification

Figure 19:
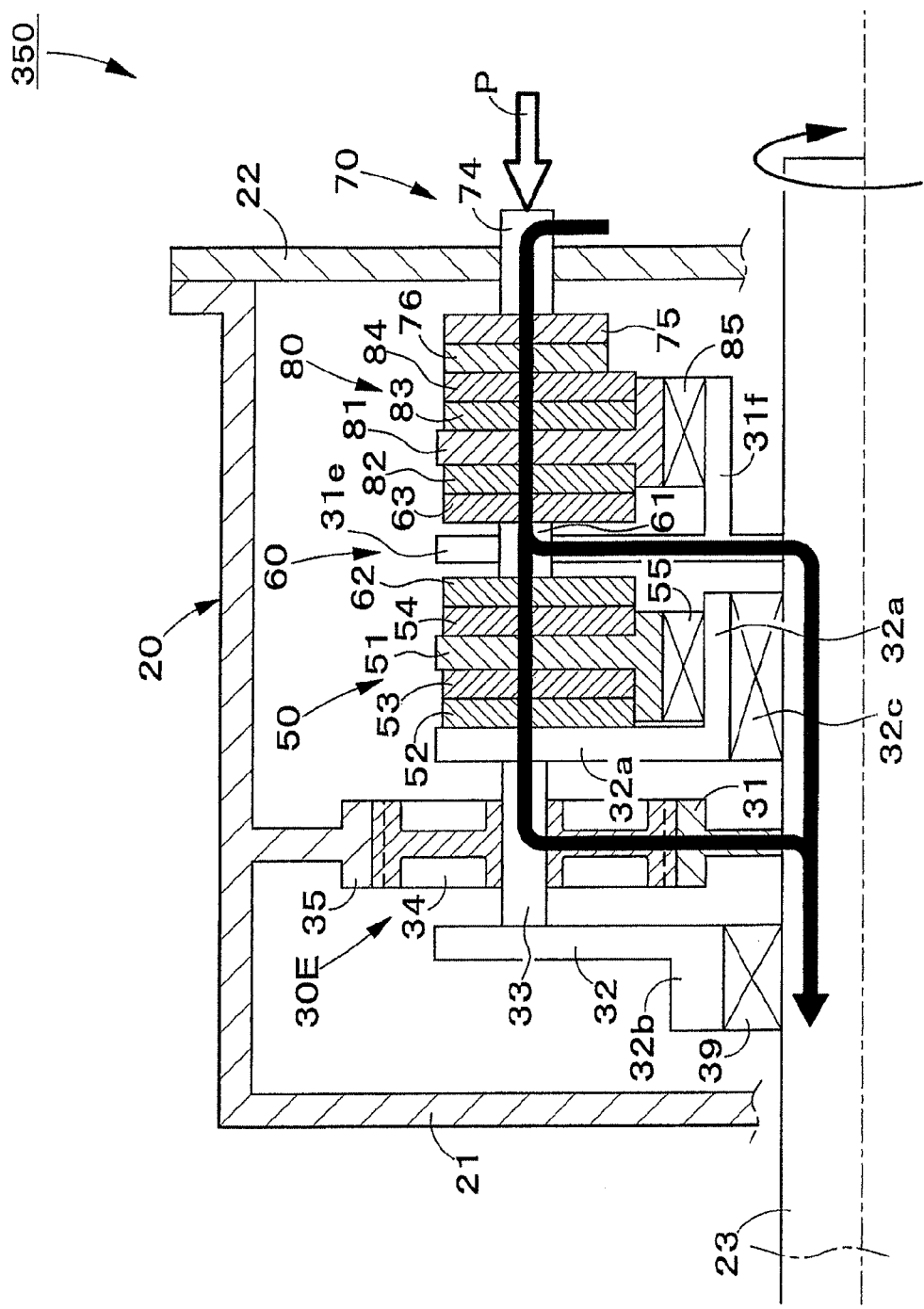
FIG. 19 is a typical sectional view of a brake system in a fifth modification of the brake system in the third embodiment.

Referring to FIG. 19, a floating-disk type brake system 350 in a fifth modification of the floating-disk type brake system 300 in the third embodiment differs from the floating-disk type brake system 340 in that the sun gear 31 is connected to the rotating shaft 23 so as to rotate together with the rotating shaft 23, and the planet carrier 32 is rotatably supported on the rotating shaft 23.

A cylindrical boss 32b formed integrally with the planet carrier 32 and coaxial with the rotating shaft 23 is rotatably supported on the rotating shaft 23 by a bearing 39.

An annular wall 32a having the shape of a thick disk is connected to the support shafts 33 supporting the planet pinions 34. A cylindrical boss 32b is formed integrally with the annular wall 32a and coaxially with the rotating shaft 23. The cylindrical boss 32b is rotatably supported on the rotating shaft 23 by a bearing 32c.

The first disk assembly 60 is supported on a wall 31e attached to the rotating shaft 23 for rotation together with the rotating shaft 23. The first disk assembly 60 can move toward the first floating disk assembly 50 while the same is rotating together with the rotating shaft 23.

A cylindrical boss 31f is formed integrally with the wall 31e and coaxially with the rotating shaft 23. The second floating disk assembly 80 is rotatably supported on the cylindrical boss 31f by a bearing 85.

The brake system 350, similarly to the brake system 300 in the third embodiment, can brake the rotating shaft 23 by operating the lever 72 of the pushing device 70 to press the second disks 75 and 76, the second floating disk assembly 80, the first disk assembly 60, and the first floating disk assembly 50 against the annular wall 32a attached to the support shafts 33 supporting the planet pinions 34 so that those elements are in sliding engagement with each other.

Fourth Embodiment

A brake system 400 in a fourth embodiment according to the present invention combined with a planetary gear will be described with reference to FIGS. 20 and 35.

Figure 35:
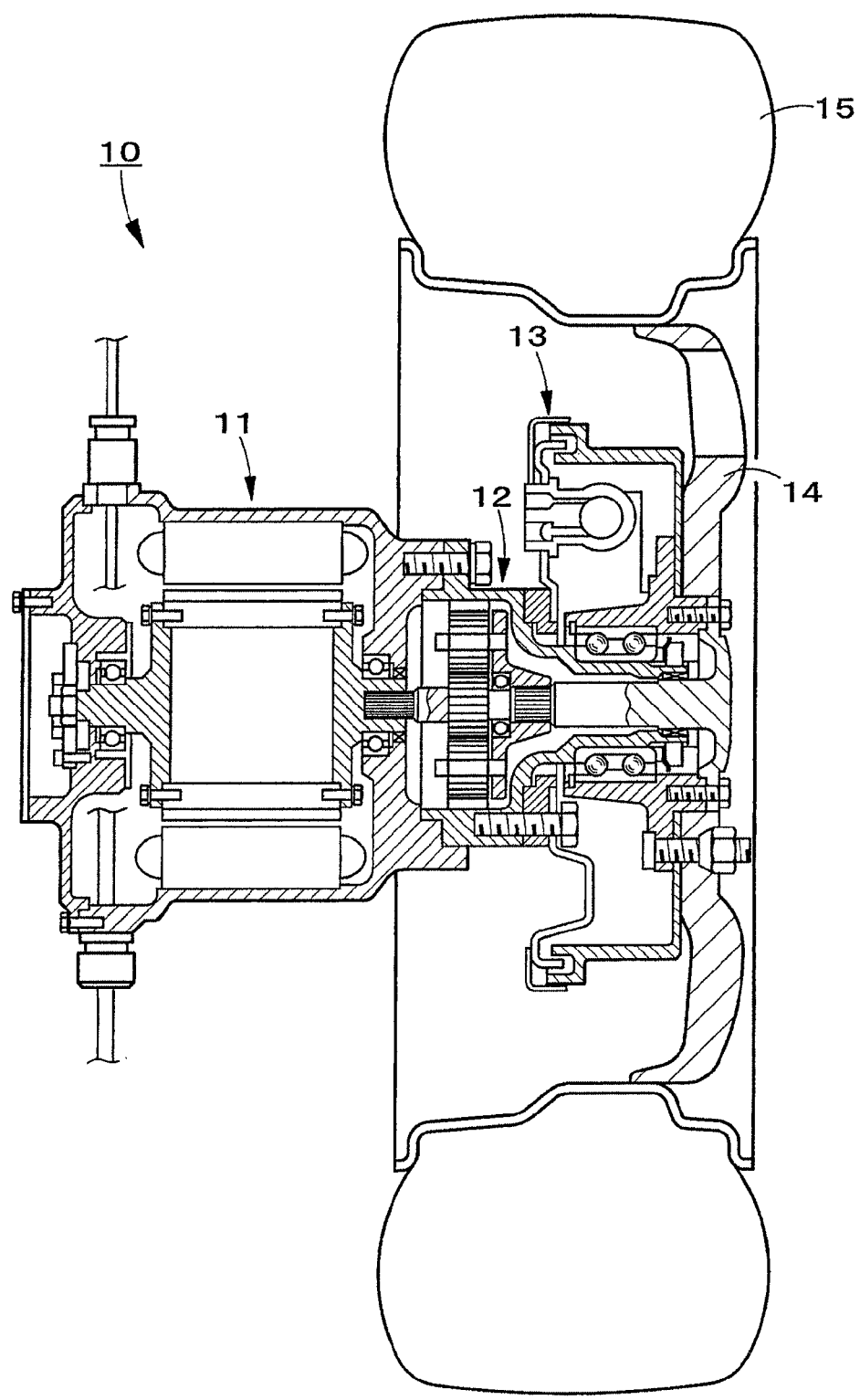
FIG. 35 is a typical sectional view of a conventional in-wheel motor for an electric vehicle.

Generally, an in-wheel motor installed inside a driving wheel of an electric vehicle is built by combining an electric motor 11 and a planetary gear 12, namely, a reduction gear as shown in FIG. 35. The in-wheel motor is not provided with any mechanical brake for braking the driving wheel. Therefore, the in-wheel motor needs to be used in combination with a conventional automotive brake, such as a disk brake or a drum brake 13.

The weight of the driving wheel of the electric vehicle driven by the in-wheel motor, including those of a wheel 14 and a tire 15, increases the unsprung weight of the electric vehicle. Increase in the unsprung weight not only spoils ride comfort, but also deteriorates road surface tracking performance and driving performance.

Figure 20:
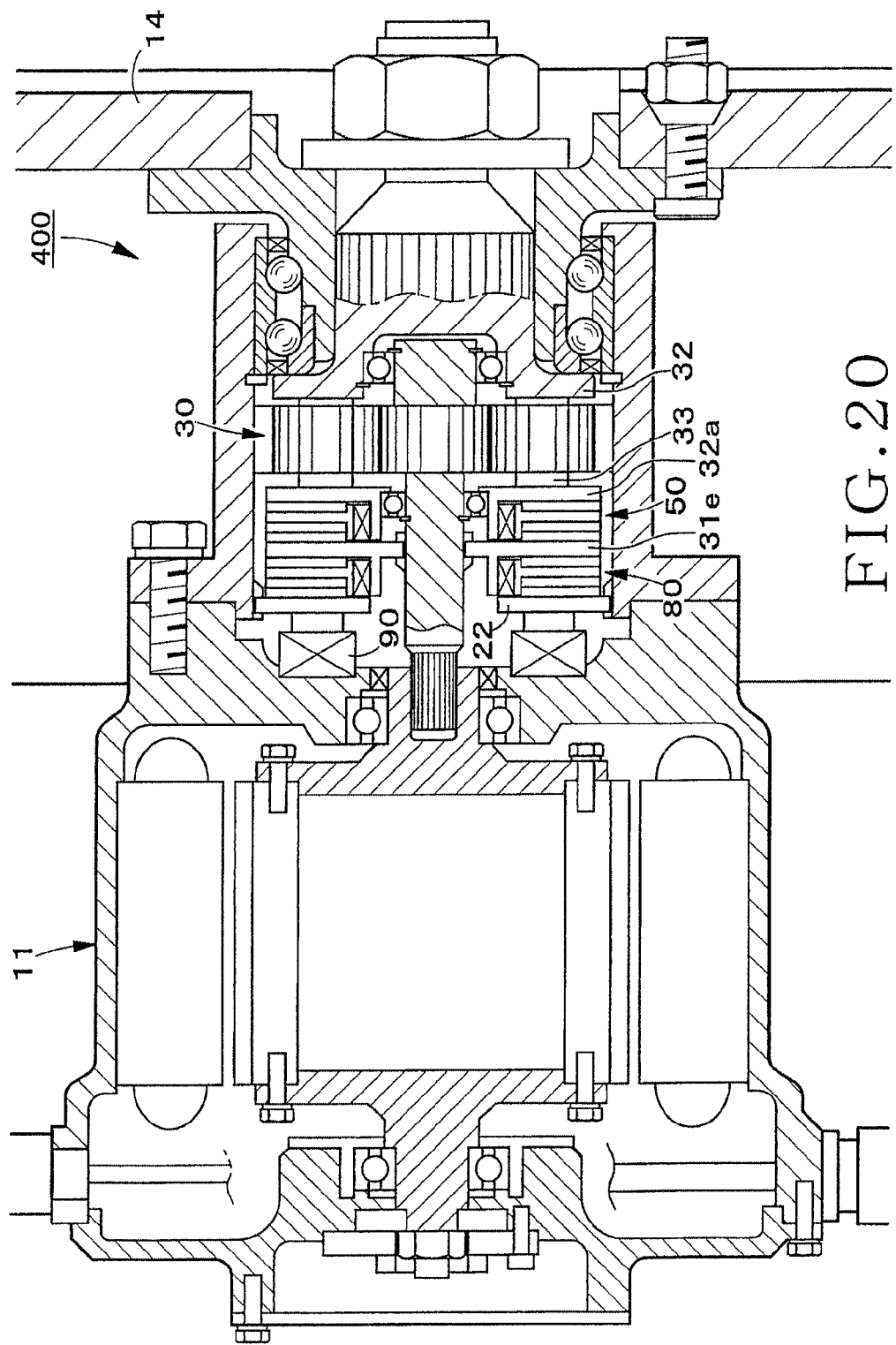
FIG. 20 is a typical sectional view of an in-wheel motor including a brake system in a fourth embodiment according to the present invention for an electric vehicle.

The brake system 400 in the fourth embodiment shown in FIG. 20 is combined with an in-wheel motor.

Figure 14:
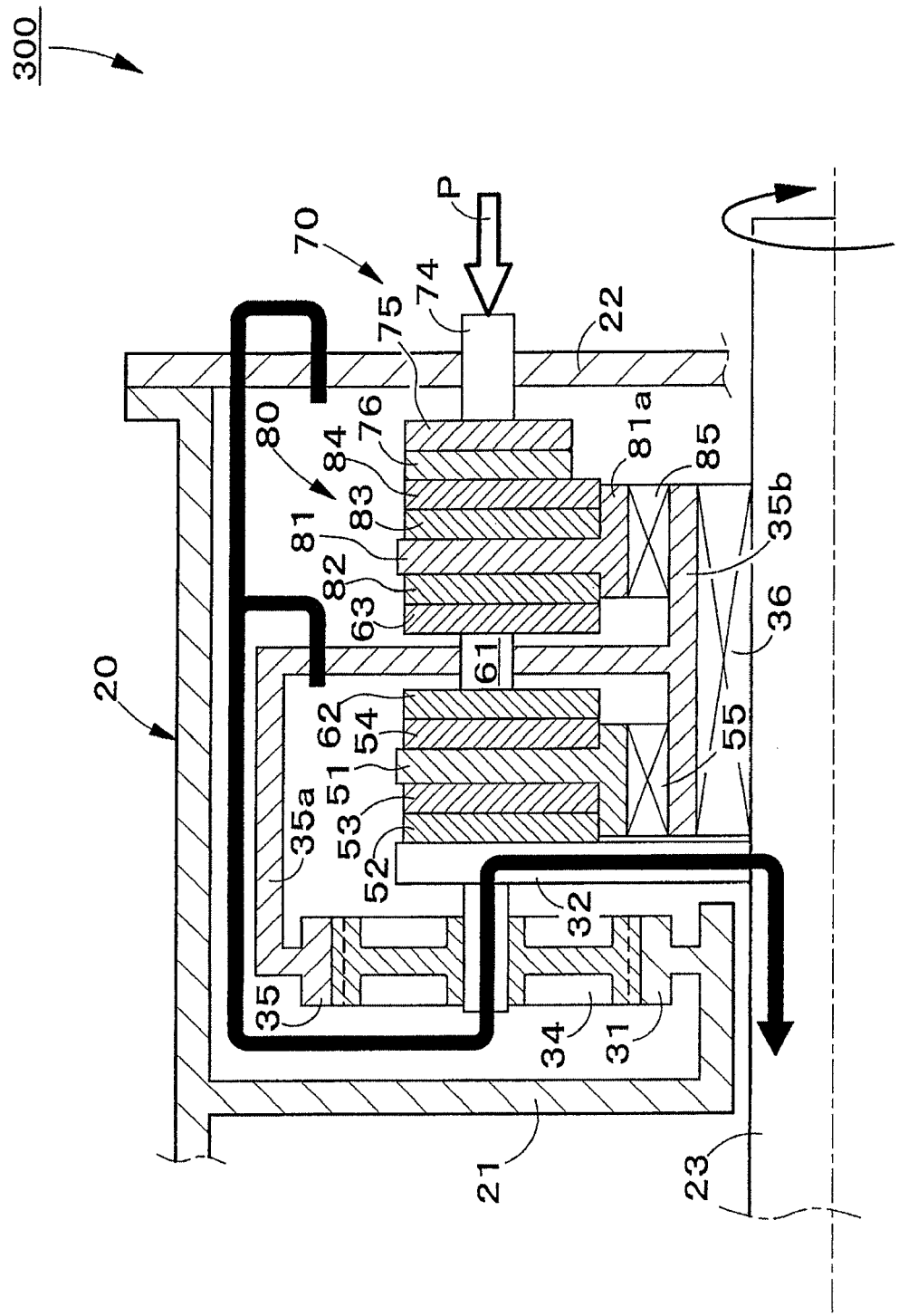
FIG. 14 is a typical sectional view of a brake system in a third embodiment according to the present invention.

The brake system 400 is substantially the same in construction as the brake system 300 shown in FIG. 14, except that the former is provided with an electric servomechanism S instead of the pushing device 70.

The output rotational driving force of the electric motor 11 can be transmitted through a planetary gear 30 to a wheel 14, and the wheel can be braked while the electric vehicle is coasting. The planetary gear 30 lowers output speed.

When the brake system 400 in the fourth embodiment is combined with the in-wheel motor of the electric vehicle, the wheel 14 does not need to be provided with the disk brake or the drum brake 13. Since the weight of the wheel 14 is reduced by the weight of the disk brake or the drum brake 13, the problem in the in-wheel motor of the electric vehicle resulting from increase in the unsprung weight can be effectively solved.

Omission of the disk brake or the drum brake eliminates piping for a hydraulic circuit and simplifies the brake system Since only electric wiring is needed to operate the electric servomechanism S of the brake system 400, the body structure of the electric vehicle can be simplified.

Omission of the disk brake or the drum brake removes restrictions on the outside diameter of the brake system 400. Consequently, the electric motor 11 can be shifted near to the wheel 14.

The brake system 400 in the fourth embodiment can be applied not only to the electric vehicle, but also to an electric driving motor for Shinkansen trains.

Axles of cars of Shinkansen trains are braked after the running speed has dropped to 20 km/h or below.

Figure 21:
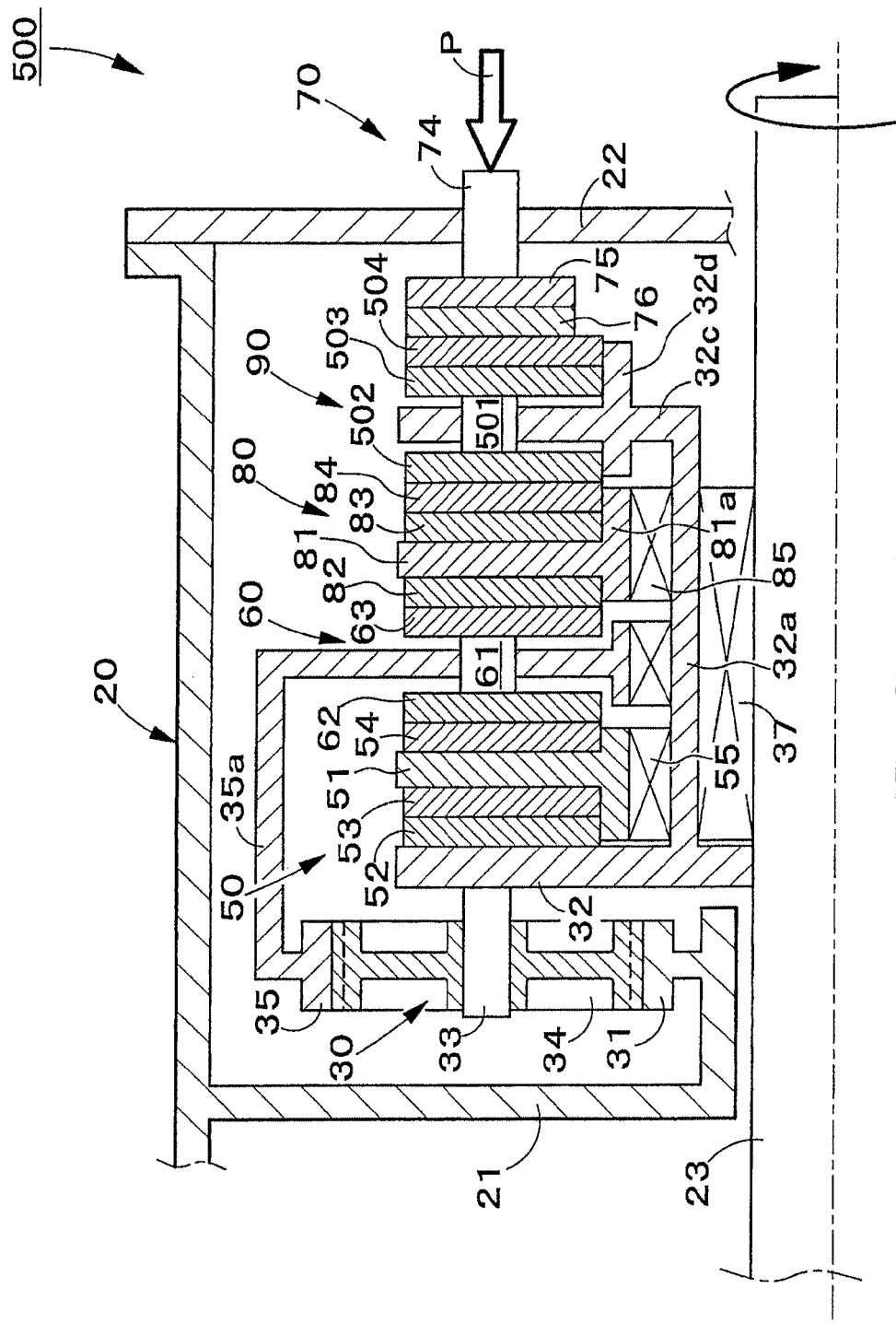
FIG. 21 is a typical sectional view of a brake system in a fifth embodiment according to the present invention.

Therefore, the weight of bogies can be remarkably reduce by replacing the disk brakes combined with the axles of Shinkansen trains Fifth Embodiment A floating-disk type brake system 500 in a fifth embodiment according to the present invention will be described with reference to FIG. 21.

The brake system 500 in the fifth embodiment is built by additionally incorporating a third disk assembly 90 to the brake system 300 in the third embodiment.

The connecting part 32a of the planet carrier (rotation transfer means) 32 is axially extended and a flange 32c is formed on the free end of the connecting part 32a. The third disk assembly 90 is axially movably supported on the flange 32c so as to move in the axial direction of the rotating shaft 23.

The third disk assembly 90 is substantially the same in construction as the first disk assembly 60. The third disk assembly 90 includes a plurality of support shafts 501 penetrating the flange 32c of the planet carrier 32, axially slidable, and arranged at equal angular intervals on the flange 32c, an annular member 502 attached to inner ends of the support shafts 501, coaxial with and adjacent to the second floating disk assembly 80, and an annular member 503 attached to the outer ends of the support shafts 501. The third disk assembly 90 rotates together with the planet carrier 32.

An annular member 504 is rotatably and slidably supported on the cylindrical boss 32d of the planetary carrier 32 to enable the second disks 75 and 76, and the third disk assembly 90 to slide smoothly relative to each other.

When the lever 72 of the pushing device 70 is operated to thrust the push rods 74 into the casing 20, the second disks 75 and 76 pushes the third disk assembly 90, the second floating disk assembly 80, the first disk assembly 60, and the first floating disk assembly 50 against the planet carrier 32.

Consequently, the end cover 20 of the casing 20, and the flange 32c of the planet carrier 32 are brought into frictional engagement, the flange 32c of the planet carrier 32 and the connecting part 35a of the ring gear 35 are brought into frictional engagement, and the connecting part 35a of the ring gear 35 and the planet carrier 32 are brought into frictional engagement.

The floating-disk type brake system 500 in the fifth embodiment is built by additionally incorporating the third disk assembly 90 to the brake system 300 in the third embodiment to add frictional sliding surfaces between the end cover member) 22 and the flange (connecting means) 32c, and between the flange (connecting means) 32c and the connecting part (driven means) 35a.

The floating-disk type brake system 500 in the fifth embodiment can brake the rotating shaft 23 more firmly than the floating-disk type brake system 300 in the third embodiment.

Brake systems in modifications of the brake system 500 in the fifth embodiment will be described with reference to FIGS. 22 to 26.

First Modification

Figure 22:
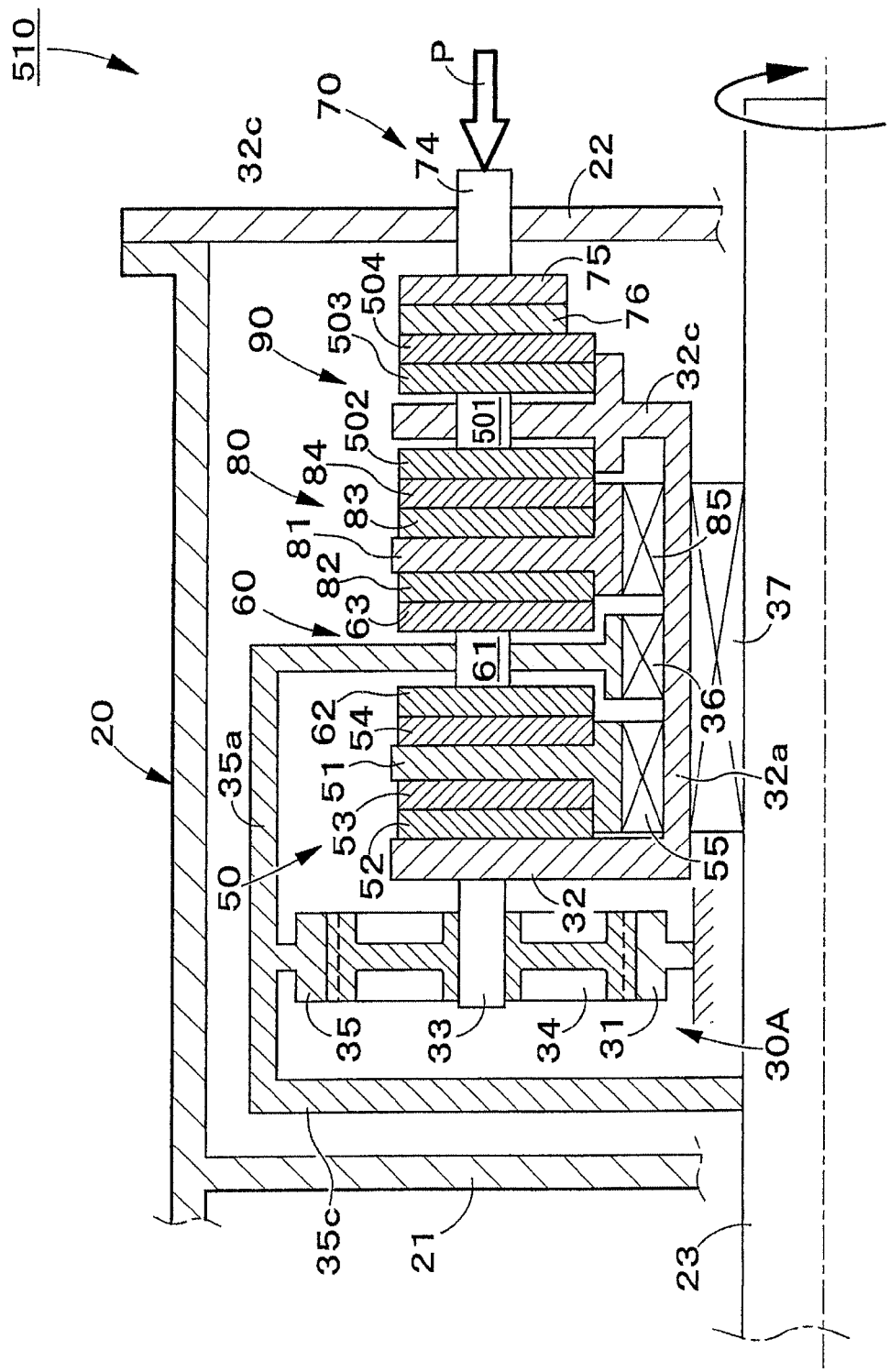
FIG. 22 is a typical sectional view of a brake system in a first modification of the brake system in the fifth embodiment.

Referring to FIG. 22, a brake system 510 in a first modification is built by additionally incorporating the third disk assembly 90 into the floating-disk type brake system 310 shown in FIG. 15.

The connecting part 32a of the planet carrier (driven means) 32 is extended, a radial flange 32c is formed on the connecting part 32a, and the plurality of support shafts 501 of the third disk assembly 90 are passed through the flange 32c of the planet carrier 32 so as to be axially slidable in the axial direction of the rotating shaft 23. The third disk assembly 90 rotates together with the planet carrier 32.

When the lever 72 of the pushing device 70 is turned to advance the push rods 74 into the casing 20, the second annular members 75 and 76 press the third disk assembly 90, the second floating disk assembly 80, the first disk assembly 60 and the first floating disk assembly 50 against the planet carrier 32 as shown in FIG. 22.

Then, the end cover 22 of the casing 20, and the flange 32c of the planet carrier 32 are brought into frictional engagement, the flange 32c of the planet carrier 32, and the connecting part 35a of the ring gear 35 are brought into frictional engagement, and the connecting part 35a of the ring gear 35, and the planet carrier 32 are brought into frictional engagement. Consequently, the brake system 510 can brake the rotating shaft 23 more firmly than the brake system 310 shown in FIG. 15.

Since the planetary gear 30A serves as a reduction gear in this state, the rotating speed of the planet carrier (driven means) 32 is lower than that of the rotating shaft 23. Therefore, the difference in rotating speed between the third disk assembly 90 rotating together with the planet carrier 32, and the second disks 75 and 76 supported on the casing (fixing means) 20 is smaller than that in the brake system 500 in the fifth embodiment, and hence the third disk assembly 90 is decelerated gradually when the second disks 75 and 76 are brought into contact with each other. Thus, the brake system 510 exhibits a moderate braking property for braking the rotating shaft 23.

Second Modification

Figure 23:
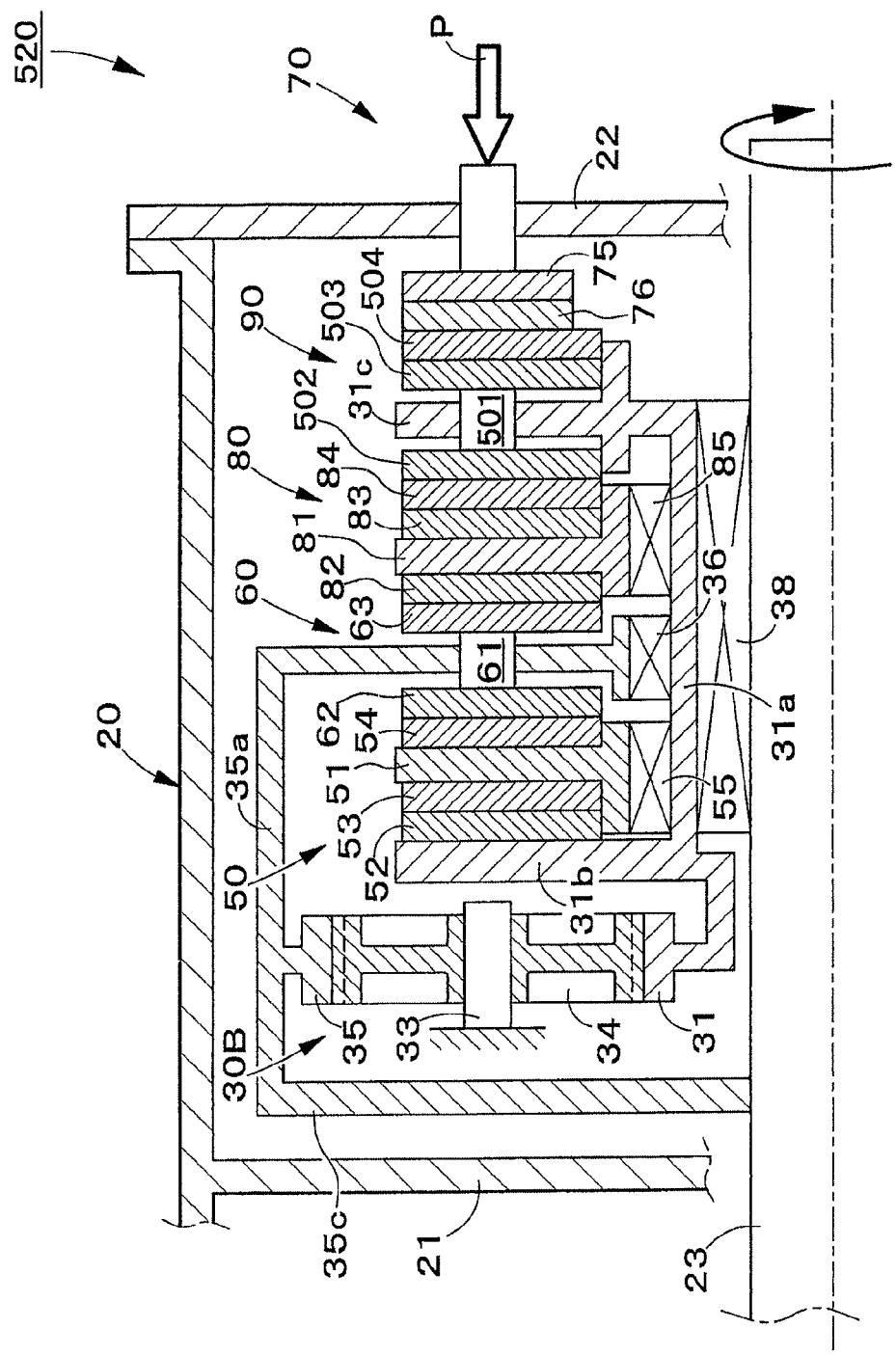
FIG. 23 is a typical sectional view of a brake system in a second modification of the brake system in the fifth embodiment.

A brake system 520 in a second modification shown in FIG. 23 is built by additionally incorporating a third disk assembly 90 to the floating-disk type brake system 320 shown in FIG. 16.

The connecting part 31a of the sun gear (driven means) 31 is extended, a radial flange 31c is formed on the extended connecting part 31a, and the plurality of support shafts 501 of the third disk assembly 90 are passed through the flange 31c of the sun gear 31 so as to be axially slidable in the axial direction of the rotating shaft 23. The third disk assembly 90 rotates together with the sun gear 31.

When the lever 72 of the pushing device 70 is turned to advance the push rods 74 into the casing 20, the second annular members 75 and 76 press the third disk assembly 90, the second floating disk assembly 80, the first disk assembly 60 and the first floating disk assembly 50 against the connecting part 31b of the sun gear 31 as shown in FIG. 23.

Then, the end cover 22 of the casing 20, and the flange 31c of the sun gear 31 are brought into frictional engagement, the flange 31c of the sun gear 31, and the connecting part 35a of the ring gear 35 are brought into frictional engagement, and the connecting part 35a of the ring gear 35, and the connecting part 31b of the sun gear 31 are brought into frictional engagement. Consequently, the brake system 520 can brake the rotating shaft 23 more firmly than the brake system 320 shown in FIG. 16.

Since the planetary gear 30B serves as a reversing speed-increasing gear in this state, the rotating speed of the sun gear (driven means) 31 is higher than that of the rotating shaft 23.

Therefore, the difference in rotating speed between the third disk assembly 90 rotating together with the connecting part 31c of the sun gear 31, and the second disks 75 and 76 supported on the casing (fixing means) 20 is larger than that in the brake system 500 in the fifth embodiment, and hence the third disk assembly 90 is decelerated sharply when the second disks 75 and 76 are brought into contact with each other. Thus, the brake system 520 exhibits a sharp braking property for braking the rotating shaft 23.

Third Modification

Figure 24:
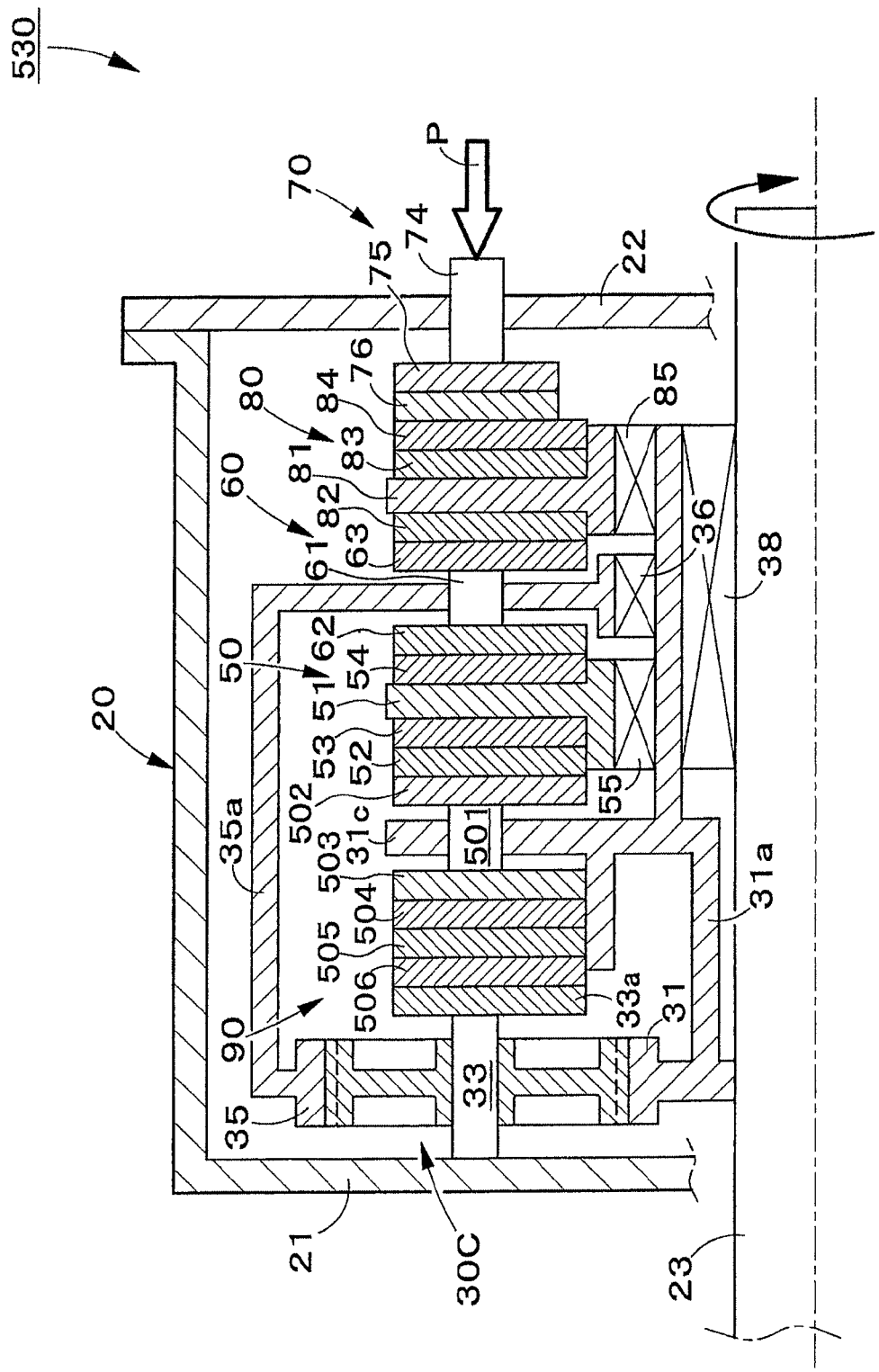
FIG. 24 is a typical sectional view of a brake system in a third modification of the brake system in the fifth embodiment.

A brake system 530 in a third modification shown in FIG. 24 is built by additionally incorporating a third disk assembly 90 into the floating-disk type brake system 330 shown in FIG. 17.

The connecting part 31a of the sun gear (driven means) 31 is extended in a space between the first floating disk assembly 50 and the planet pinions 34 is extended, a radial flange 31c is formed on the extended connecting part 31c, and the plurality of support shafts 501 of the third disk assembly 90 are passed through the flange 31c so as to be slidable in the axial direction of the rotating shaft 23. The third disk assembly 90 rotates together with the sun gear 31.

The support shafts 33 rotatably supporting the planet pinions 34 are directly attached to the bottom wall 21 of the casing 20. An annular member 33a corresponding to the planet carrier 32 is attached to the free ends of the support shafts 33.

Annular members 505 and 506, similar to the annular members 52 and 53 of the first floating disk assembly 50, are interposed between the annular member 33a and the third disk assembly 90.

When the lever 72 of the pushing device 70 is turned to advance the push rods 74 into the casing 20, the second annular members 75 and 76 press the second floating disk assembly 80, the first disk assembly 60, the first floating disk assembly 50, and the third disk assembly 90 against the annular member 33a corresponding to the planet carrier 32 as shown in FIG. 24.

Then, the end cover 22 of the casing 20, and the connecting part 35a of the ring gear 35 are brought into frictional engagement, the connecting part 35a of the ring gear 35, and the flange 31c of the sun gear 31 are brought into frictional engagement, and the flange 31c of the sun gear 31, and the bottom wall 21 of the casing 20 are brought into frictional contact as shown in FIG. 24. Consequently, the brake system 530 can brake the rotating shaft 23 more firmly than the brake system 330 shown in FIG. 17.

Since the planetary gear 30C serves as a reduction gear in this state, the rotating speed of the ring gear (driven means) 35 is considerably lower than that of the rotating shaft 23.

Therefore, the difference in rotating speed between the second disk assembly 80 rotating together with the ring gear 35, and the second disks 75 and 76 supported on the casing (fixing means) 20 is smaller than that in the brake system 500 in the fifth embodiment, and hence the third disk assembly 90 is decelerated gradually when the second disks 75 and 76 are brought into contact with each other. Thus, the brake system 530 exhibits a moderate braking property for braking the rotating shaft 23.

Fourth Modification

Figure 25:
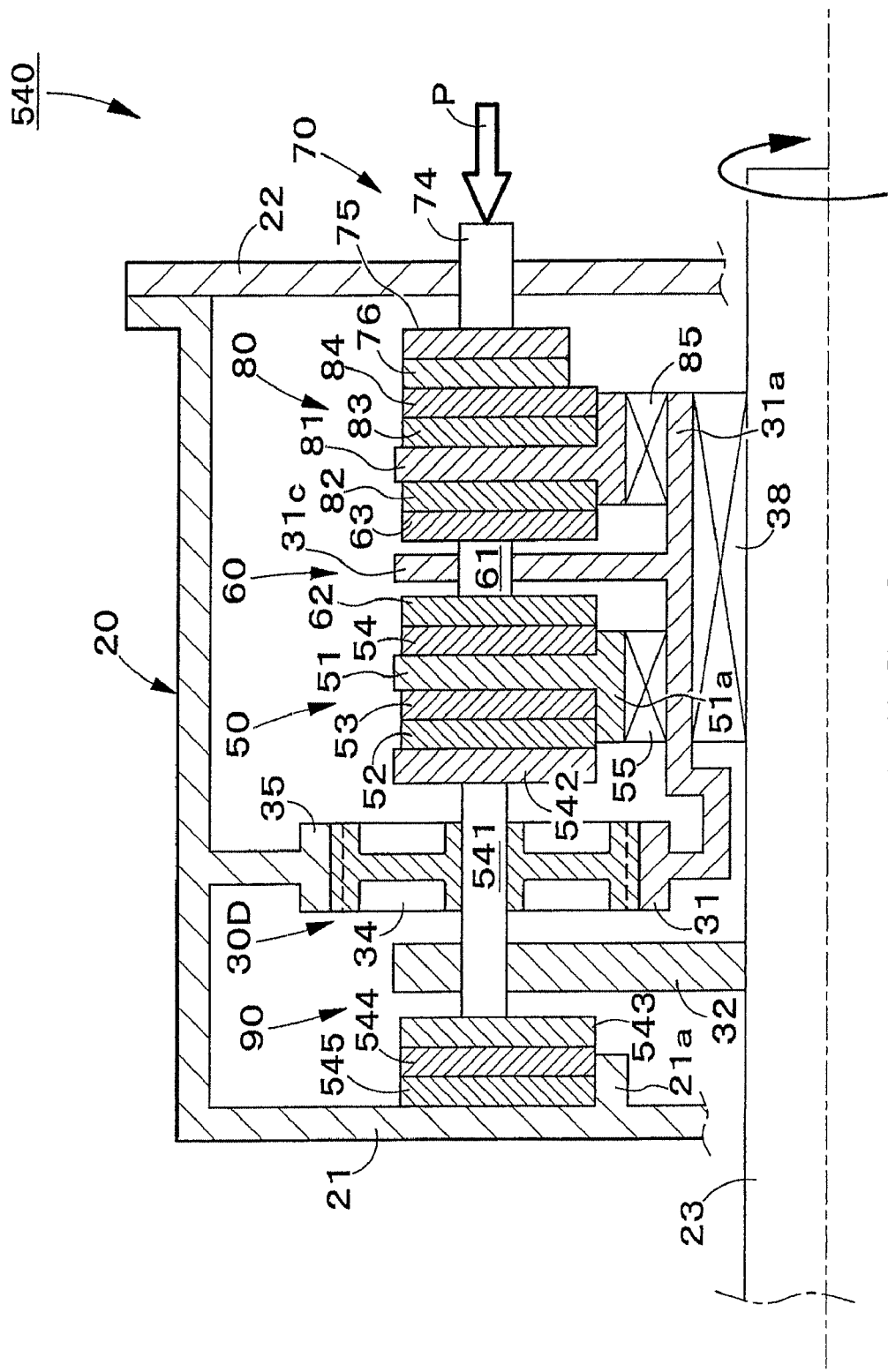
FIG. 25 is a typical sectional view of a brake system in a fourth modification of the brake system in the fifth embodiment.

A brake system 540 in a fourth modification shown in FIG. 25 is built by additionally incorporating a third disk assembly 90 into the floating-disk type brake system 340 shown in FIG. 18.

The support shafts 541 rotatably supporting the planet pinions 34 are passed through the planet carrier 32 so as to be movable in the axial direction of the rotating shaft 23. An annular member 542 is attached to ends of the support shafts 541 on the side of the first floating disk assembly 50, and an annular member 513 is attached to the other ends of the support shaft 541. The third disk assembly 90 rotates together with the planet carrier 32 fixed to the rotating shaft 23.

Annular members 544 and 545 similar to the annular members 52 and 53 of the first floating disk assembly 50 are interposed between the annular member 543 and the bottom wall 21 of the casing 20.

When the lever 72 of the pushing device 70 is turned to advance the push rods 74 into the casing 20, the second annular members 75 and 76 press the second floating disk assembly 80, the first disk assembly 60, the first floating disk assembly 50, and the third disk assembly 90 against the bottom wall 21 of the casing 20 as shown in FIG. 25.

Then, the end cover 22 of the casing 20, and the flange 31c of the sun gear 31 are brought into frictional engagement, the flange 31c of the sun gear 31, and the planet carrier 32 are brought into frictional engagement, and the planet carrier 32 and the bottom wall 21 of the casing 20 are brought into frictional contact. Consequently, the brake system 540 can brake the rotating shaft 23 more firmly than the brake system 340 shown in FIG. 18.

Since third disk assembly 90 rotates together with the planet carrier 32 and the rotating shaft 23, the difference in rotating speed between the third disk assembly 90 and the bottom wall (fixing means) 21 of the casing 20 is equal to the rotating speed of the rotating shaft 23.

In the brake system 500 in the fifth embodiment, the difference in rotating speed between the third disk assembly 90 and the end cover (fixing means) 22 of the casing 20 is equal to the rotating speed of the rotating shaft 23.

The planetary gear 30D of the brake system 540 in the fourth modification serves as a speed-increasing gear. Thus, the rotating speed of the sun gear (driven means) 31 is considerably higher than that of the rotating shaft 23. However, the first disk assembly 60 rotating together with the ring gear 35 rotates relative to the planet carrier 32 rotating together with the rotating shaft 23. The difference in rotating speed between the first disk assembly 60 and the planet carrier 32 is not very large.

Therefore, the braking property of the floating-disk type brake system 540 in the fourth modification for braking the rotating shaft 23 is more sensitive than that of the brake system 500 in the fifth embodiment.

Fifth Modification

Figure 26:
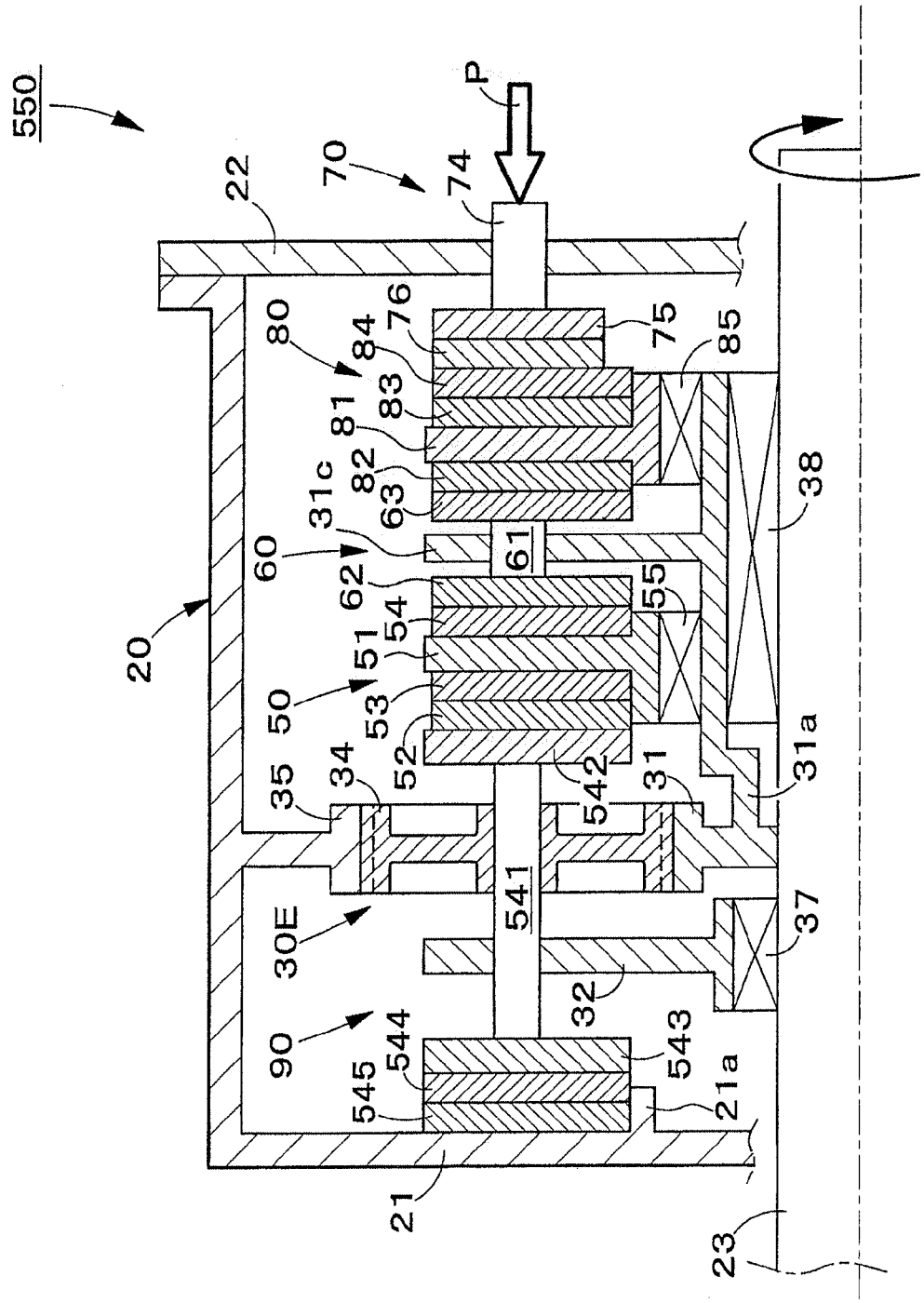
FIG. 26 is a typical sectional view of a brake system in a fifth modification of the brake system in the fifth embodiment.

A brake system 550 in a fifth modification shown in FIG. 26 is built by additionally incorporating a third disk assembly 90 into the floating-disk type brake system 350 shown in FIG. 19.

The support shaft 541 rotatably supporting the planet pinions 34 are passed through the planet carrier 32 so as to be movable in the axial direction of the rotating shaft 23, an annular member 542 is attached to ends of the support shaft 541 on the side of the first floating disk assembly 50, and an annular member 543 is attached to the other ends of the support shaft 541. The third disk assembly 90 rotates together with the planet carrier 32.

Annular members 544 and 545, similar to the annular members 52 and 53 of the first floating disk assembly 50, are interposed between the annular member 543 and the bottom wall 21 of the casing 20.

When the lever 72 of the pushing device 70 is turned to advance the push rods 74 into the casing 20, the second annular members 75 and 76 press the second floating disk assembly 80, the first disk assembly 60, the first floating disk assembly 50, and the third disk assembly 90 against the bottom wall 21 of the casing 20.

Then, the end cover 22 of the casing 20, and the flange 31c of the sun gear 31 are brought into frictional engagement, the flange 31c of the sun gear 31, and the planet carrier 32 are brought into frictional engagement, and the planet carrier 32 and the bottom wall 21 of the casing 20 are brought into frictional contact. Consequently, the brake system 550 can brake the rotating shaft 23 more firmly than the brake system 350 shown in FIG. 19.

Since the planetary gear 30E of the brake system 550 in the fifth modification serves as a reduction gear in this state, the difference in rotating speed between the third disk assembly 90 rotating together with the planet carrier 32, and the bottom wall (fixing means) 21 of the casing 20 is considerably lower than the rotating speed of the rotating shaft 23.

The difference in rotating speed between the first disk assembly 60 rotating together with the flange 31c of the sun gear 31, and the end cover (fixing means) 22 of the casing 20 is equal to the rotating speed of the rotating shaft 23.

In the brake system 540 in the fourth modification, the difference in rotating speed between the third disk assembly 90 and the bottom wall (fixing means) 21 of the casing 20 is equal to the rotating speed of the rotating shaft 23. The difference in rotating speed between the first disk assembly 60 rotating together with the flange 31c of the sun gear 31, and the end cover 22 (fixing means) 22 of the casing 20 is considerably higher than the rotating speed of the rotating shaft 23.

Therefore, the braking property of the floating-disk type brake system 550 in the fifth modification is more moderate than that of the brake system 540 in the fourth modification.

As apparent from the foregoing description of the brake system in the fifth embodiment, and the brake systems in the first to the fourth modification of the brake system in the fifth embodiment, the braking property of the floating-disk type brake system of the present invention for braking the rotating shaft 23 can be changed by changing the construction and the arrangement of the component disks of the planetary gear.

Sixth Embodiment

Figure 27:
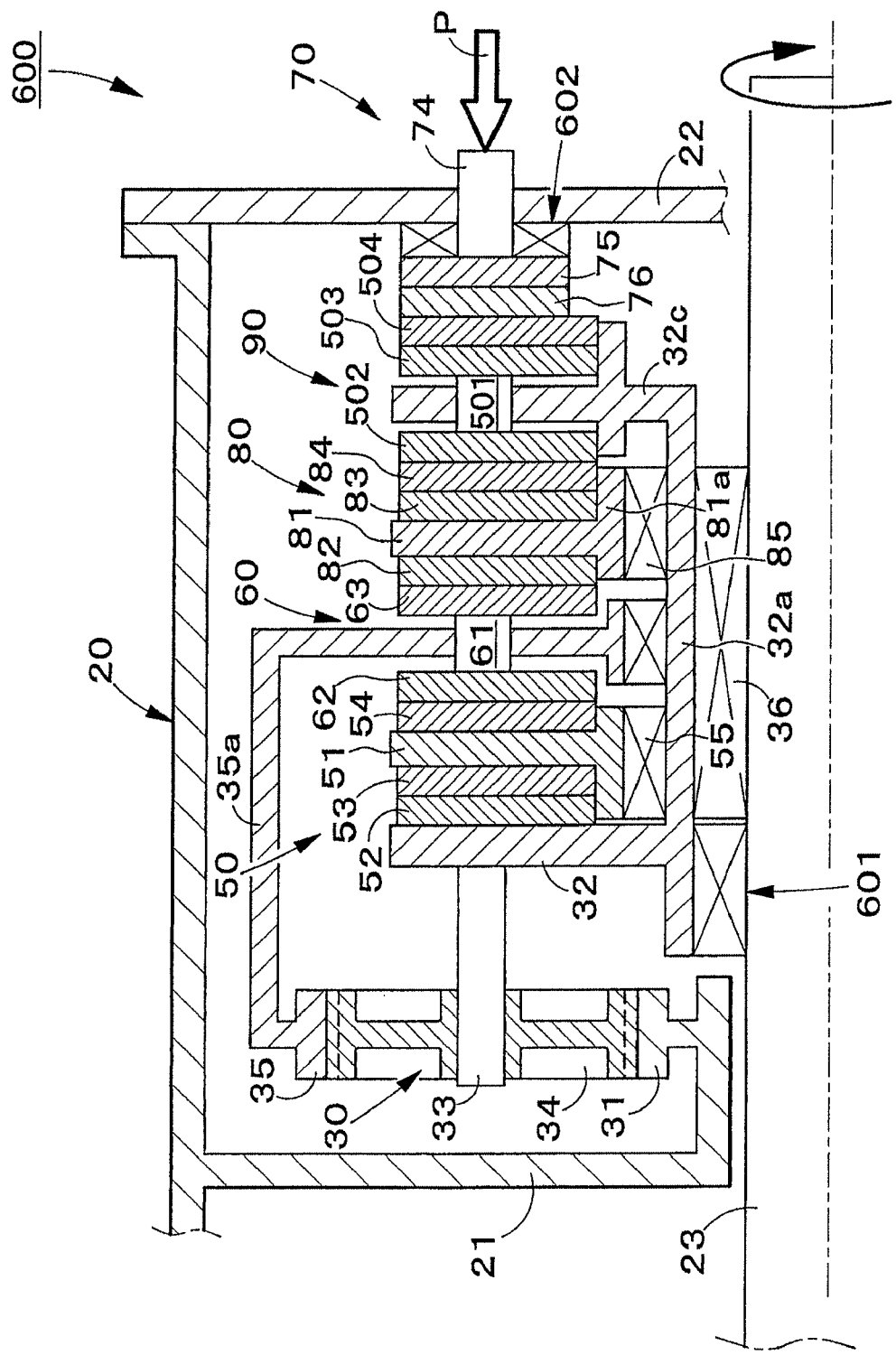
FIG. 27 is a typical sectional view of a brake system in a sixth embodiment according to the present invention.

A floating-disk type brake system 600 in a sixth embodiment according to the present invention will be described with reference to FIG. 27. The floating-disk type brake system 600 in the sixth embodiment is built by additionally incorporating a clutch 601 and a disk pressing device 602 to the brake system 500 in the fifth embodiment.

The clutch 601 is located between the rotating shaft and the plane carrier 32 to couple and uncouple the rotating shaft 23 and the planet carrier (rotation transfer means) 32.

The clutch 601 is disengaged and the rotating shaft 23 and the planet carrier 32 are uncoupled unless a brake signal requesting braking the rotating shaft 23 is provided.

Since the rotating shaft 23 is thus disconnected from the planetary gear 30, the moment of inertia of the planetary gear 30 does not impede increasing and decreasing the rotating speed of the rotating shaft 23, and the friction loss caused in the planetary gear 30 is not loaded on the rotating shaft 23.

When a brake signal requesting braking the rotating shaft 23 is given, the clutch 601 is engaged to couple the rotating shaft 23 and the planetary gear 30. Then, the brake system 600 carries out its intrinsic braking performance when the pushing device 70 is operated.

The disk pressing device 602 axially presses the second disks 75 and 76, the third disk assembly 90, the second floating disk assembly 80, the first disk assembly 60 and the first floating disk assembly 50 together so as to keep those elements in contact with each other.

When the lever 72 of the pushing device 70 is turned to advance the push rods 74 into the casing 20 in this state, the disks are brought into frictional engagement for braking.

The clutch 601 can surely prevent slight sliding friction between the adjacent ones of the disks from acting as a braking force on the rotating shaft 23.

Seventh Embodiment

Figure 28:
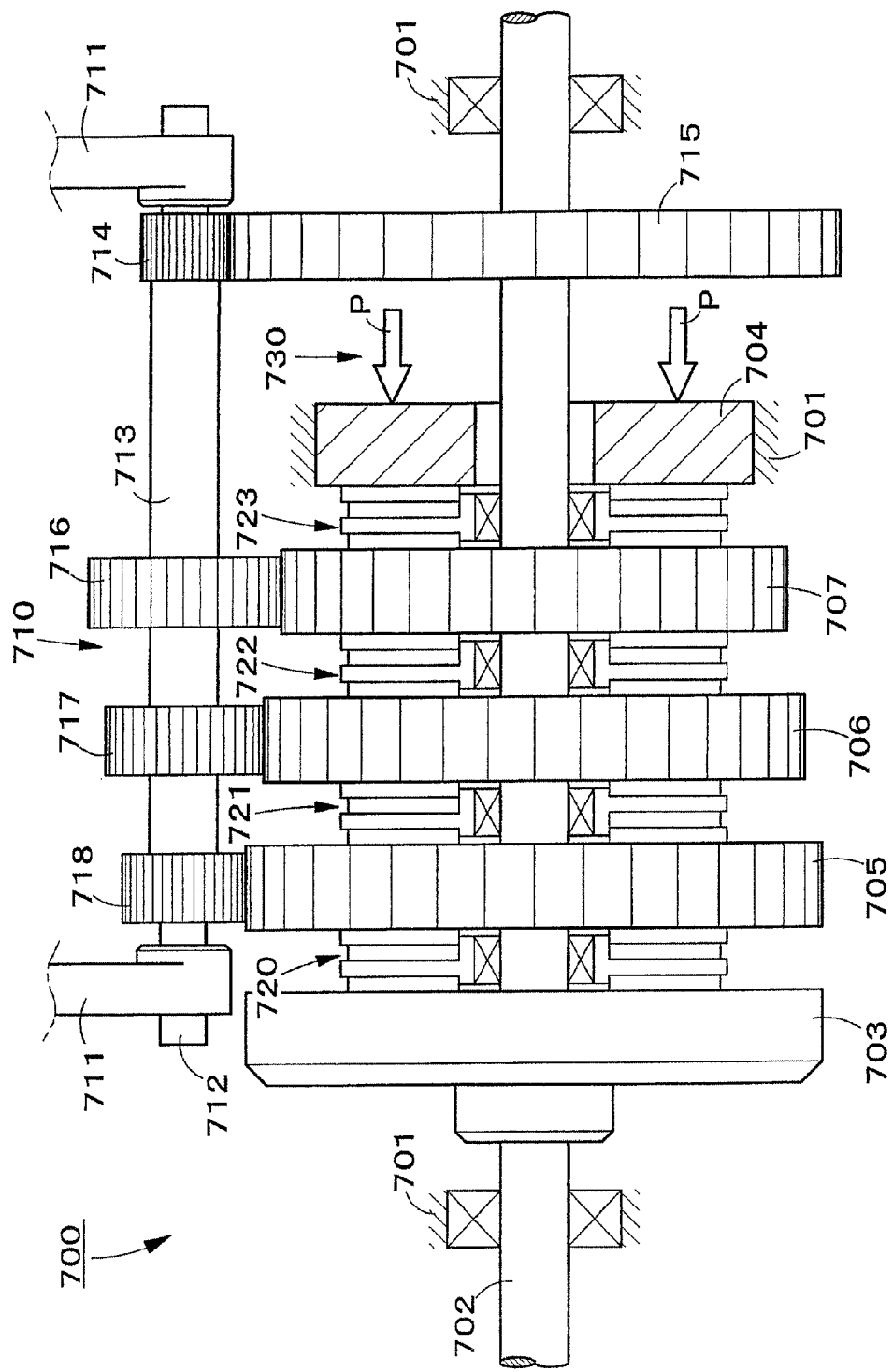
FIG. 28 is a typical partially sectional side elevation of an essential part of a brake system in a seventh embodiment according to the present invention.

A floating-disk type brake system 700 in a seventh embodiment according to the present invention will be described with reference to FIGS. 28 and 29.

Each of the floating-disk type brake systems in the first to the sixth embodiment employs the planetary gear 30.

The floating-disk type brake system 700 in the seventh embodiment employs a rotation transmitting mechanism 710 including a spur gear train or a helical gear train.

The brake system 700 in the seventh embodiment includes a rotating shaft 703 rotatably supported by stationary members 701, a disk-shaped first rotating member 703 fixedly mounted on the rotating shaft 702, and a fastening member 704 coaxial with the rotating shaft 702 and supported by the stationary member 701 so as to be axially movable along the axial direction of the rotating shaft 702 and not to be rotatable Disk-shaped second to fourth rotating members, namely, rotating members 705, 706 and 707, are arranged on the rotating shaft 702 between the first rotating member 703 and the fastening member 704. The rotating members 705, 706 and 707 are coaxial with the rotating shaft 702, rotatable relative to the rotating shaft 702, and axially movable relative to the rotating shaft 702.

The second rotating member 705, the third rotating member 706 and the fourth rotating member 707 are spur gears having teeth on their circumferences.

The rotation transmitting mechanism 710 includes a support shaft 712 parallel to the rotating shaft 702 and supported at its opposite ends by a pair of support arms 711 connected to the stationary member 701, and a tubular gear support member 713 rotatably put on the support shaft 712.

A spur gear 714 of a small diameter fixedly mounted on one end part of The gear support member 713 is engaged with a spur gear 715 of a big diameter fixedly mounted on the rotating shaft 702 to transmit the rotation of the rotating shaft 702 to the gear support member 713.

A first spur gear 716, a second spur gear 717 and a third spur gear 718 respectively having different outside diameters are fixedly mounted on the gear support member 713. The gears 716, 717 and 718 are engaged with teeth formed on the circumferences of the fourth rotating member 707, the third rotating member 706 and the second rotating member 705, respectively.

The second rotating member 705, the third rotating member 706 and the fourth rotating member 707 can be rotated by the rotating shaft 702.

The respective outside diameters of the rotating members 705, 706 and 707, and the respective outside diameters of the spur gears 716, 717 and 718 are determined such that the rotating speed of the second rotating member 705 is higher than that of the first rotating member 703, the rotating speed of the third rotating member 706 is higher than that of the second rotating member 705, and the rotating speed of the fourth rotating member 707 is higher than that of the third rotating member 706.

A first floating disk assembly 720, a second floating disk assembly 721, a third floating disk assembly 722 and a fourth floating disk assembly 723 having the same construction as the first floating disk assembly 50 are located between the first 703 and the second rotating member 705, between the second rotating member 705 and the third rotating member 706, between the third rotating member and the fourth rotating member 707 and the fourth rotating member and the fastening member 704, respectively.

The difference in rotating speed between the first rotating member 703 and the fastening member 704 can be reduced smoothly by the frictional sliding of the rotating members and the floating disk assemblies.

A pushing device 730 is combined with the fastening member 704. The pushing device 730 is similar in construction to that of the brake system 100 in the first embodiment. The pushing device 730 can push the fastening member 704 axially as indicated by the arrows P toward the first rotating member 703.

In the floating-disk type brake system 700 in the seventh embodiment, the rotating members 703, 705, 706 and 707, and the fastening member 704 rotate relative to each other when the rotating shaft 702 rotates.

When the pushing device 730 is operated to push the fastening member 704 toward the first rotating member 703, the second rotating member 705, the third rotating member 706, the fourth rotating member 707, the first floating disk assembly 720, the second floating disk assembly 721, the third floating disk assembly 722, and the fourth floating disk assembly 723 are pressed together between the first rotating member 703 and the fastening member 704. Those rotating members, those floating disk assemblies and the fastening member can be thus brought into frictional engagement to brake the rotating shaft 702.

The differences in rotating speeds between the adjacent ones of the rotating members 703, 705, 706 and 707, and the fastening member 704 can be smoothly reduced to zero by the frictional sliding of the floating disk assemblies 720, 721, 722 and 723.

Thus, it is possible not only to provide stable braking force by suppressing the variation of coefficient of friction, but also to prevent fading due to generated heat and to ensure a constant braking force for a long time. Consequently, it is possible to extend the life of the first to the fourth rotating member, and the first to the fourth floating disk assembly.

In the brake system 700 in the seventh embodiment, the rotating speed of the second rotating member 705 is higher than that of the first rotating member 703, the rotating speed of the third rotating member 706 is higher than that of the second rotating member 705, and the rotating speed of the fourth rotating member 707 is higher than that of the third rotating member 706.

When the fourth rotating member 707 and the fastening member 704 are frictionally engaged through the fourth floating disk assembly 723, the rotating speed of the fourth rotating member 707 drops sharply. Thus, the brake system 700 exhibits a sensitive braking property for braking the rotating shaft 702.

Figure 29:
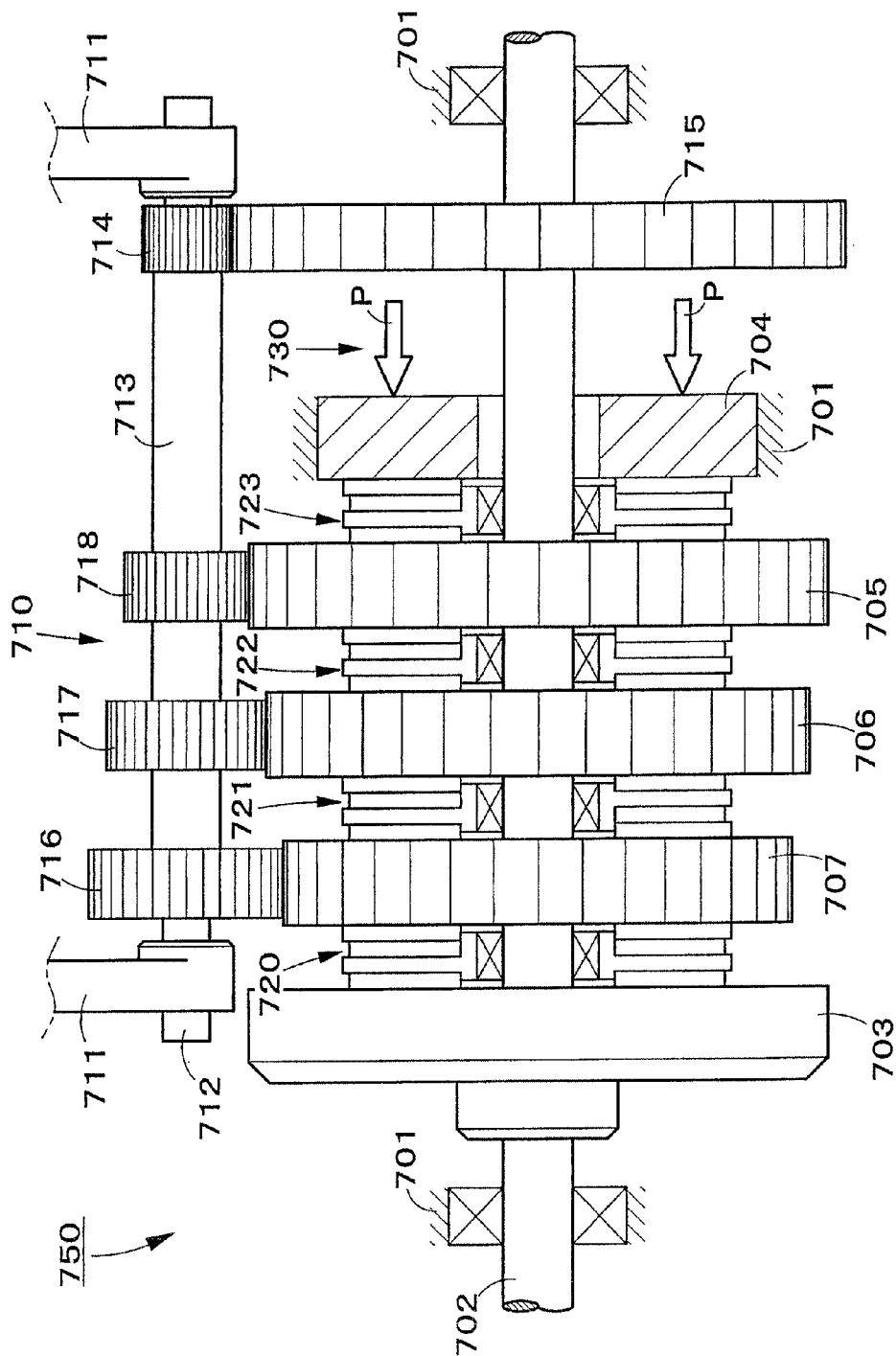
FIG. 29 is a typical partially sectional side elevation of a brake system in a modification of the brake system in the seventh embodiment.

FIG. 29 shows a floating-disk type brake system 750 in a modification of the brake system 700. A rotation transmitting mechanism 710 included in the floating-disk type brake system 750 is designed such that the rotating speed of the second rotating member 705 is lower than that of the first rotating member 703, the rotating speed of the third rotating member 706 is lower than that of the second rotating member 705, and the rotating speed of the fourth rotating member 707 is lower then that of the third rotating member 706.

When the fourth rotating member 707 and the fastening member 704 are frictionally engaged through the fourth floating disk assembly 707, the brake system 750 exhibits a moderate braking property for braking the rotating shaft 702.

Eighth Embodiment

A floating-disk type brake system 800 in an eighth embodiment according to the present invention will be described with reference to FIGS. 30 to 33.

Figure 30:
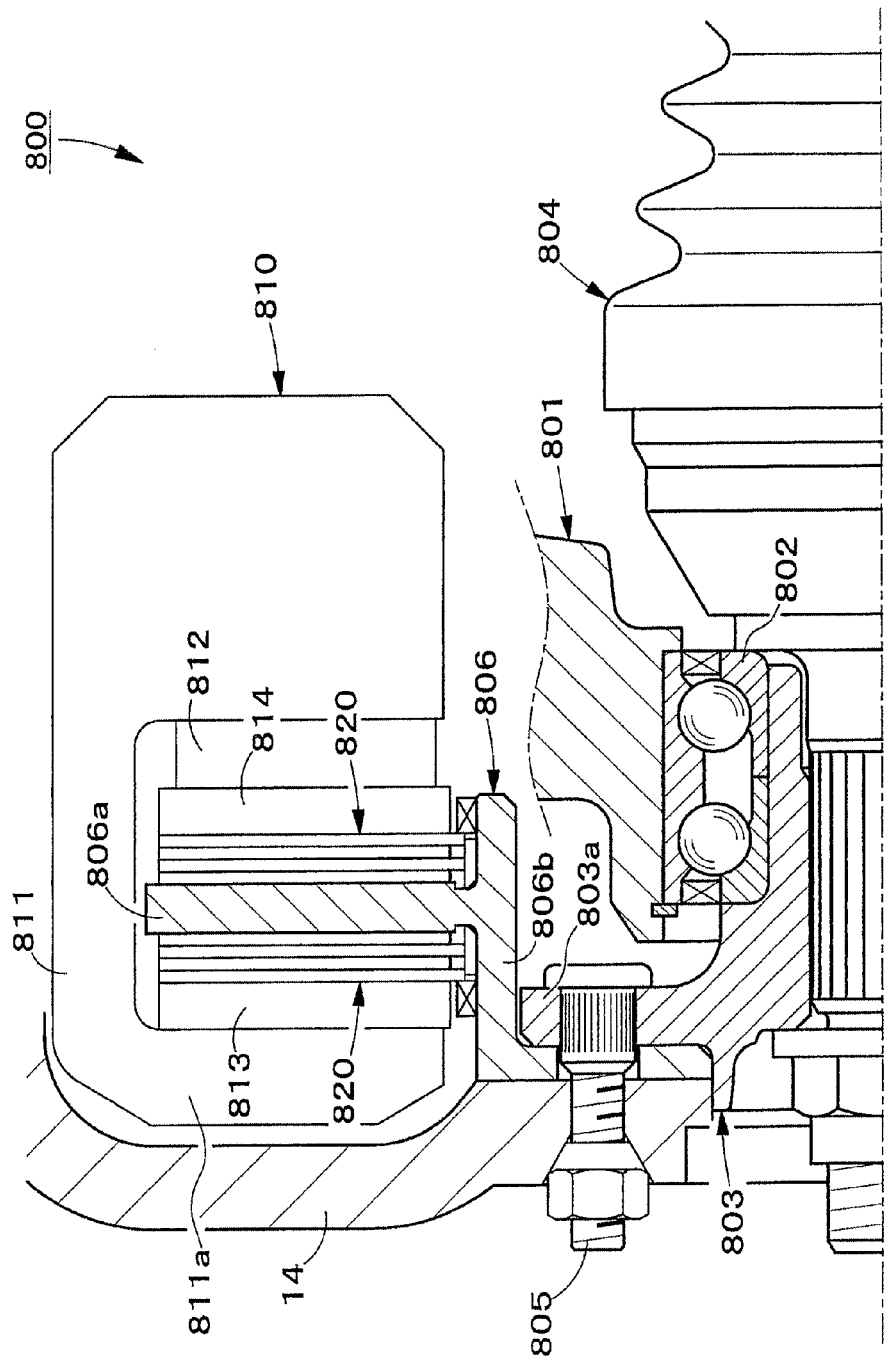
FIG. 30 is a typical sectional view of an essential part of a brake system in an eighth embodiment according to the present invention.

The floating-disk type brake system 800 in the eighth embodiment shown in FIG. 30 is built by incorporating floating disk assemblies into an automotive disk brake 810.

More concretely, a hub 803 rotatably supported in a unit bearing 802 held in a knuckle housing 801 is rotationally driven by a drive shaft 804. A brake disk 806 and a front wheel 14 are fastened to and held on the hub 803 by hub bolts 805 attached by press fitting to a circular flange 803a formed on the hub 803.

The front wheel 14 is braked by axially compressing a sliding disk 806a of the brake disk 806 with respect to the axial direction of the axle by the disk brake 810.

The disk brake 810 includes a caliper 811 supported on the knuckle housing 801, and brake pads 813 and 814 attached to an outer end part 811a of the caliper 811, and the free end of a piston 812, respectively.

In an ordinary disk brake, the brake pads 813 and 814 are brought directly into frictional engagement with the opposite side surfaces of the sliding disk 806a of the brake disk 806. In the brake system 800 in the eighth embodiment, floating disk assemblies 820 are interposed between the brake pad 813 and one of the opposite side surfaces of the sliding disk 806a and between the brake pad 814 and the other side surface of the sliding disk 806a, respectively.

Figure 31:
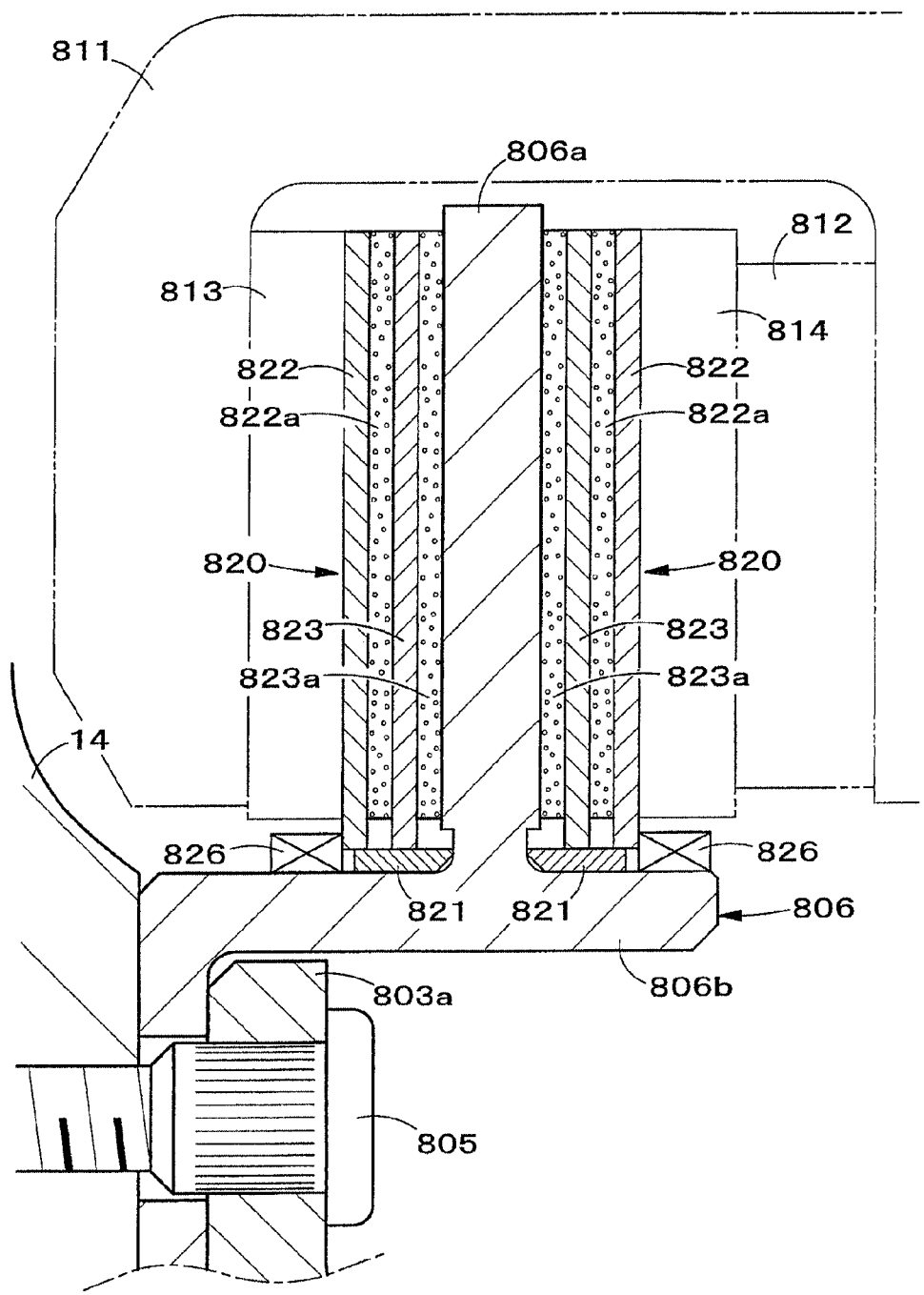
FIG. 31 is an enlarged view of a part of FIG. 30.

As shown in an enlarged view in FIG. 31, the floating disk assemblies 820 have cylindrical members 821 put on parts, respectively extending on the axially opposite sides of the sliding disk 806a, of a cylindrical boss 806b of the brake disk 806, respectively. The cylindrical members 821 are made of a self-lubricating material, such as a sintered metal containing molybdenum disulfide.

A first disk 822 and a second disk 823 made by processing a steel plate or the like are put rotatably on each of the cylindrical members 821. The first disk 822 and the second disk 823 are coaxial with the brake disk 806 and are capable of rotating relative to the brake disk 806.

Pressing devices 826 are disposed near the cylindrical members 821, respectively. Each of the pressing devices 826 is internally provided with a coil spring or the like. The pressing devices 826 apply pressure to the first disks 822 and the second disks 823 toward the sliding disk 806a of the brake disk 806.

The first disks 822 have side surfaces serving as sliding surfaces in frictional sliding contact with the surfaces of the brake pads 813 and 814, respectively, of the disk brake 810, and the other side surfaces to which frictional linings 822a are attached, respectively.

Each of the second disks 823 has a side surface in frictional sliding contact with the first frictional lining 822a, and the other side surface to which a second frictional lining 823a is attached.

Materials of the brake pads 813 and 814, the first frictional linings 822a, and the second frictional linings 823a are selectively determined such that the frictional properties of the brake pads 813 and 814 are higher than those of the first frictional linings 822a, and the frictional properties of the first frictional linings 822a are higher than those of the second frictional linings 823a.

When the disk brake 810 is applied to brake the front wheel 14, the brake pad 813 and the first disk 822, the brake pad 814 and the first disk 822, the first frictional lining 822a and the second disk 823, the other first frictional lining 82a and the other second disk 823, the second frictional lining 823a and the sliding disk 806a of the brake disk 806, and the other second frictional lining 823a and the sliding disk 806a of the brake disk 806 are brought into frictional sliding contact. Thus, six frictional joints are formed.

In an ordinary disk brake, the brake pads 813 and 814 are brought directly into frictional sliding contact with the sliding disk 806a of the brake disk 806. Thus, only two frictional joints are formed.

When the pistons 812 of the disk brake 810 of the brake system 800 and the ordinary disk brake apply the same pressure to the brake pads 814, respectively, the braking force of the brake system 800 is about three times that of the ordinary disk brake.

That is, a pressure to be exerted by the piston 812 of the disk brake 810 to generate a braking force may be approximately on third of a pressure to be exerted by the piston of the ordinary disk brake to generate the same braking force.

The first disk 822 and the second disk 823 are held so as to be rotatable relative to the brake disk 806. The brake pads 813 and 814 have a frictional property higher than that of the first frictional linings 822a. The frictional property of the first frictional linings 822a is higher than that of the second frictional linings 823a. Therefore, when the disk brake 810 is applied to brake the front wheel 14, each of the first disks 822 and each of the second disks 823 rotate relative to each other.

In this braking operation, the differences in rotating speed among the brake disk 806, the first disks 822, and the second disks 823 are dependent on the frictional properties of the brake pads 813 and 814, the first frictional linings 822a, and the second frictional linings 823a.

For example, the front wheel 14 of a vehicle traveling at 60 km/h rotates at about 600 rpm. The disk brake 810 can be designed such that the second disks 823 rotate at about 400 rpm, and the first disks 822 rotate at about 200 rpm when the disk brake 810 is applied to brake the front wheel 14 under such a condition.

In an ordinary disk brake, a rotating speed difference of about 600 rpm between each of the brake pads 813 and 814, and the brake disk 806 needs to be reduced to zero.

The brake system 800 in the eighth embodiment can be designed such that a rotating speed difference of about 200 rpm between the brake disk 806, and each of the first disks 822, and a rotating speed difference of about 200 rpm between each of the first disks 822 and each of the brake pads 813 and 814 need to be reduced to zero.

When the piston 814 of the disk brake 810 exerts a fixed pressure, frictional heat generating rate is proportional to the square of rotating speed difference.

Accordingly, the frictional heat generating rate when the rotating speed difference is 200 rpm is as low as about one ninth of that when the rotating speed difference is 600 rpm.

Therefore, the heat generating rate of the brake system 800 in the eighth embodiment is about one third of that of the ordinary disk brake, taking the increased number frictional joints in the brake system 810 as many as three times the frictional joints in the ordinary disk brake.

Moreover, since the number of the frictional joints in the brake system 810 in the eighth embodiment is three times that in the ordinary disk brake, the pressure to be exerted by the piston 814 of the disk brake 810 to generate a braking force is approximately one third of that to be exerted by the piston of the ordinary disk brake to generate the same braking force.

Therefore, the piston 814 needs to exert a low pressure, and hence the heat generating rate of the brake system 800 in the eighth embodiment can be reduced accordingly.

Thus it is possible not only to suppress the occurrence of fading resulting from heat generation, but also to reduce the abrasion of the brake pads 813 and 814, the first frictional lining 822a, and the second frictional lining 823a.

The brake system 800 in the eighth embodiment has the first disk 822 and the second disk 823 located between the brake disk 806 and the brake pad 813, and the first disk 822 and the second disk 823 located between the brake disk 806 and the brake pad 814. Therefore, the brake system 800 having the increased number of frictional joints not only can exert a high braking force, but also can reduce heat generation resulting from the rotating speed difference among the frictional surfaces during the braking operation. Thus, the brake system 800 in the eighth embodiment can perform excellent operation and effect that could not have been performed at all by the conventional disk brake.

The brake system 800 in the eighth embodiment generates heat at a heat generating rate far lower than that at which the ordinary disk brake generates heat while the front wheel 14 is being braked.

Therefore, the bake disk 806 does not need to be a ventilated disk and may be a slid disk as shown in FIG. 30.

Since the solid disk has a very small thickness, namely, an axial dimension, an additional space provided by the reduction of the thickness of the brake disk can be used for installing the floating disk assemblies 820.

Thus, the existing automotive disk brake can be readily replaced with the brake system 800 in the eighth embodiment.

In the brake system 800 (850) in the eighth embodiment, the pressing devices 826 (874) are disposed near inner peripheral parts of the floating disk assemblies 820 (870), respectively. Therefore, the positions of the floating disk assemblies 820 can be stabilized.

Consequently, the floating disk assemblies 820 (870) and be kept in a position perpendicular to the rotating shaft, and brake judder attributable to the tilt of the floating disk assemblies 820 (870) can be surely prevented.

Although each of the floating disk assemblies 820 of the brake system 800 in the eighth embodiment includes the two disks 822 and 823, it goes without saying that the number of the disks may increased or decreased taking necessary braking force, the rotating speed of the wheel, and heat generating rate into consideration.

Annular members not provided with the frictional linings 822a and 823a may be employed when the weight and running speed of a vehicle to which the brake system 800 in the eighth embodiment is applied It is obvious to persons skilled in the art that the floating disk assemblies may be those substantially the same in construction as the floating disk assemblies 50 and 80 of the foregoing embodiments in such a case.

Modification

A floating-disk type brake system 850 in a modification of the brake system 800 in the eighth embodiment will be described with reference to FIGS. 32 and 33.

Figure 32:
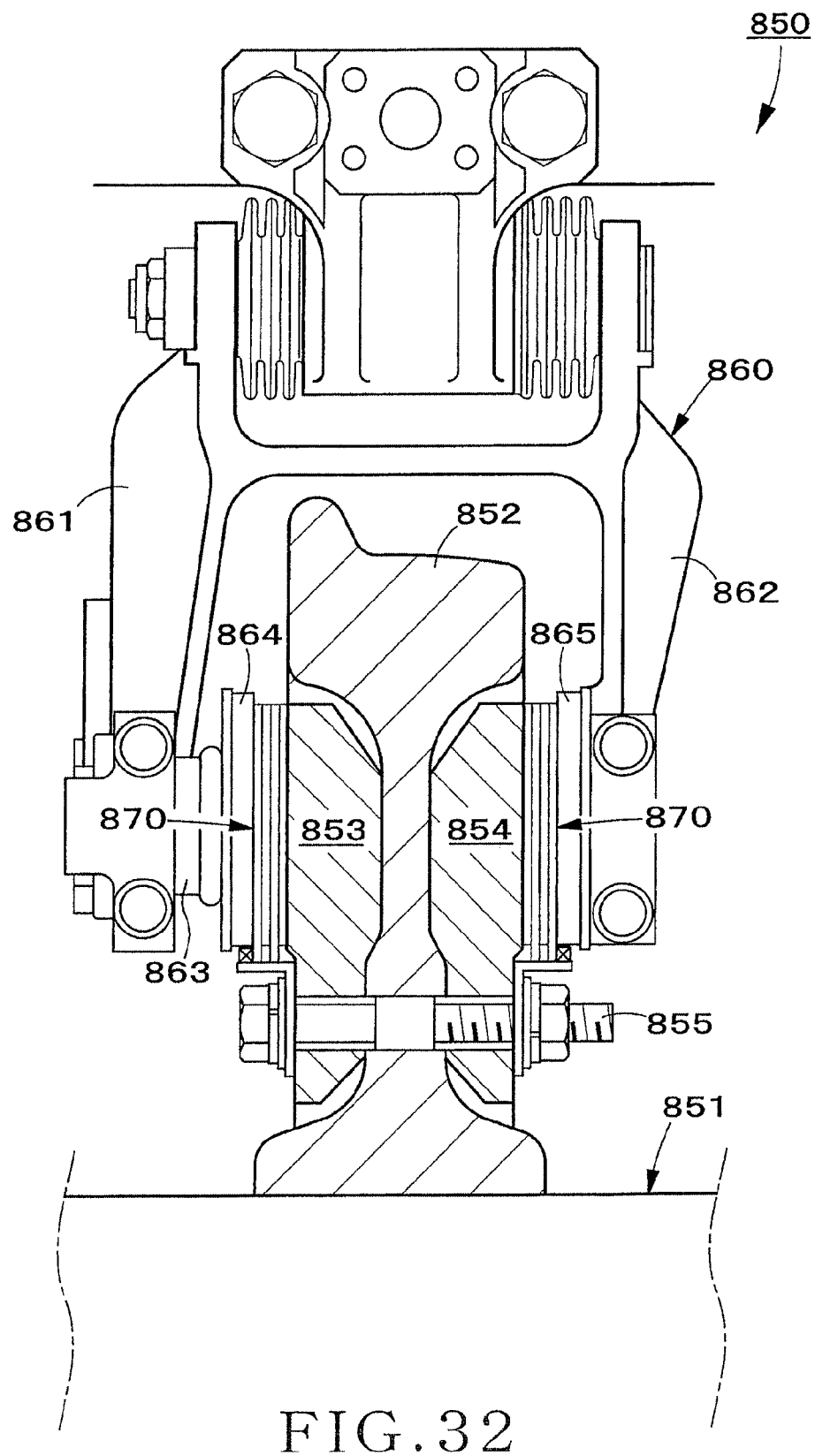
FIG. 32 is a typical sectional view of an essential part of a brake system in a modification of the brake system in the eighth embodiment.

As shown in FIG. 32, the floating-disk type brake system 850 is built by incorporating floating disk assemblies into a disk brake 860 for braking s wheel of a railroad car.

Brake disks 853 and 854 are fastened to the opposite side surfaces of a wheel 852 mounted on an axle 851, respectively, with bolts 855 and nuts.

The caliper, fixed to the frame of a bogie, of the disk brake 860 has a pair of arms 861 and 862. Brake pads 864 and 865 are attached to a piston 863 held on the arm 861, and the other arm 862, respectively.

Floating disk assemblies 870 are located between the brake disk 853 and the brake pad 864 and between the brake disk 854 and the brake pad 865, respectively.

Figure 33:
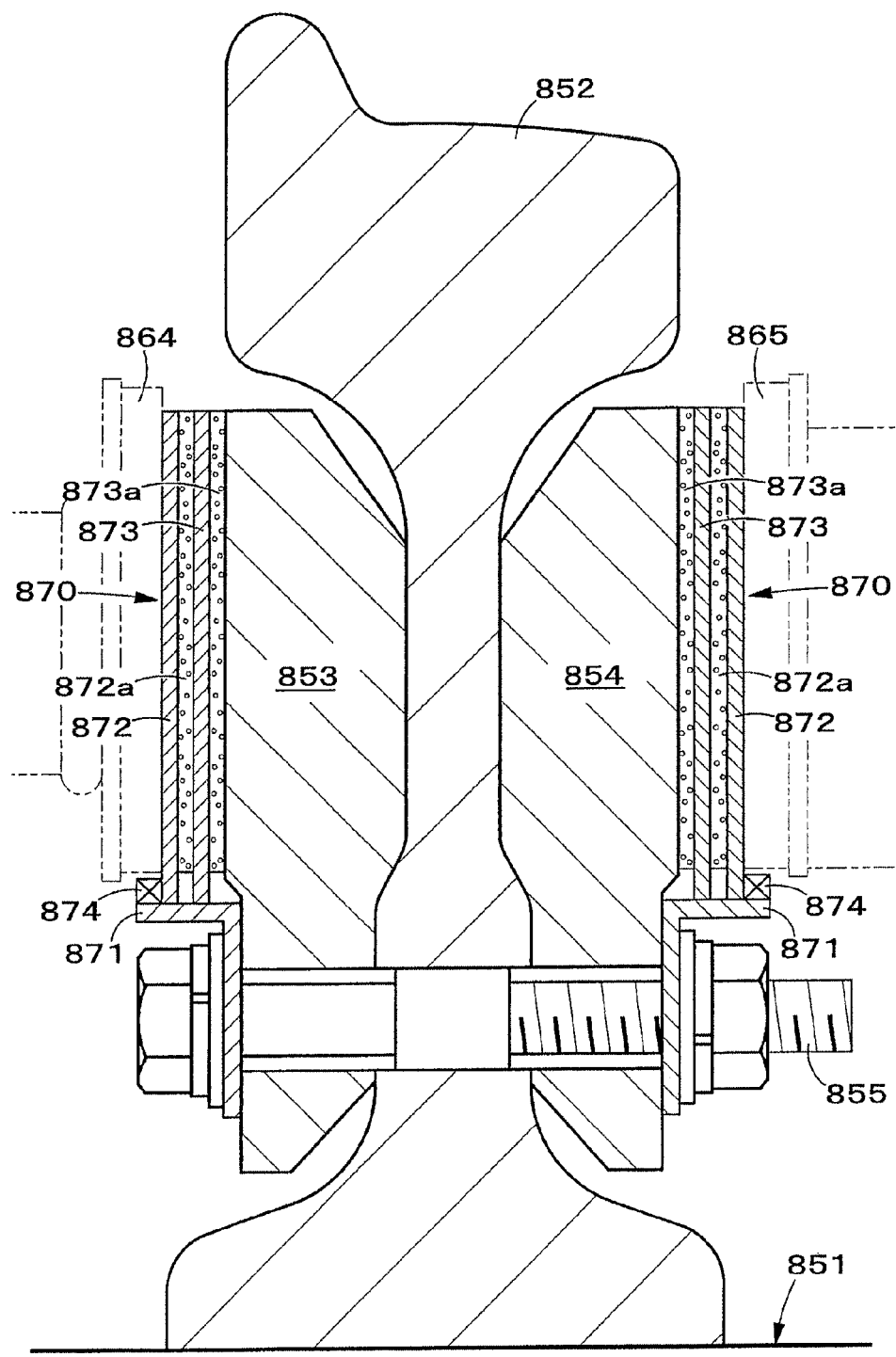
FIG. 33 is an enlarged view of a part of FIG. 32.
Figure 34:
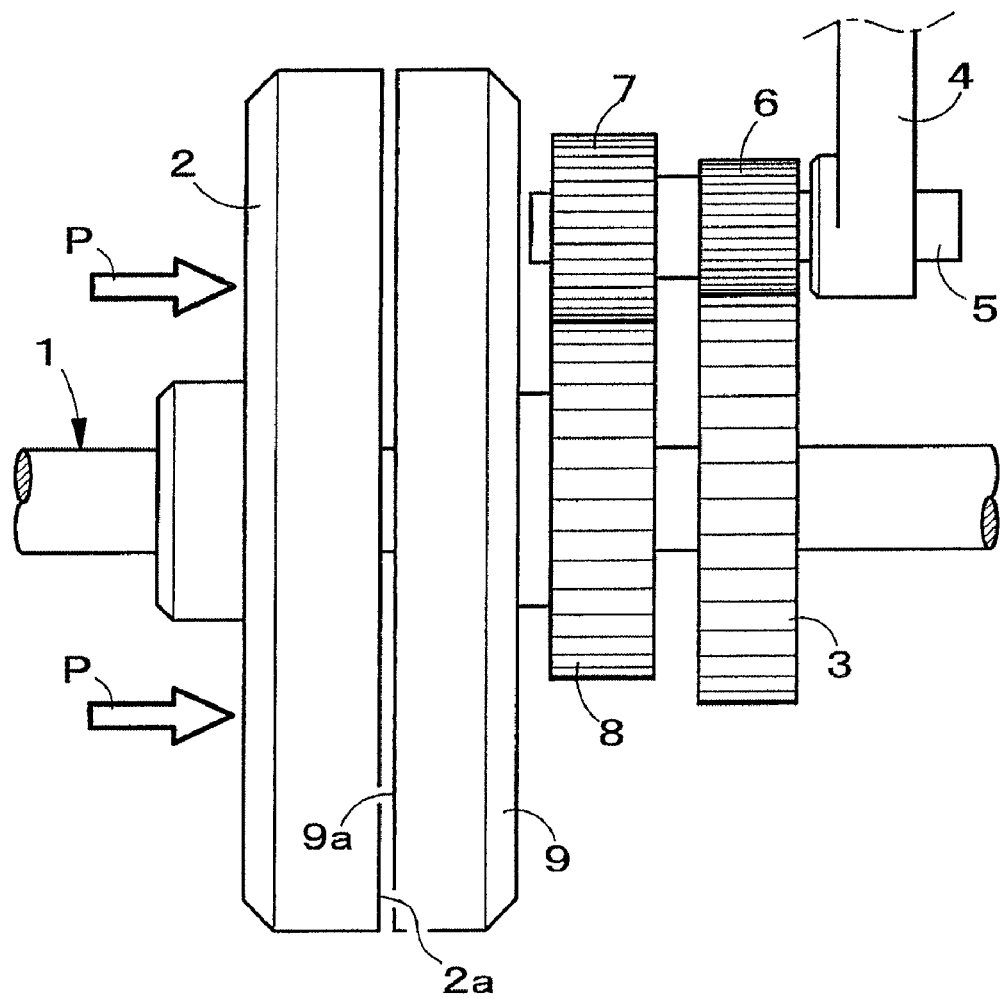
FIG. 34 is a typical side elevation of the brake system previously applied for patent.

As shown in an enlarged view in FIG. 33, each of the floating disk assemblies 870 includes an annular support member 871 fastened coaxially to the wheel 852 by bolts 855 and nuts. The annular support members 871 are made of a self-lubricating material, such as a sintered metal containing molybdenum disulfide.

A first disk 872 and a second disk 873, namely annular steel plates, are rotatably put on the annular support member 871. The first disks 872 and the second disks 873 are supported coaxial with the brake disks 853 and 854 so as to be smoothly rotatable relative to the brake disks 853 and 854.

Pressing devices 874 internally provided with a coil spring or the like are disposed contiguously with the outer ends of the annular support members 871. The pressing devices 874 apply pressure to the first disks 872 and the second disks 873 toward the brake disks 853 and 854, respectively.

The first disks 872 have side surfaces in frictional sliding contact with the surfaces of the brake pads 864 and 865, respectively. The first frictional linings 872a are attached to the other side surfaces of the first disks 872, respectively.

The second disks 873 have side surfaces serving as sliding surfaces in frictional sliding contact with the first frictional linings 872a, respectively. The second frictional linings 873a are attached to the other side surfaces of the second disks 873.

Materials of the brake pads 864 and 865, the first frictional linings 872a, and the second frictional linings 873a are selectively determined such that the brake pads 864 and 865 have a frictional property higher than that of the first frictional linings 872a, the first frictional linings 872a have a frictional property higher than that of the second frictional lining 873a.

When the disk brake is applied to brake the wheel 852, the brake pad 864 and the first disk 872, the brake pad 865 and the other first disk 872, the first frictional lining 872a and the second disk 873, the other first frictional lining 872a and the other second disk 873, the second frictional lining 873a and the brake disk 853, and the other second frictional lining 873a and the brake disk 854 are brought into frictional sliding contact. Thus, six frictional joints are formed.

Thus, the brake system 850 can surely brake the wheel 852, generating a small quantity of heat entirely similarly to the brake system 800.

Although the brake systems in the preferred embodiments of the present invention have been described, the present invention is not limited in its application to those specifically herein and, obviously, many changes and variations are possible therein.

For example, in the brake system 100 in the first embodiment, the disks may be pressed by an electric servomechanism or a hydraulic servomechanism instead of pressing the same by turning the lever 72.

Although the brake system 100 in the first embodiment has been described as applied to the FR vehicle (front-engine rear-wheel drive vehicle), it goes without saying that the brake system 100 is applicable to FF (front-engine front-wheel drive) vehicles and 4WD (four-wheel drive) vehicles.

Machines to which the brake systems 800 in the eighth embodiment and the brake system 850 in the modification of the brake system 800 are applicable and are not limited to automobiles and railroad cars, the brake systems 800 and 850 are applicable to braking wheels of other transportation machines, such as airplanes.

REFERENCE CHARACTERS

1: Rotating shaft
2: First rotating member
3, 6, 7 and 8: Gears
4: Support arm
5: Support shaft
9: Second rotating member
10: Conventional in-wheel motor for an electric vehicle
11: Electric motor
12: Reduction gear
13: Drum brake
14: Wheel
15: Tire
20: Casing (Fixing means)
23: Input shaft (Rotating shaft)
24: Output shaft
30: Planetary gear
31: Sun gear
32: Planet carrier
33: Support shaft
34: Planet pinion
35: Ring gear
40: Coupling mode selecting device
50: First floating disk assembly
60: First disk assembly
70: Pushing device
75 and 76: Second disks
80: Second floating disk assembly
90: Second disk
100: Brake system in the first embodiment
200: Brake system in the second embodiment
300: Brake system in the third embodiment
400: Brake system in the fourth embodiment
500: Brake system in the fifth embodiment
600: Brake system in the sixth embodiment
700: Brake system in the seventh embodiment
800: Brake system in the eighth embodiment
806: Brake disk
810: Disk brake
812: Piston
820: Floating disk assembly
822 and 823: Annular member
822a and 832a: Friction linings
852: Wheel of railroad car
853 and 854: Brake disk
860: Disk brake
865: Piston
870: Floating disk assembly
872 and 873: Annular members
872a and 873a: Friction lining

What is claimed:

1. A floating-disk type brake system for braking a rotating shaft, said floating-disk type brake system comprising:

a first floating disk assembly disposed coaxially with the rotating shaft so as to be axially movable and to be rotatable on the rotating shaft, said first floating disk assembly being supported by the rotating shaft via a connecting member;

a first disk assembly and a second disk assembly disposed coaxially with the rotating shaft so as to be axially movable and to be rotatable on the rotating shaft;

a pushing member capable of axially pushing the first floating disk assembly, the first disk assembly and the second disk assembly together to bring the first floating disk assembly, the first disk assembly and the second disk assembly into frictional contact with each other;

wherein the first disk assembly includes a first annular member having the shape of a disk and being brought into frictional engagement with the first floating disk assembly, and a second annular member having the shape of a disk and being brought into frictional engagement with the second disk assembly, and the second disk assembly includes a third annular member having the shape of a disk and being supported by the pushing member, and a fourth annular member having the shape of a disk and being brought into frictional engagement with the first disk assembly.

* * * * *